United States Patent
Oikawa et al.

(10) Patent No.: US 9,610,648 B2
(45) Date of Patent: Apr. 4, 2017

(54) SPOT WELDED JOINT AND SPOT WELDING METHOD

(71) Applicant: NIPPON STEEL & SUMITOMO METAL CORPORATION, Chiyoda-ku, Tokyo (JP)

(72) Inventors: Hatsuhiko Oikawa, Tokyo (JP); Hideki Hamatani, Tokyo (JP); Masafumi Azuma, Tokyo (JP); Noriyuki Suzuki, Tokyo (JP); Fuminori Watanabe, Tokyo (JP); Naoki Maruyama, Tokyo (JP); Hiroyuki Kawata, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 251 days.

(21) Appl. No.: 14/490,538

(22) Filed: Sep. 18, 2014

(65) Prior Publication Data

US 2015/0001188 A1    Jan. 1, 2015

Related U.S. Application Data

(62) Division of application No. 13/390,493, filed as application No. PCT/JP2010/064748 on Aug. 30, 2010, now Pat. No. 8,962,149.

(30) Foreign Application Priority Data

Aug. 31, 2009  (JP) .................................. 2009-199908
Nov. 30, 2009  (JP) .................................. 2009-272076
(Continued)

(51) Int. Cl.
*B23K 11/16*    (2006.01)
*B23K 11/11*    (2006.01)
(Continued)

(52) U.S. Cl.
CPC ............. *B23K 11/115* (2013.01); *B23K 11/16* (2013.01); *B23K 11/166* (2013.01);
(Continued)

(58) Field of Classification Search
CPC ..... B23K 11/115; B23K 11/16; B23K 11/166; B32B 15/011; C22C 38/001; C22C 38/02; C22C 38/04; C22C 38/06
See application file for complete search history.

(56) References Cited

U.S. PATENT DOCUMENTS

2011/0008648 A1    1/2011  Okitsu

FOREIGN PATENT DOCUMENTS

JP    58-003792 A    1/1983
JP    4-371372 A    12/1992
(Continued)

OTHER PUBLICATIONS

H. Kawabe, et al., "TS980MPa Grade Cold-Rolled Steel Sheet with Excellent Formability "CHLY980"," Kawasaki Steel Corporation Technical Report, Kawasaki Steel Corporation, No. 32, pp. 65-66, 2000.
(Continued)

*Primary Examiner* — Brian Jennison
(74) *Attorney, Agent, or Firm* — Birch, Stewart, Kolasch & Birch, LLP

(57) ABSTRACT

Provided is a spot welded joint (10) which includes at least one thin steel plate with a tensile strength of 750 MPa to 1850 MPa and a carbon equivalent Ceq of equal to or more than 0.22 mass % to 0.55 mass % and in which a nugget (3) is formed in an interface of the thin steel plates (1A, 1B). In a nugget outer layer zone, a microstructure consists of a dendrite structure in which an average value of arm intervals is equal to or less than 12 μm, an average grain diameter of carbides contained in the microstructure is 5 nm to 100 nm,
(Continued)

and a number density of carbides is equal to or more than $2\times10^6/mm^2$.

14 Claims, 7 Drawing Sheets

(30) Foreign Application Priority Data

May 6, 2010 (JP) .................................. 2010-106442
Aug. 2, 2010 (JP) .................................. 2010-173929

(51) Int. Cl.
| | | |
|---|---|---|
| *B32B 15/01* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *B23K 101/18* | (2006.01) | |
| *B23K 101/34* | (2006.01) | |
| *B23K 103/04* | (2006.01) | |

(52) U.S. Cl.
CPC .......... *B32B 15/011* (2013.01); *C22C 38/001* (2013.01); *C22C 38/02* (2013.01); *C22C 38/04* (2013.01); *C22C 38/06* (2013.01); *B23K 2201/18* (2013.01); *B23K 2201/34* (2013.01); *B23K 2203/04* (2013.01); *Y10T 428/12347* (2015.01); *Y10T 428/12965* (2015.01)

(56) References Cited

FOREIGN PATENT DOCUMENTS

| | | |
|---|---|---|
| JP | 11-270682 A | 10/1999 |
| JP | 2000-234153 A | 8/2000 |
| JP | 2001-170776 A | 6/2001 |
| JP | 2002-102980 A | 4/2002 |
| JP | 2002-103048 A | 4/2002 |
| JP | 2002-103054 A | 4/2002 |
| JP | 2003-103377 A | 4/2003 |
| JP | 2008-229720 A | 10/2008 |
| JP | 2009-001839 A | 1/2009 |
| JP | 2009-125801 A | 6/2009 |
| JP | 2009-127119 A | 6/2009 |
| JP | 2009-138223 A | 6/2009 |
| JP | 2009-291797 A | 12/2009 |
| JP | 2010-115706 A | 5/2010 |
| JP | 2010-149187 A | 7/2010 |
| WO | WO 2009/072303 A1 | 6/2009 |

OTHER PUBLICATIONS

International Preliminary Report on Patentability with Written Opinion for International Patent Application No. PCT/JP2010/064748 dated Apr. 5, 2012.
International Search Report for Application No. PCT/JP2010/064748 dated Nov. 22, 2010 with English translation thereof.
M. Shinozaki, et al., "Improvement in Fatigue Strength of Spot Welded High Strength Sheet Steel Joints," The Iron and Steel Institute of Japan, vol. 68, No. 9, pp. 318-325, 1982.
O. Toru, et al., "The effect of paint baking cycles on the spot weld strength of advanced high strength steel," Japan Welding Society National Convention Lecture Resume, The Japan Welding Society, vol. 83, No. 9, pp. 4-5, 2008.

SPOT WELDED JOINT AND SPOT WELDING METHOD

This application is a Divisional of copending application Ser. No. 13/390,493, filed on Feb. 14, 2012, which was filed as PCT International Application No. PCT/JP2010/064748 on Aug. 30, 2010, which claims the benefit under 35 U.S.C. §119(a) to Patent Application No. 2010-173929, filed in Japan on Aug. 2, 2010, and Patent Application No. 2010-106442, filed in Japan on May 6, 2010, and Patent Application No. 2009-272076, filed in Japan on Nov. 30, 2009, and Patent Application No. 2009-199908, filed in Japan on Aug. 31, 2009, all of which are hereby expressly incorporated by reference into the present application.

TECHNICAL FIELD

The present invention relates to a spot welded joint and a spot welding method of a high-strength steel plate used in an automobile field and the like.

BACKGROUND ART

In recent years, there is an increasing demand for using a high-strength steel plate for a vehicle body, a component, and so on in an automobile field. This is because weight saving of a vehicle body is necessary for achieving a fuel efficiency and a carbon dioxide gas ($CO_2$) emission reduction and because collision safety should be improved. On the other hand, spot welding is mainly used in processes such as assembling of a vehicle body, mounting of a component, and the like. However, if a high-strength steel plate, in particular a high-strength steel plate whose tensile strength is high, is spot welded, following problems occur.

As characteristics important in a joint which has been spot welded (hereinafter, referred to as a spot welded joint), a tensile strength and a fatigue strength can be cited, and which is important in particular is the tensile strength. As the tensile strengths of the spot welded joint, there are recited a tensile shear strength (TSS) measured by applying a tensile load in a shear direction and a cross tensile strength (CTS) measured by applying a tensile load in a peel direction. Measuring methods for the tensile shear strength and the cross tensile strength are defined in JIS Z 3136 and JIS Z 3137, for example.

In general, if a value of hardness of a nugget is high as well as a value of toughness is also high and segregation in the nugget is suppressed, a fracture appearance in a tensile test is good (a fracture occurs in a periphery of the nugget), a sufficiently high tensile strength can be obtained, and fluctuation thereof is also small. On the other hand, if the value of hardness of the nugget is high but the value of toughness is low, or if the segregation in the nugget is prominent, a peel fracture (a fracture in the nugget) or a partial plug fracture (a partial fracture in the nugget) occurs in the tensile test and a good fracture appearance cannot be obtained. In such a case, a tensile strength is reduced significantly and fluctuation thereof becomes large. The reduction and the fluctuation of tensile strength are exhibited particularly in the cross tensile strength. Further, in spot welding of a high-strength steel plate, a crack or a defect sometimes occurs in a nugget, and in such a case a reduction or fluctuation of joint strength becomes prominent. Thus, in a spot welded portion of a high-strength steel plate, improvement of the fracture appearance and accompanying betterment of the cross tensile strength as well as reduction of fluctuation thereof are required.

It should be noted that a defect or a crack in a nugget is considered to be caused by rapid contraction of the nugget after finishing of energization. In other words, in spot welding, parts of high-strength steel plates melt during energization between two welding electrodes and solidify mainly by heat removal via the welding electrodes after finishing of energization. Since the welding electrodes are water-cooled, rapid contraction sometimes occurs in a thickness direction of the high-strength steel plates in solidification of the molten parts. Thus, as illustrated in FIG. 1A, a contraction defect 105 sometimes occurs in a center of a nugget 103 formed between high-strength steel plates 101A and 101B. Further, the nugget 103 sometimes contracts also in a lateral direction, and the high-strength steel plates 101A and 101B whose temperatures have not risen cannot follow that contraction, and as illustrated in FIG. 1B, the nugget 103 being given a tensile stress from the high-strength steel plates 101A and 101B, a longitudinal crack sometimes occurs in the nugget 103.

As described above, since a good fracture appearance cannot be obtained if a toughness of a nugget is low or segregation in a nugget is prominent, reduction of tensile strength (joint strength) of a spot welded joint and fluctuation of welding strength occur. On the other hand, insufficiency of toughness and prominent segregation are apt to occur when a high-strength steel plate with a high carbon equivalent is spot welded. Methods whose objects are to solve such a problem are described in Non-patent Literature 1 and Patent Literature 1. In these methods, tempering energization is performed after a predetermined time passes on finishing of energization for spot welding, so that a spot welded portion (a nugget portion and a heat-affected zone) is annealed, and thereby a hardness of the welded portion is reduced. However, in these methods, there is a problem that productivity is reduced since welding in both methods requires a long period of time. Further, there is also a problem that a peel fracture in a nugget is apt to occur due to softening of the welded portion by tempering.

Methods for solving a problem of joint strength reduction are described in Patent Literatures 2 and 3. In these methods, tempering treatments are performed by heating welded portions with high frequencies after spot welding. However, in these methods, another process is necessary after welding, which is complicated, and there also occurs a problem that a special apparatus for using the high frequency is required and so on. Further, there is also a problem that a peel fracture in a nugget is apt to occur due to softening of a welded portion by tempering.

Non-patent Literature 2 and Patent Literature 4 describe that a tensile strength (a peel strength) of an L-shaped welded joint is improved by heating and temperature keeping by a paint baking treatment among automobile production processes. However, in neither Non-patent Literature 2 nor Patent Literature 4, a relation between a type of steel or a steel plate component (a carbon equivalent, in particular) and a cross tensile strength is not clarified. Further, detailed fracture appearances of welded portions nor relations between the fracture appearances and cross tensile strengths in a case that various steel types are used are not indicated.

In addition to the techniques above, it can be considered to perform spot welding with a steel plate with a low carbon equivalent as indicated in Non-patent Literature 3, for example. However, in this method, there occurs a problem that manufacturing of a steel plate itself becomes difficult or a necessary mechanical characteristic cannot be obtained or the like because of restriction of components. Further, in a case that a hot stamping steel plate on the order of 1470 MPa described in Patent Literature 5 is used, for example, a quenching treatment is necessary, and thus reducing a carbon equivalent is difficult.

Further, there is known a technique in which the number of spot welding is increased in spot welding a high-strength steel plate. However, in this method, there is a problem that a welding operation efficiency deteriorates thereby reducing a productivity. Further, there is a problem of increase of a welding execution cost, restriction of a degree of design freedom, and so on.

Patent Literature 6 describes a method in which spot welding is performed with a predetermined high-strength steel plate and a hardness of a welded portion is reduced by performing tempering energization under a predetermined condition after welding energization. As the predetermined high-strength steel plate, there is used one whose carbon equivalent is prescribed within a predetermined range and in which an incline of a stress-distortion diagram within a range of a true strain of 3 to 7% obtained in a tensile test is prescribed to be equal to or more than 5000 MPa. However, also in this method, there is a problem that a peel fracture in a nugget is apt to occur due to softening of a welded portion.

Patent Literature 7 describes a method in which post-heating energization is performed after nugget formation by main energization, at a current value of equal to or more than a current value of the main energization. Further, Patent Literature 8 describes a method in which post-heating energization is performed by increasing a pressurizing force after nugget formation by main energization. However, even by these methods, there is a problem that a high joint strength cannot be obtained stably.

It should be noted that as a method for preventing an occurrence of a defect or a crack in a nugget there is known a method in which a pressurizing force of a welding electrode against a high-strength steel plate is increased after welding. However, in this method, there is a problem that since quite a high pressurizing force is necessary a welding gun having a high stiffness is required, making the method unsuitable for a practical use. Further, there is also known a method in which a cooling speed after welding is reduced by performing post-heating energization subsequently soon after welding. In this method, since a contraction speed of a welded portion is reduced accompanying reduction of cooling speed, defect or crack is hard to occur. However, even this method is not necessarily effective in spot welding of a high-strength steel plate whose tensile strength is equal to or more than 750 MPa and whose carbon amount or carbon equivalent is high, which is used for a reinforcing component of an automobile and so on.

CITATION LIST

Patent Literature

Patent Literature 1: Japanese Laid-open Patent Publication No. 2002-103048
Patent Literature 2: Japanese Laid-open Patent Publication No. 2009-125801
Patent Literature 3: Japanese Laid-open Patent Publication No. 2009-127119
Patent Literature 4: Japanese Laid-open Patent Publication No. 2009-291797
Patent Literature 5: Japanese Laid-open Patent Publication No. 2002-102980
Patent Literature 6: Japanese Laid-open Patent Publication No. 2009-138223

Patent Literature 7: Japanese Laid-open Patent Publication No. 2010-115706
Patent Literature 8: Japanese Laid-open Patent Publication No. 2010-149187

Non-Patent Literature

Non-Patent Literature 1: "Improvement of Spot Welded Joint Fatigue Strength in High Tension-Steel, —Iron and Steel—", The Iron and Steel Institute of Japan, Vol. 68, No. 9, p318 to 325, 1982
Non-Patent Literature 2: "Influence of Thermal History of Painting Baking on Spot Welded Joint Strength of Automobile Steel Plate, —Japan Welding Society National Convention Lecture Resume—", The Japan Welding Society, Vol. 83, No. 9, p4 to 5, 2008
Non-Patent Literature 3: "Kawasaki Steel Corporation Technical Report", Kawasaki Steel Corporation, No. 32, p65, 2000

SUMMARY OF INVENTION

Technical Problem

In a conventional technique, when a high-strength steel plate, in particular, a high-strength steel plate whose tensile strength is equal to or more than 750 MPa and whose carbon equivalent is high is subjected to spot welding, a hardness of a nugget increases and a toughness is reduced, brittle fracture being sometimes observed in a vicinity of an origin of fracture. Therefore, as described above, a joint strength is significantly reduced or fluctuation of joint strength occurs. Then, reliability to a spot welded joint and reliability to a member which includes the spot welded joint are damaged.

Further, when a high-strength steel plate, in particular, a high-strength steel plate whose tensile strength is equal to or more than 750 MPa and whose carbon equivalent is high is subjected to spot welding, a defect or a crack sometimes occur in a nugget. Therefore, as described above, a joint strength is significantly reduced or fluctuation of joint strength occurs. Then, reliability to a spot welded joint is damaged.

Further, a comparatively large inclusion is sometimes formed in a nugget. If such an inclusion exists in the nugget, in a case of the nugget which is hard and whose toughness is low, a peel fracture or a partial plug fracture sometimes occurs with the inclusion being an origin of a crack. As a result, a joint strength is significantly reduced or fluctuation of joint strength occurs, and reliability to a spot welded joint is damaged.

As described above, in the conventional technique, it is difficult to improve a tensile strength of a joint sufficiently and to reduce its fluctuation sufficiently in spot welding of a high-strength steel plate, in particular, a high-strength steel plate whose tensile strength is equal to or more than 750 MPa. Thus, high reliability has not been able to be obtained in a spot welded joint.

An object of the present invention is to provide a spot welded joint and a spot welding method which is capable, even in a case that a tensile strength of a high-strength steel plate being a material to be welded is equal to or more than 750 MPa, of preventing an occurrence of a defect or a crack at a time of spot welding, of improving a joint strength, and reducing fluctuation of joint strength, and further, which enables a reliable welded portion to be obtained while securing a good workability.

Solution to Problem

As a result of keen study for solving the above-described problems, the present inventors have found that, in a spot welded joint of a high-strength steel plate having a predetermined tensile strength and a predetermined composition, a tensile strength of the spot welded joint can be improved and that fluctuation of tensile strength can be reduced, by prescribing a proper microstructure of a nugget. Further, the present inventors have also found that such a spot welded joint can be obtained by prescribing a proper energization pattern and the like, while large increase of a cost and the like is avoided. In other words, the gist of the present invention is as follows.

[1]
A spot welded joint of a high-strength steel plate having:
two or more thin steel plates which are spot welded to each other; and
a nugget formed in a joint surface of the thin steel plates,
wherein at least one of the two or more thin steel plates is a high-strength steel plate whose tensile strength is 750 MPa to 1850 MPa and whose carbon equivalent Ceq represented by formula (1) below is 0.22 mass % to 0.55 mass %, and
wherein, in a nugget outer layer zone being a zone except a similar figure zone which is 90% as large as an outer shape of the nugget in the nugget,
a microstructure consists of a dendrite structure in which an average value of arm intervals is equal to or less than 12 μm,
an average grain diameter of carbides contained in the microstructure is 5 nm to 100 nm, and a number density of the carbides is equal to or more than $2 \times 10^6/\text{mm}^2$.

$$Ceq=[C]+[Si]/30+[Mn]/20+2[P]+4[S] \qquad (1)$$

([C], [Si], [Mn], [P], and [S] each represent respective contents (mass %) of C, Si, Mn, P and S).

[2]
The spot welded joint of a high-strength steel plate according to [1],
wherein the high-strength steel plate contains:
C, 0.10 mass % to 0.40 mass %;
Si: 0.01 mass % to 2.50 mass %; and
Mn: 1.5 mass % to 3.0 mass %, and
wherein, in the high-strength steel plate,
P content is equal to or less than 0.03 mass %,
S content is equal to or less than 0.01 mass %,
N content is equal to or less than 0.0100 mass %,
O content is equal to or less than 0.007 mass %,
Al content is equal to or less than 1.00 mass %, and
the balance consists of Fe and an inevitable impurity.

[3]
The spot welded joint of a high-strength steel plate according to [2], wherein the high-strength steel plate further contains at least one kind selected from a group consisting of:
Ti: 0.005 mass % to 0.10 mass %;
Nb: 0.005 mass % to 0.10 mass %; and
V: 0.005 mass % to 0.10 mass %.

[4]
The spot welded joint of a high-strength steel plate according to [2] or [3], wherein the high-strength steel plate further contains at least one kind selected from a group consisting of:
B: 0.0001 mass % to 0.01 mass %;
Cr: 0.01 mass % to 2.0 mass %;
Ni: 0.01 mass % to 2.0 mass %;
Cu: 0.01 mass % to 2.0 mass %; and
Mo: 0.01 mass % to 0.8 mass %.

[5]
The spot welded joint of a high-strength steel plate according to any one of [2] to [4], wherein the high-strength steel plate further contains at least one kind selected from a group consisting of Ca, Ce, Mg, and REM within a range of 0.0001 mass % to 0.5 mass % in total.

It should be noted that a nugget means a portion of a thin steel plate having been melted and solidified accompanying spot welding.

[6]
A spot welding method for forming a nugget in a joint surface of two or more thin steel plates,
at least one of the two or more thin steel plates being a high-strength steel plate whose tensile strength is 750 MPa to 1850 MPa and whose carbon equivalent Ceq represented by a formula (1) below being 0.22 mass % to 0.55 mass %,
the method having the steps of:
performing welding energization under a condition that a pressurizing force EF (N) of a welding electrode against the two or more thin steel plates fulfills a formula (2) below;
next, while holding the pressurizing force EF, performing post-heating energization to the welding electrode with a post-heating energization current PC (kA) fulfilling a formula (4) below prescribed with a welding current WC (kA) in the welding energization for a post-heating energization time Pt (ms) fulfilling a formula (5) below; and
next, releasing pressurizing at the pressurizing force EF,
wherein between the step of performing welding energization and the step of performing post-heating energization, the thin steel plates are cooled for a cooling time after welding Ct (ms) fulfilling a formula (3) below, while the pressurizing force EF is held, and
wherein a holding time Ht (ms) during which the pressurizing force EF is held between the step of performing post-heating energization and the step of releasing pressurizing at the pressurizing force EF fulfills a formula (6) below.

$$Ceq=[C]+[Si]/30+[Mn]/20+2[P]+4[S] \qquad (1)$$

$$1960 \times h \leq EF \leq 3430 \times h \qquad (2)$$

$$16 \leq Ct \leq 300 \qquad (3)$$

$$0.40 \times WC \leq PC \leq 0.95 \times WC \qquad (4)$$

$$30 \leq Pt \leq 200 \qquad (5)$$

$$0 \leq Ht \leq 240 \qquad (6)$$

([C], [Si], [Mn], [P], and [S] each indicate respective contents (mass %) of C, Si, Mn, P, and S, and h indicates a thickness (mm) of the thin steel plate).

[7]
A spot welding method for forming a nugget in a joint surface of two or more thin steel plates,
at least one of the two or more thin steel plates being a high-strength steel plate whose tensile strength is 750 MPa to 1850 MPa and whose carbon equivalent Ceq represented by formula (1) below is 0.22 mass % to 0.55 mass %,
the method having the steps of:
performing welding energization under a condition that a pressurizing force EF (N) of a welding electrode against the two or more thin steel plates fulfills a formula (7) below;

next, while holding the pressurizing force EF, performing post-heating energization to the welding electrode with a post-heating energization current PC (kA) fulfilling a formula (4) below prescribed with a welding current WC (kA) in the welding energization for a post-heating energization time Pt (ms) fulfilling a formula (5) below; and next, releasing pressurizing at the pressurizing force EF, wherein between the step of performing welding energization and the step of performing post-heating energization, the thin steel plates are cooled for a cooling time after welding Ct (ms) fulfilling a formula (3) below, while the pressurizing force EF is held, and wherein a holding time Ht (ms) during which the pressurizing force EF is held between the step of performing post-heating energization and the step of releasing pressurizing at the pressurizing force EF fulfills a formula (6) below.

$$Ceq=[C]+[Si]/30+[Mn]/20+2[P]+4[S] \quad (1)$$

$$16 \leq Ct \leq 300 \quad (3)$$

$$0.40 \times WC \leq PC \leq 0.95 \times WC \quad (4)$$

$$30 \leq Pt \leq 200 \quad (5)$$

$$0 \leq Ht \leq 240 \quad (6)$$

$$1470 \times h \leq EF < 1960 \times h \quad (7)$$

([C], [Si], [Mn], [P], and [S] each indicate respective contents (mass %) of C, Si, Mn, P, and S, and h indicates a 1 thickness (mm) of the thin steel plate).

[8]

The spot welding method of a high-strength steel plate according to [6] or [7], having the step of, after the step of releasing pressurizing, holding the thin steel plates at a heat treatment temperature after welding AT (° C.) fulfilling a formula (8) below for a heat treatment time after welding At (s) fulfilling a formula (9) below.

$$120 \leq AT \leq 220 \quad (8)$$

$$100 \leq At \leq 6000 \quad (9)$$

[9]

The spot welding method of a high-strength steel plate according to [8], having the step of, between the step of releasing pressurizing and the step of holding the thin steel plates at the heat treatment temperature after welding, cooling the thin steel plate thereby to reduce a surface temperature of a portion which the welding electrode of the thin steel plate having contacted to a temperature CT (° C.) fulfilling a formula (10) below.

$$CT \leq 150 \quad (10)$$

[10]

The spot welding method of a high-strength steel plate according to any one of [6] to [9], wherein the high-strength steel plate contains:

C, 0.10 mass % to 0.40 mass %;
Si: 0.01 mass % to 2.50 mass %; and
Mn: 1.5 mass % to 3.0 mass %, and
wherein, in the high-strength steel plate,
C, 0.10 mass % to 0.40 mass %;
Si: 0.01 mass % to 2.50 mass %; and
Mn: 1.5 mass % to 3.0 mass %, and
wherein, in the high-strength steel plate,
P content is equal to or less than 0.03 mass %,
S content is equal to or less than 0.01 mass %,
N content is equal to or less than 0.0100 mass %,
O content is equal to or less than 0.007 mass %,
Al content is equal to or less than 1.00 mass %, and
the balance consists of Fe and an inevitable impurity.

[11]

The spot welding method of a high-strength steel plate according to [10], wherein the high-strength steel plate further contains at least one kind selected from a group consisting of:

Ti: 0.005 mass % to 0.10 mass %;
Nb: 0.005 mass % to 0.10 mass %; and
V: 0.005 mass % to 0.10 mass %.

[12]

The spot welding method of a high-strength steel plate according to [10] or [11], wherein the high-strength steel plate further contains at least one kind selected from a group consisting of:

B: 0.0001 mass % to 0.01 mass %;
Cr: 0.01 mass % to 2.0 mass %;
Ni: 0.01 mass % to 2.0 mass %;
Cu: 0.01 mass % to 2.0 mass %; and
Mo: 0.01 mass % to 0.8 mass %.

[13]

The spot welding method of a high-strength steel plate according to any one of [10] to [12], wherein the high-strength steel plate further contains at least one kind selected from a group consisting of Ca, Ce, Mg, and REM within a range of 0.0001 mass % to 0.5 mass % in total.

It should be noted that if an automobile is produced with the above-described high-strength steel plate, the step of holding the high-strength steel plate at a heat treatment temperature after welding after release of pressurizing may be performed by paint baking among automobile production processes. In such a case, it becomes possible to further improve a property of the high-strength steel plate without newly adding a process of heat treating the high-strength steel plate. In other words, it is possible to obtain a vehicle body with a high strength without reducing productivity.

Advantageous Effects of Invention

According to the present invention, since a appearance of a nugget and a condition of each processing are controlled, an occurrence of a contraction defect or a crack in the nugget can be prevented while good workability is secured, and it is possible to obtain a highly reliable spot welded joint which has a good fracture appearance, small fluctuation of strength, and a sufficiently high joint strength.

DESCRIPTION OF EMBODIMENTS

Hereinafter, embodiments of the present invention will be described with reference to the attached drawings.

[First Embodiment]

Figure 1A:
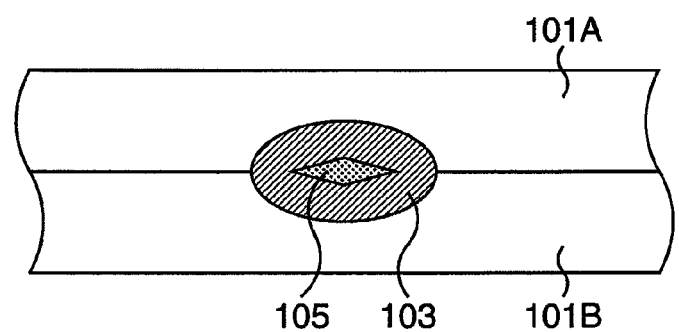
FIG. 1A is a schematic diagram illustrating a contraction defect.
Figure 1B:
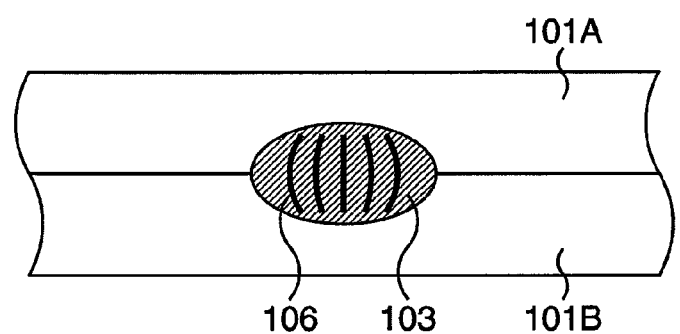
FIG. 1B is a schematic diagram illustrating a longitudinal crack.
Figure 2A:
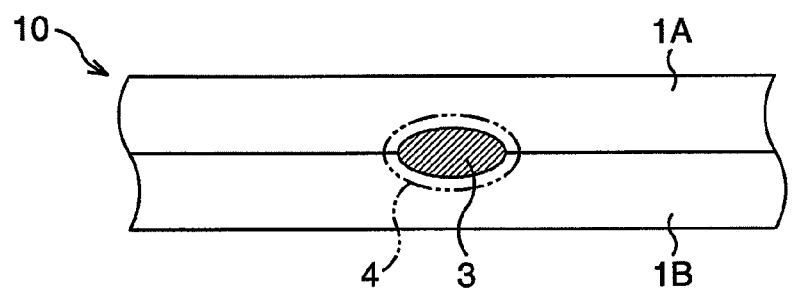
FIG. 2A is a schematic diagram illustrating a spot welded joint according to a first embodiment.

First, a first embodiment of the present invention will be described. FIG. 2A is a schematic diagram illustrating a spot welded joint according to the first embodiment.

As illustrated in FIG. 2A, in a spot welded joint 10 according to the first embodiment, two thin steel plates 1A and 1B are joined by spot welding via a nugget 3. Further, a heat-affected zone 4 exists in a periphery of the nugget 3. A tensile strength of either one or both of the thin steel plates 1A and 1B is 750 MPa to 1850 MPa, and a carbon equivalent Ceq thereof is equal to or more than 0.22 mass % to 0.55 mass %. Here, the carbon equivalent Ceq is represented by a formula (1).

$$Ceq=[C]+[Si]/30+[Mn]/20+2[P]+4[S] \quad (1)$$

([C], [Si], [Mn], [P], and [S] each represent respective contents (mass %) of C, Si, Mn, P, and S.)

Figure 2B:
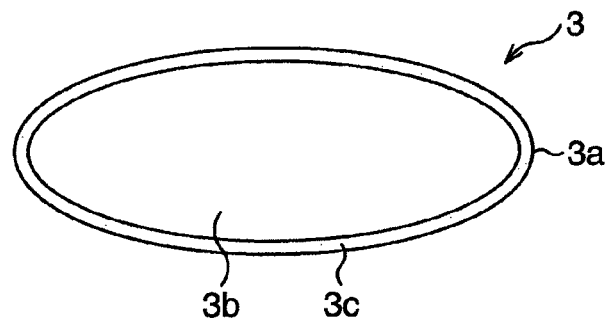
FIG. 2B is a schematic diagram illustrating a nugget outer layer zone.

Further, as illustrated in FIG. 2B, at least in a nugget outer layer zone $3c$ being a zone except a similar figure zone $3b$ which is 90% as large as an outer shape $3a$ of the nugget 3 in the nugget 3, a microstructure consists of a dendrite structure in which an average value of arm intervals is equal to or less than 12 μm, an average grain diameter of carbides contained in the microstructure is equal to or more than 5 nm and equal to or less than 100 nm, and a number density thereof is equal to or more than $2\times10^6/\text{mm}^2$.

"Microstructure of Nugget 3"

Here, a reason for limiting the microstructure of the nugget 3 will be explained.

(Average Grain Diameter of Carbides)

As described above, the average grain diameter of the carbides contained in the microstructure of the nugget 3 is 5 nm to 100 nm, at least in the nugget outer layer zone $3c$. Though the microstructure of the nugget 3 contains much martensite, which is high in strength and low in toughness, toughness is improved accompanying softening of the nugget 3 when the carbide precipitates into the microstructure of the nugget 3. If the average grain diameter of the carbides is less than 5 nm, an effect of improving the toughness of the nugget 3 is small, and on the other hand, if the average grain diameter of the carbides exceeds 100 nm, a crack occurs in the nugget 3 with a coarse carbide being an origin, and joint strength is hard to be improved and the joint strength is apt to fluctuate. Therefore, the average grain diameter of the carbides is to be 5 to 100 nm. From a view point of securing the joint strength stably even if variation of welding conditions in mass production of automobile members occurs, that is, for example, even if abrasion of an electrode tip portion or variation of clearances between plates in welding occurs, it is more preferable that an upper limit of the average grain diameter of the carbides is equal to or less than 60 nm.

(Kind of Carbide)

A kind of the carbide contained in the nugget 3 is not limited in particular, but it is preferable the carbide is iron-base carbide. This is because precipitation can be done at a low temperature. It is also possible to precipitate carbide such as Mo, Cr, Nb, Ti, V, in addition to the iron-base carbide, by high-frequency heating or normal tempering, thereby to achieve both strength and toughness of the nugget. However, in order to precipitate such alloy carbide (carbide such as Mo, Cr, Nb, Ti, or V) in steel, a heat treatment at a high temperature, at equal to or more than 500° C., for example, is necessary. This is because substitutional elements thereof are necessary to be diffused and concentrated. On the other hand, in order to precipitate iron-base carbide, it suffices if tempering at a low temperature, at less than 500° C., for example, is performed. This is because iron is a main constitutional element of steel and the iron-base carbide is precipitated only by diffusion and concentration of C in steel, and further, since C is an interstitial element, C is easy to be diffused.

(Number Density of Carbides)

As described above, in a region of a thickness of 5% of the nugget 3 from a boundary surface with the high-strength steel plate toward a center (a thickness equivalent to the nugget outer layer zone), the number density of carbides contained in the microstructure of the nugget 3 is equal to or more than $2\times10^6/\text{mm}^2$. As described above, when the carbide is precipitated into the microstructure of the nugget 3, the toughness is improved accompanying softening of the nugget 3. However, if the number density of the carbides is less than $2\times10^6/\text{mm}^2$, it is difficult to improve the toughness sufficiently. Therefore, the number density of the carbides is to be equal to or more than $2\times10^6/\text{mm}^2$. Further, the number density of the carbides is preferably equal to or more than $3\times10^6/\text{mm}^2$, and is further preferably equal to or more than $4\times10^6/\text{mm}^2$. An upper limit of the number density of the carbides is not limited, but is $1\times10^9/\text{mm}^2$, for example.

(Steel Structure of Nugget 3)

If a total volume fraction of retained austenite and fresh martensite contained in the microstructure of the nugget 3 exceeds 15%, the toughness is reduced thereby making a crack easy to occur in the nugget 3, so that a sufficiently high joint strength or toughness is hard to be obtained. Therefore, it is preferable that the total volume fraction of the retained austenite and the fresh martensite contained in the microstructure of the nugget 3 is equal to or less than 15%. Further, it is more preferable that, from a view point of suppressing deterioration of fracture appearance and securing a joint strength more stably, the total volume fraction is equal to or less than 10%, and it is further preferable that, from a view point of securing a joint strength stably even if variation of welding conditions in mass production of automobile members occurs, that is, for example, even if abrasion of an electrode tip portion or variation of clearances between plates in welding occurs, the total volume fraction is equal to or less than 5%. Other structures contained in the microstructure of the nugget 3 are not limited in particular, but it is preferable that the structure is made of tempered martensite in which carbides have been precipitated, for example, and bainite may be contained.

It should be noted that fresh martensite means martensite which does not contain carbide thereinside or in which a number density of carbides is equal to or less than $1\times10^4$/mm$^2$. In general, fresh martensite exists in a nugget formed by being cooled immediately after welding, and changes to martensite which contains carbides by a heat treatment thereafter. In particular, since a high-strength steel plate whose tensile strength is equal to or more than 750 MPa contains much Si and Mn, if cooling is performed immediately after welding without performance of a heat treatment, carbide is hard to be precipitated into the martensite generated during cooling. Further, since much C is also contained in the high-strength steel plate whose tensile strength is equal to or more than 750 MPa, a martensite transformation temperature of a nugget is low, and tempering is hard to be done during cooling. Therefore, when spot welding is performed by a conventional method, the total volume fraction of retained austenite and fresh martensite is apt to exceed 15%. On the other hand, if spot welding is performed by a method described later, the total volume fraction of retained austenite and fresh martensite can be easily made equal to or less than 15%.

It should be noted that an average grain diameter and a number density of carbides as well as a steel structure are specified by the following method, in the present invention. First, a test piece which includes a nugget is cut out from a spot welded joint, embedded in a resin or the like and polished, and then a polished surface is corroded with a nital solution. Next, observation is performed with a scanning electron microscope (SEM) or a transmission electron microscope (TEM) of magnification of 1,000 times to 100,000 times. It should be noted that since the carbide existing in the nugget is quite microscopic it is preferable to perform the observation with, in particular, an FE-SEM (field emission scanning electron microscope) or the TEM. Further, it is possible to perform observation with an optical microscope together.

With regard to the total volume fraction of the retained austenite and the fresh martensite, observation of 10 visual fields is performed at a magnification of 10,000 times with the FE-SEM, and an average value thereof is obtained. Further, with regard to the average grain diameter and the number density of the carbides, observation of 20 visual fields is performed at a magnification of 100,000 times with the TEM, and average values thereof are obtained. It should be noted that forms of most carbides are plate-shaped or needle-shaped, and grain diameters of such carbides are obtained by being converted into circle-equivalent diameters.

(Appearance of Crystal)

As described above, the microstructure of the nugget 3 consists of the dendrite structure in which an average value of arm intervals is equal to or less than 12 μm. In general, the larger the arm interval of the dendrite is, the larger a width of a segregation zone of P and S to in-between of the arms. If the average value of the arm intervals exceeds 12 μm, toughness is significantly reduced accompanying the segregation of P and S, so that a crack is apt to occur in a nugget. On the other hand, if the average value of the arm intervals is equal to or less than 12 μm, the segregation of P and S contained in the nugget is reduced and the toughness is improved, so that a crack becomes hard to occur. Further, carbide becomes easy to be precipitated in a heat treatment (tempering). Therefore, the average value of the arm intervals is to be equal to or less than 12 μm. Further, from a view point of suppressing deterioration of fracture appearance and securing joint strength more stably, it is preferable that the average value of the arm intervals is equal to or less than 10 μm. Further, from a view point of stably securing the joint strength even if variation of welding conditions in mass production of automobile members occurs, that is, for example, even if abrasion of an electrode tip portion or variation of spaces between plates in welding occurs, it is further preferable that the average value of the arm intervals is equal to or less than 8 μm.

P and S are not solid-solved in iron-base carbide, and thus, as the width of the segregation zone becomes larger, precipitation of the iron-base carbide is delayed. Therefore, in the segregation zone of P and S, even in a case that a heat treatment after welding which will be described later is performed, precipitation of the iron-base carbide in a segregation portion is suppressed. As a result, in the segregation zone, enhancement of precipitation of the carbide by the later-described heat treatment after welding and accompanying effects such as improvement of joint strength and suppression of crack in a nugget become hard to be obtained. Therefore, also from a viewpoint of narrowing the segregation zone, the average value of the arm intervals is to be equal to or less than 12 μm.

The arm interval of the dendrite structure is specified by the following method, in the present invention. First, a test piece which includes a nugget is cut out from a spot welded joint, embedded in a resin or the like, and polished. At this time, a surface perpendicular to a rolling direction is a surface to be polished. Next, with a solution composed of picric acid saturated aqueous solution and a surface active agent, the solution described in "Iron and Steel, Vol. 61, No. 6, p110, 1975", the dendrite structure is made noticeable. Then, the dendrite structure having made noticeable is subjected to observation of 10 visual fields at a magnification of 1,000 times with an optical microscope, thereby to obtain an average value thereof. However, cooling speeds are different in a vicinity of an outer shell and a center portion in a nugget, and arms of dendrite having grown from various directions collide in the center portion, and thus it is sometimes difficult to measure arm intervals accurately.

(Range of Specifying Appearance of Crystal and Average Grain Diameter and Number Density of Carbides)

Ranges to prescribe an appearance of a crystal and an average grain diameter and a number density of carbides are specified is the nugget outer layer zone 3c being a zone except a similar figure zone 3b which is 90% as large as an outer shape 3a of the nugget 3 in the nugget 3. Though it is not easy to uniformize the microstructure of the nugget 3, the peripheral portion rather than the center potion of the nugget 3 is apt to contribute to the joint strength. The present inventors have confirmed that, experimentally, at least, if the appearance of the crystal and the average grain diameter as well as the number density in the nugget outer layer zone 3c are within the above-described number ranges, an effect of the present invention can be obtained.

"Characteristic of High-strength Steel Plate"

Next, a reason for limiting the characteristic of the high-strength steel plate will be described.

(Tensile Strength)

As described above, the tensile strength of the high-strength steel plate is 750 MPa to 1850 MPa. In general, as a tensile strength of a high-strength steel plate increases, a load working on a spot welded joint becomes large, and further, stress concentration in the welded portion is also heightened, and thus a high joint strength is required. However, though a cross tensile strength of a spot welded joint increases in proportion to a strength in a steel plate on the order of 590 to 780 MPa, in a steel plate having a strength of equal to or more than that, a cross tensile strength is decreased, on the contrary. When a tensile strength of the high-strength steel plate is as low as less than 750 MPa, a value of cross tensile strength is high from the beginning and a load to the spot welded joint is small, and thus deterioration of fracture appearance of the spot welded joint or a problem concerning the joint strength is hard to occur. Therefore, the tensile strength of the high-strength steel plate is to be equal to or more than 750 MPa. On the other hand, if the tensile strength of the high-strength steel plate exceeds 1850 MPa, suppression of deterioration of fracture appearance of the spot welded joint and accompanying reduction or fluctuation of the joint strength becomes difficult, and suppression of defect or crack in the nugget also becomes difficult. Therefore, the tensile strength of the high-strength steel plate is to be equal to or less than 1850 MPa.

(Carbon Equivalent Ceq)

As described above, the carbon equivalent Ceq represented by the following formula (1) of the high-strength steel plate is 0.22 mass % to 0.55 mass %.

$$Ceq=[C]+[Si]/30+[Mn]/20+2[P]+4[S] \quad (1)$$

([C], [Si], [Mn], [P], and [S] each represent respective contents (mass %) of C, Si, Mn, P, and S).

When the carbon equivalent Ceq exceeds 0.55 mass %, concurrent therewith, hardness of the nugget 3 and the heat-affected zone in its periphery are increased, and increase of a segregation amount is brought about. Then, because of the above, ductility and toughness of the nugget 3 is reduced, so that a crack occurs in the nugget 3 or the fracture appearance is deteriorated. Further, reduction and fluctuation of joint strength occur accompanying deterioration of fracture appearance. On the other hand, when the carbon equivalent Ceq is less than 0.22 mass %, a problem concerning the fracture appearance and the joint strength of the spot welded joint is hard to occur.

(Composition of Chemical Components)

A composition of chemical components constituting the high-strength steel plate is not particularly limited as long as the above-described carbon equivalent Ceq is within the predetermined range, but it is preferable that the composition is as follows.

{C, 0.10 Mass % to 0.40 Mass %}

C is a strengthening element, and improves tensile strength of steel. Further, the higher a C content of steel is, the higher a C content of a nugget becomes, and a driving force of precipitation of a carbide in tempering increases thereby to enhance precipitation of the carbide. However, if the C content is less than 0.10 mass %, it is hard to obtain a tensile strength of equal to or more than 750 MPs and it is hard to precipitate the carbide sufficiently. Further, if the C content exceeds 0.40 mass %, processability of a high-strength steel plate is apt to be reduced. Therefore, it is preferable that the C content is 0.10 mass % to 0.40 mass %.

{Si: 0.01 Mass % to 2.50 Mass %}

Si is a strengthening element and heightens strength of steel due to solid solution strengthening and structure strengthening. However, if an Si content exceeds 2.50 mass %, processability of steel is apt to be reduced. Further, it is difficult to make the Si content less than 0.01 mass % industrially. Therefore, it is preferable that the Si content is 0.01 mass % to 2.50 mass %.

{Mn: 1.5 Mass % to 3.0 Mass %}

Mn heightens strength of steel. However, if a Mn content exceeds 3.0 mass %, formability is apt to deteriorate. On the other hand, if the Mn content is less than 1.5 mass %, it is difficult to obtain tensile strength of equal to or more than 750 MPa. Therefore, it is preferable that the Mn content is 1.5 mass % to 3.0 mass %.

{P: Equal to or Less than 0.03 Mass %}

P embrittles a nugget. If a P content exceeds 0.03 mass %, a crack in a nugget is apt to occur and sufficient joint strength is hard to be obtained. Therefore, it is preferable that the P content is equal to or less than 0.03 mass %. It should be noted that making the P content less than 0.001 mass % leads to cost increase, and is not preferable.

{S: Equal to or Less than 0.01 Mass %}

S embrittles a nugget. Further, S is bonded to Mn to form coarse MnS, thereby reducing processability. If a S content exceeds 0.01 mass %, a crack in a nugget is apt to occur and sufficient joint strength is hard to be obtained. Further, reduction of processability tends to become prominent. Therefore, it is preferable that the S content is equal to or less than 0.01 mass %. It should be noted that making the S content less than 0.0001 mass % leads to cost increase and is not preferable.

{N: Equal to or Less than 0.0100 Mass %}

N forms a coarse nitride and deteriorates formability. Further, N causes to generate a blowhole in welding. If a N content exceeds 0.0100 mass %, such a tendency becomes prominent. Therefore, it is preferable that the N content is equal to or less than 0.0100 mass %. It should be noted that making the N content less than 0.0005 mass % leads to cost increase and is not preferable.

{O: equal to or less than 0.007 mass %}

O forms an oxide and deteriorates formability. If an O content exceeds 0.007 mass %, such a tendency becomes prominent. Therefore, it is preferable that the O content is equal to or less than 0.007 mass %. It should be noted that making the O content less than 0.0005 mass % leads to cost increase and is not preferable.

{Al: Equal to or Less than 1.00 Mass %}

Al is a ferrite stabilizing element and suppresses precipitation of cementite. Thus, Al is contained in order for control of a steel structure. Further, Al also functions as a deoxidizer. On the other hand, Al is apt to be oxidized quite easily, and if an Al content exceeds 1.00 mass %, inclusions increases and formability becomes apt to be reduced. Therefore, it is preferable that the Al content is equal to or less than 1.00%.

A high-strength steel plate can selectively contain elements indicated below as necessary, other than the above-described basic components.

{Ti: 0.005 Mass % to 0.10 Mass %}
{Nb: 0.005 Mass % to 0.10 Mass %}
{V: 0.005 Mass % to 0.10 Mass %}

Ti, Nb, and V are strengthening elements for steel. Those elements contribute to rise of strength of steel due to precipitation strengthening, fine grain strengthening by suppression of growth of a ferrite crystal grain, and dislocation strengthening by suppression of recrystallization. However, if contents of these elements are less than 0.005 mass %, the above-described effect is small. On the other hand, if the contents of these elements exceed 0.10 mass %, formability is apt to deteriorate. Therefore, it is preferable that the contents of these elements are 0.005 mass % to 0.10 mass %.

{B: 0.0001 Mass % to 0.01 Mass %}

B strengthens steel by control of a steel structure. However, if a B content is less than 0.0001 mass %, it is hard to improve strength sufficiently. On the other hand, if the B content exceeds 0.01 mass %, the above-described effect is saturated. Therefore, it is preferable that the B content is 0.0001 mass % to 0.01 mass %.

{Cr: 0.01 Mass % to 2.0 Mass %}
{Ni: 0.01 Mass % to 2.0 Mass %}
{Cu: 0.01 Mass % to 2.0 Mass %}
{Mo: 0.01 Mass % to 0.8 Mass %}

Cr, Ni, Cu, and Mo are elements which contribute to improvement of strength of steel, and can be used in place of part of Mn, for example. However, if contents of these elements are less than 0.01 mass %, the strength cannot be improved sufficiently.

Therefore, it is preferable that the contents of these elements are equal to or more than 0.01 mass %. On the other hand, if the contents of Cr, Ni, and Cu exceed 2.0 mass % and if the Mo content exceeds 0.8 mass %, obstacles sometimes occur in acid cleaning or hot working. Therefore, it is preferable that the contents of Cr, Ni, and Cu are equal to or less than 2.0 mass % and it is preferable that the Mo content is equal to or less than 0.8 mass %.

{At Least One Kind Selected from a Group Consisting of Ca, Ce, Mg, and REM (Rare Earth Metal): In Total, 0.0001 Mass % to 0.5 Mass %}

Ca, Ce, Mg, and REM can reduce a size of an oxide after deoxidation or a size of nitride existing in a hot-rolled steel plate, and contribute to improvement of formability. However, if their contents are less than 0.0001 mass % in total, the above-described effect is small. On the other hand, if their contents exceed 0.5 mass % in total, forming processability is apt to be reduced. Therefore, it is preferable that the contents of these elements are within a range of 0.0001 mass % to 0.5 mass % in total. It should be noted that REM is an element which belongs to a lanthanoid series, and REM and Ce may be added as misch metals to molten steel in a stage of steel making. Further, other than La and Ce, elements of the lanthanoid series may be contained compositely.

(Steel Type)

A steel type of a high-strength steel plate is not limited in particular. The steel type of the high-strength steel plate can be any type of steel type such as, for example, a dual phase structure type (for example, a structure containing martensite in ferrite, a structure containing bainite in ferrite), a strain induced transformation type (a structure containing retained austenite in ferrite), a quenching type (a martensite structure), a fine crystal type (a ferrite base structure), and the like. In the high-strength steel plate composed of whichever steel type, a fracture appearance is made to be good and reduction and fluctuation of joint strength can be suppressed.

(Plating)

A plating layer may be formed on a surface of the high-strength steel plate. As kinds of the plating layer, there may be cited, for example, a Zn series, a Zn—Fe series, a Zn—Ni series, a Zn—Al series, a Zn—Mg series, a Pb—Sn series, a Sn—Zn series, an Al—Si series, and the like. As the high-strength steel plate having a Zn series plating layer, there may be cited, for example, an alloyed hot-dip galvanized steel plate, a hot-dip galvanized steel plate, an electrogalvanized steel plate, and the like. When the plating layer is formed on the surface of the high-strength steel plate, the spot welded joint 10 exhibits a superior corrosion resistance. If the plating layer is a galvanized layer alloyed on a surface of a high-strength steel plate, particularly superior corrosion resistance can be obtained and adhesion of a coating material becomes good.

Though a coating amount of a plating layer is not limited in particular, either, but it is preferable that a coating amount of a single surface is equal to or less than 100 g/m$^2$. It is because if the coating amount of plating for the single surface exceeds 100 g/m$^2$ the plating layer sometimes becomes an obstacle in welding. The plating layer may be formed in a single surface or in both surfaces. It should be noted that a film (for example, a lubricant film or the like) or the like of an inorganic series or an organic series can be formed on a surface layer of the plating layer.

(Thickness of High-strength Steel Plate)

A thickness of a high-strength steel plate is not limited in particular. For example, a thickness of a high-strength steel plate used in general for a vehicle body of an automobile (0.5 mm to 3.2 mm) suffices. However, since stress concentration in a periphery of a nugget is increased accompanying increase of a thickness of a high-strength steel plate, it is preferable that the thickness of the high-strength steel plate is equal to or less than 2.0 mm.

Further, the thin steel plates 1A and 1B may be high-strength steel plates whose steel types are different from each other, and either one of the thin steel plates 1A and 1B may be a mild steel plate. Further, thicknesses thereof may be different from each other. Further, three or more high-strength steel plates may be joined by spot welding, and one(s) of them may be a mild steel plate. In general, a thickness of a thin steel plate is equal to or less than 6 mm.

According to the spot welded joint 10 according to the first embodiment as above, even in the high-strength steel plate of 750 MPa to 1850 MPa, the joint strength can be improved and it is also possible to reduce the fluctuation of joint strength sufficiently. Further, the fracture appearance of the nugget 3 becomes good. Therefore, high reliability can be obtained in the spot welded joint. For example, an average value of cross tensile strengths (n=5) of a spot welded joint prescribed in JIS Z 3137 is, even in the above-described high-strength steel plate, equal to or more than cross tensile strength of 270 MPa grade IF (interstitial free) steel. Further, a minimum value of the above-described cross tensile strengths (n=5) becomes equal to or more than 0.85 times the average value. In other words, fluctuation of cross tensile strength (n=5) is suppressed.

[Second Embodiment]

Next, a second embodiment of the present invention will be described. The second embodiment is a method for performing spot welding of the above-described steel plates 1A and 1B, and FIG. 3A to FIG. 3C are schematic diagrams illustrating a spot welding method according to the second embodiment.

Figure 3A:
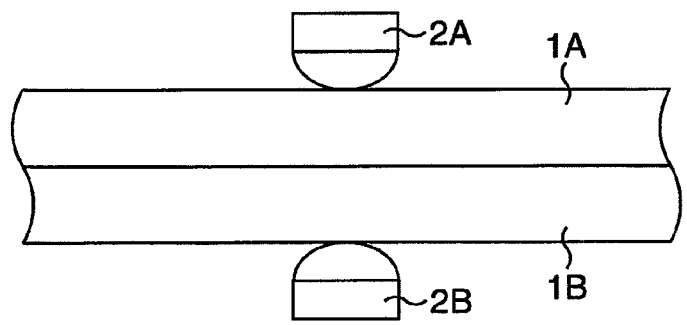
FIG. 3A is a schematic diagram illustrating a spot welding method according to a second embodiment.
Figure 3B:
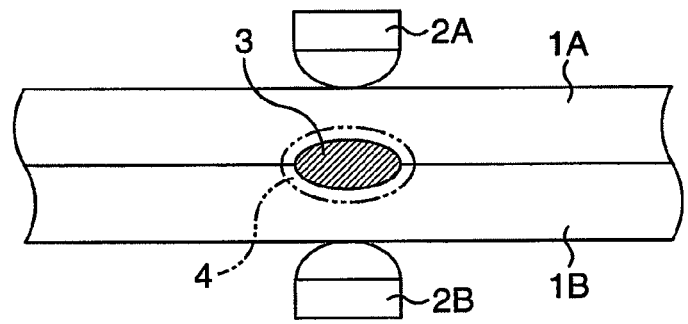
FIG. 3B is a schematic diagram, continued from FIG. 3A, illustrating the spot welding method in order of processes.
Figure 3C:
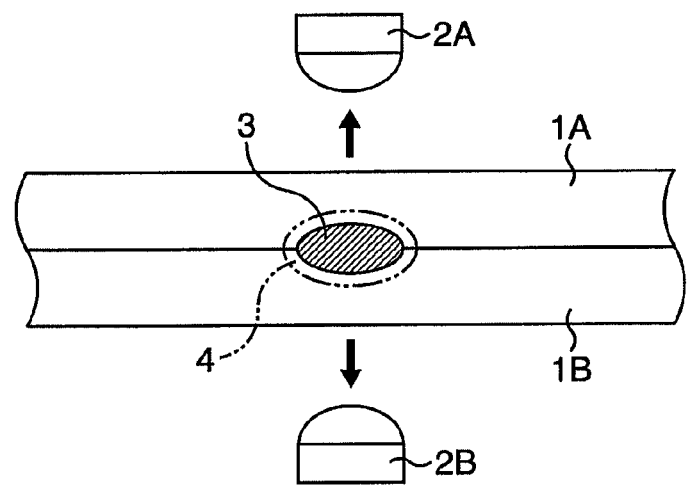
FIG. 3C is a schematic diagram, continued from FIG. 3B, illustrating the spot welding method in order of processes.

In the second embodiment, first, as illustrated in FIG. 3A, two thin steel plates 1A, 1B being materials to be welded are overlapped each other. Then, while pressing welding electrodes 2A, 2B made of a copper alloy, for example, from both sides in relation to an overlapped portion of the thin steel plates 1A, 1B, that is, in a manner to sandwich from upper and lower directions in an example illustrated in FIG. 3A, predetermined energization is performed. The above energization includes welding energization and post-heating energization, details being described later. Then, as a result of such predetermined energization, a portion in which metal is melted is formed between the two thin steel plates 1A, 1B. The portion in which the metal is melted is rapidly cooled to solidify by heat removal by the water-cooled welding electrodes 2A, 2B and heat conduction to the thin steel plates 1A, 1B, after energization is finished. Consequently, as illustrated in FIG. 3B, a nugget (a nugget portion) 3 whose cross-sectional shape is almost elliptical, for example, is formed between the two thin steel plates 1A, 1B. Subsequently, pressing of the welding electrodes 2A, 2B to the thin steel plates 1A, 1B is released, and as illustrated in FIG.

3C, the welding electrodes 2A, 2B are separated from the thin steel plates 1A, 1B. As a result that the aforementioned nugget 3 is formed, two thin steel plates 1A, 1B are welded.

More specifically, welding energization is performed under a condition that a pressurizing force EF (N) of the welding electrodes 2A and 2B against the thin steel plates 1A and 1B fulfils a formula (2) below. Next, while the pressurizing force EF is held, post-heating energization is performed to the welding electrodes 2A and 2B with a post-heating energization current PC (kA) fulfilling a formula (4) below prescribed with a welding current WC (kA) in welding energization for a post-heating energization time Pt (ms) fulfilling a formula (5) below. Next, pressurizing at the pressurizing force FF is released. Further, between performing of welding energization and performing of post-heating energization, the thin steel plates 1A and 1B are cooled for a cooling time after welding Ct (ms) fulfilling a formula (3) below, while the pressurizing force EF is held. Further, a holding time Ht (ms) for which the pressurizing force EF is held from finishing of post-heating energization until releasing of pressurizing at the pressurizing force EF is made to fulfill a formula (6) below.

$$Ceq=[C]+[Si]/30+[Mn]/20+2[P]+4[S] \quad (1)$$

$$1960 \times h \leq EF \leq 3430 \times h \quad (2)$$

$$16 \leq Ct \leq 300 \quad (3)$$

$$0.40 \times WC \leq PC \leq 0.95 \times WC \quad (4)$$

$$30 \leq Pt \leq 200 \quad (5)$$

$$0 \leq Ht \leq 240 \quad (6)$$

([C], [Si], [Mn], [P], and [S] each indicate respective contents (mass %) of C, Si, Mn, P, and S, and h indicates a thickness (mm) of the thin steel plates 1A and 1B).

When such spot welding is performed, there can be obtained effects such as improvement of fracture appearance in the nugget 3, and accompanying improvement of joint strength and reduction of fluctuation of joint strength, and suppression of occurrence of a defect and a crack in the nugget 3. Accordingly, reliability can be improved.

As described above, tensile strength of either one or both of the thin steel plates 1A and 1B being the materials to be welded is 750 MPa to 1850 MPa, and a carbon equivalent Ceq thereof is 0.2 mass % to 0.55 mass %. Therefore, if spot welding is performed by a conventional method, martensite, which is hard and whose toughness is low, is formed in a nugget and a heat-affected zone, so that stress concentration is apt to occur in the nugget. Then, those cause deterioration of fracture appearance of a spot welded joint, reduction and fluctuation of joint strength, and so on. In contrast, in the second embodiment, details being described later, since conditions of spot welding are prescribed properly, effects such as improvement of fracture appearance, and accompanying improvement of joint strength and reduction of fluctuation of joint strength can be obtained, and it is possible to improve reliability.

"Conditions of Spot Welding"

Figure 4:
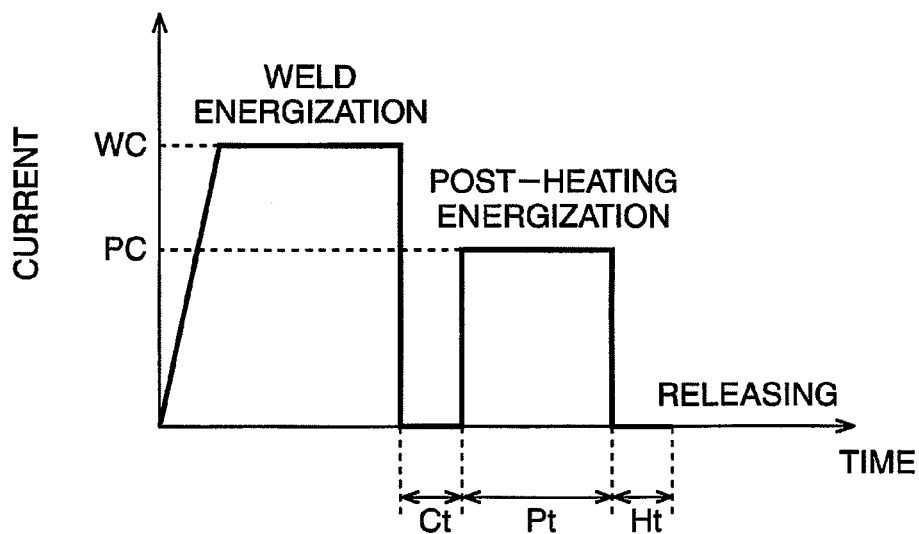
FIG. 4 is a diagram illustrating an example of an energization pattern of a current made flow between welding electrodes.

Here, a reason for limiting conditions of spot welding will be described. FIG. 4 is a diagram illustrating an example of an energization pattern of a current made to flow between the welding electrodes 2A and 2B. A vertical axis of a graph shown in FIG. 4 indicates a current (I), while a horizontal axis indicates a time (t).

In this example of energization pattern, after welding energization with a welding current WC while a pressurizing force is applied is finished, energization is completely halted and cooling for a cooling time after welding Ct is performed. Subsequently, post-heating energization for a post-heating energization time Pt is performed with a post-heating energization current PC which is lower than the welding current WC. Then, after energization of post-heating energization is finished, the welding electrodes 2A and 2B are separated from the thin steel plates 1A and 1B at a time that a holding time Ht has passed, and the pressurizing force is released.

It should be noted that a start-up pattern of the current (I) at a time that welding energization is started may be an up slope (a current is gradually raised) pattern illustrated in FIG. 4, and also may be a pattern of raising the current instantly to the welding current WC without providing such an up slope pattern.

(Pressurizing Force of Welding Electrodes 2A, 2B against Thin Steel Plates 1A, 1B: EF)

In the second embodiment, the pressurizing force EF (N) is prescribed within a range represented by the formula (2) below.

$$1960 \times h \leq EF \leq 3430 \times h \quad (2)$$

Note that in the above formula (2), h indicates the thickness (mm) of the thin steel plates 1A and 1B.

The pressurizing force EF of the welding electrodes 2A, 2B significantly influences an occurrence of a defect or a crack in the nugget 3. If the pressurizing force EF is less than "1960×h" (N), suppression of occurrence of the defect and the crack in the nugget 3 becomes difficult, and effects such as improvement of fracture appearance, and accompanying improvement of joint strength and reduction of fluctuation of joint strength are hard to be obtained. On the other hand, if the pressurizing force EF exceeds "3430×h" (N), a recess of a portion which the welding electrodes 2A, 2B contact becomes large, not only harming an exterior appearance but also leading to reduction of joint strength. Further, in order to generate a pressurizing force EF higher than "3430×h" (N), a robot arm with a high stiffness is required as a welding gun (an apparatus which applies a pressurizing force to the welding electrodes 2A, 2B and which supports them to perform energization). Therefore, in the second embodiment, the pressurizing force EF is to be equal to or more than "1960×h" (N) and equal to or less than "3430×h" (N).

It should be noted that if tip portion diameters of the welding electrodes 2A, 2B become too large surface pressures at the tip portion are reduced and the above-described effect becomes hard to be obtained. Therefore, as the welding electrodes 2A, 2B, it is preferable that ones whose tip portion diameters are about 6 mm to 8 mm are used.

Further, if the thicknesses of the thin steel plates 1A and 1B are different from each other, an average value thereof may be used as "h" in the formula (2). Further, if spot welding of three or more thin steel plates is performed, a sum of thicknesses of all the thin steel plates are calculated, and a value obtained by dividing the sum can be used as "h" in the formula (2).

It should be noted that neither the welding current WC nor the energization time are limited in particular, and may be similar to a current value and an energization time which have been adopted conventionally in a method for resistance spot welding thin steel plate, for example.

Further, as equipment used for a series of spot welding, conventional equipment commonly used may be used as it is. Further, with regard to welding electrodes 2A, 2B and the like, it is possible to use ones with configuration having been conventionally used. A power supply is not limited in particular, either, and an alternating current, a direct current inverter, an alternating current inverter, or the like may be used.

(Cooling Time: Ct)

In the second embodiment, the cooling time Ct (ms) immediately after spot welding is prescribed within a range represented by the formula (3) below.

$$16 \leq Ct \leq 300 \quad (3)$$

The cooling time Ct immediately after welding significantly influences a dendrite structure (a distance between dendrites) and a segregation state of the nugget 3. If the cooling time Ct is less than 16 ms, effects such as improvement of fracture appearance, and accompanying improvement of joint strength and reduction of fluctuation of joint strength cannot be obtained. Further, if the cooling time Ct exceeds 300 ms, a temperature is reduced so much that the above-described effects become smaller and productivity is reduced. Therefore, the cooling time Ct is to be equal to or more than 16 ms and equal to or less than 300 ms. In order to avoid reduction of productivity as much as possible, it is desirable that the cooling time Ct is within a range of equal to or more than 16 ms and equal to or less than 300 ms.

(Post-Heating Energization Current: PC)

In the second embodiment, the post-heating energization current PC (kA) after the welding is prescribed within a range represented by the formula (4) below.

$$0.40 \times WC \leq PC \leq 0.95 \times WC \quad (4)$$

Note that in the above formula (4) WC indicates the welding current (kA).

The post-heating energization current PC significantly influences structures of a nugget and a heat affected zone as well as a segregation state. If the post-heating energization current PC is less than "0.40×WC" (kA), effects such as improvement of fracture appearance, and accompanying improvement of joint strength and reduction of fluctuation of joint strength cannot be obtained. Further, also in a case that the post-heating energization current PC exceeds "0.95×WC" (kA), the above-described effect cannot be obtained. Therefore, the post-heating energization current PC is to be equal to or more than "0.40×WC" (kA) and equal to or less than "0.95×WC" (kA). Further, it is preferable that the post-heating energization current PC is equal to or more than "0.70×WC" (kA) and equal to or less than "0.85×WC" (kA). It is because the above-described effects are exhibited prominently.

(Post-Heating Energization Time: Pt)

In the second embodiment, the post-heating energization time Pt (ms) after the welding is prescribed within a range represented by the formula (5) below.

$$30 \leq Pt \leq 200 \quad (5)$$

The post-heating energization time Pt, similarly to the above-described post-heating energization current PC, significantly influences the structures of the nugget or the heat affected zone as well as the segregation state. If the post-heating energization time Pt is less than 30 ms, effects such as improvement of fracture appearance, and accompanying improvement of joint strength and reduction of fluctuation of joint strength cannot be obtained. Further, if the post-heating energization time Pt exceeds 200 ms, the above-described effects become smaller and productivity is reduced. Therefore, the post-heating energization time Pt is to be equal to or more than 30 ms and equal to or less than 200 ms. Further, it is preferable that the post-heating energization time Pt is equal to or more than 40 ms and equal to or less than 200 ms. It is because the above-described effects are exhibited prominently.

By setting the cooling time Ct immediately after the energization with the welding current WC, the post-heating energization current PC, and the post-heating energization time Pt to the above-described conditions, a generation of a large inclusion in the nugget can be reduced. Thereby, an occurrence of a brittle fracture surface whose origin is the inclusion can be suppressed, and thus effects such as improvement of fracture appearance, and accompanying improvement of joint strength and reduction of fluctuation of joint strength can be stably obtained.

(Holding Time: Ht)

A holding time Ht (ms) for which the thin steel plates 1A, 1B are pressure-held by the welding electrodes 2A, 2B after the post-heating energization is performed under the above-described conditions is prescribed within a range represented by the formula (6) below.

$$0 \leq Ht \leq 240 \quad (6)$$

It should be noted that a pressurizing force EF (N) at a time that the thin steel plates 1A, 1B are pressure-held by the welding electrodes 2A, 2B for the holding time Ht within the above-described range is within the range represented by the formula (2) above, for example.

The holding time Ht significantly influences structures of a nugget and a heat-affected zone and an occurrence of a defect or a crack in the nugget 3. If the holding time Ht exceeds 240 ms, effects such as improvement of fracture appearance, and accompanying improvement of joint strength and reduction of fluctuation of joint strength become small, and productivity is reduced. This is because a time necessary until start of air-cooling accompanying releasing of the welding electrodes 2A, 2B becomes longer. Therefore, the holding time Ht is to be equal to or less than 240 ms. Further, in order to start air-cooling early and obtain the above-described effects stably, it is desirable that the holding time Ht is short, and it is preferable that the holding time Ht is equal to or more than 0 ms and equal to or less than 100 ms, in particular. In the energization pattern of the present invention shown in FIG. 4, since a temperature of the nugget decreases also during the post-heating energization, a contraction defect or a crack is hard to occur even if the holding time Ht is shortened. Therefore, if it is possible to separate the welding electrodes 2A and 2B from the thin steel plates 1A, 1B immediately, the holding time Ht may be 0 ms. It should be noted that the holding time described above is an actual holding time, but in an existing welding machine, delay occurring in an operation of a welding gun, it is general that the actual holding time is longer than a holding time having been set. Therefore, it may be necessary to take the above into consideration.

[Third Embodiment]

Next, a third embodiment will be described. In the third embodiment, except that welding energization is performed under a condition that a pressurizing force EF (N) of welding electrodes 2A and 2B against thin steel plates 1A and 1B fulfils a formula (7) below, similar processings as those of the second embodiment are performed.

$$1470 \times h \leq EF < 1960 \times h \quad (7)$$

As described above, if the pressurizing force EF is less than "1960×h" (N), it becomes difficult to suppress an occurrence of a defect or a crack in a nugget 3, and thus when a thickness or strength of a steel plate increases, a defect or a crack sometimes occur. On the other hand, if the pressurizing force EF is less than "1960×h" (N), an effect that joint strength in a peel direction is increased prominently can be obtained. This is for the following reasons. In other words, as the pressurizing force EF is reduced, heat removal from welding electrodes 2A, 2B is reduced and penetration (a nugget thickness) is increased. Thus, a softened area in a heat-affected zone is increased, which facilitates transformation of a spot welded joint when a stress to cause transformation in a high-strength steel plate in actual use, tensile test, or the like works. Consequently, stress concentration in an end portion of a nugget is alleviated. However, if the pressurizing force EF is less than "1470×h" (N), occurrence of a defect and a crack in a nugget 3 becomes prominent, and effects such as improvement of fracture appearance, and accompanying improvement of joint strength and reduction of fluctuation of joint strength cannot be obtained. Further, if the pressurizing force EF exceeds "1960×h" (N), the effect that the joint strength in the peel direction increases prominently is hard to be obtained. Therefore, in the third embodiment, the pressurizing force EF is to be equal to or more than "1470×h" (N) and less than "1690×h" (N).

[Fourth Embodiment]

Next, a fourth embodiment will be described. In the fourth embodiment, after the processings of the second or the third embodiment are performed, that is, after pressure-holding by welding electrodes 2A, 2B is released, a heat treatment after welding is performed. A temperature of the heat treatment after welding (a heat treatment temperature after welding AT) fulfills a formula (8) below, and a time of the heat treatment after welding (a heat treatment time after welding At) fulfills a formula (9) below.

$$120 \leq AT \leq 220 \tag{8}$$

$$100 \leq At \leq 6000 \tag{9}$$

(Heat Treatment Temperature After Welding: AT)

In the fourth embodiment, the heat treatment temperature after welding AT (° C.) is prescribed within a range represented by the formula (8) below.

$$120 \leq AT \leq 220 \tag{8}$$

Since a microstructure of a nugget 3 after release from pressure-holding is constituted mainly of martensite which does not contain carbide, hardness of the nugget 3 is high but toughness thereof is low. Hence, it is possible to improve the toughness of the nugget 3 as a result that carbides are precipitated by performing a proper heat treatment after welding. Then, the heat treatment temperature after welding AT significantly contributes to improving toughness of the nugget 3 and the heat-affected zone due to decomposition of martensite. If the heat treatment temperature after welding AT is less than 120° C., decomposition of martensite is insufficient, and thus effects such as improvement of fracture appearance, accompanying improvement of joint strength and reduction of fluctuation of joint strength are hard to be obtained. Further, if the heat treatment temperature after welding AT exceeds 220° C., the above-described effect is hard to be obtained, and hardness of the nugget 3 is reduced excessively, making a peel and fracture in the nugget 3 apt to occur. Therefore, the heat treatment temperature after welding AT is to be equal to or more than 120° C. and equal to or less than 220° C. Further, it is preferable that the heat, treatment temperature after welding AT is equal to or more than 140° C. and equal to or less than 200° C. It is because the above-described effects are exhibited prominently.

In general, when a heat treatment at equal to or more than 400° C. is performed to a base material of a high-strength steel plate, a base material structure is influenced and a problem such that a base material property is reduced sometimes occurs. In the fourth embodiment, since the heat treatment after welding is performed with the heat treatment temperature after welding AT being within the range of 120 to 220° C., there can be obtained effects that a negative influence due to the heat treatment is not exerted on the base material structure of the high-strength steel plate and that a mechanical property is not deteriorated.

(Heat Treatment Time After Welding: At)

In the fourth embodiment, the heat treatment time after welding At (sec) is prescribed within a range represented by the formula (9) below.

$$100 \leq At \leq 6000 \tag{9}$$

If the heat treatment time after welding At is less than 100 seconds, decomposition of martensite is insufficient, and thus effects such as improvement of fracture appearance, accompanying improvement of joint strength and reduction of fluctuation of joint strength are hard to be obtained. Further, if the heat treatment time after welding At exceeds 6000 seconds, the above-described effect is hard to be obtained, and productivity is reduced. Therefore, the heat treatment time after welding At is to be equal to or more than 100 seconds and equal to or less than 6000 seconds. Setting the heat treatment time after welding At to be within the above-described range enables securing toughness with hardly reducing hardness of a nugget 3. Further, it is preferable that the heat treatment time after welding At is equal to or less than 3600 seconds (1 hour), and it is more preferable that the heat treatment time after welding At is equal to or more than 600 seconds and equal to or less than 2400 seconds.

By performing a heat treatment after welding under the above-described condition, toughness of the nugget 3 and the heat-affected zone can be improved, and effects such as improvement of fracture appearance, and accompanying improvement of joint strength and reduction of fluctuation of joint strength become prominent.

Further, by performing a heat treatment under the above-described conditions of the heat treatment temperature after welding AT and the heat treatment time after welding At, occurrence of a brittle fracture surface whose origin is an inclusion can be suppressed. Therefore, the effects such as improvement of fracture appearance, and accompanying improvement of joint strength and reduction of fluctuation of joint strength can be stably obtained.

It should be noted that a method for a heat treatment after welding is not limited in particular and, for example, furnace heating, burner heating, high-frequency heating, and the like may be performed. Further, a paint baking (bake hard) treatment and the like may be performed.

Usually, when a high-strength steel plate whose carbon equivalent Ceq, carbon amount in particular, is high is spot welded, Vickers hardness Hv of the nugget 3 and the heat-affected zone are often equal to or more than 400 before a heat treatment. In the fourth embodiment, it is more preferable to control a condition of the heat treatment after welding so that a reduced value ΔHv of the Vickers harness accompanying the heat treatment after welding becomes equal to or less than 50. It should be noted that, in a high-strength steel plate whose carbon equivalent Ceq is high, Vickers hardness Hv of the nugget 3 and the heat-affected zone are sometimes equal to or more than 500. In such a case, it is preferable to control a condition of the heat treatment after welding so that a reduced value ΔHv of the Vickers hardness becomes about 50 to 150. By such control of the condition, effects such as improvement of fracture appearance, and accompanying improvement of joint strength and reduction of fluctuation of joint strength can be made prominent.

Further, in the fourth embodiment, it is preferable that a condition of the heat treatment after welding is properly controlled so that structures of the nugget 3 and the heat-affected zone are changed by the heat treatment from ones which contain fresh martensite to ones which do not contain fresh martensite. In other words, the structure before the heat treatment contains fresh martensite, and further contains tempered martensite and/or lower bainite. It is preferable that the heat treatment condition is controlled so that such a structure can be constituted of tempered martensite and/or lower bainite without containing fresh martensite. By making the structures of the nugget 3 and the heat affected zone be a structures described above, the above-described effects can be obtained prominently.

Here, when tempered martensite is generated in the structures of the nugget 3 and the heat-affected zone, the arm interval (the distance between dendrites) of the dendrite structure becomes short and a small amount of carbide is precipitated. In the fourth embodiment, since the heat treatment after welding is performed under the above-described condition, there can be obtained an effect that occurrence of fluctuation of strength in welding is suppressed even if a high-strength steel plate with a high carbon content is spot welded.

It should be noted that even if a tensile strength of a high-strength steel plate is less than 700 MPs, a microstructure of the formed nugget 3 is mainly martensite which does not contain carbide, and thus it is possible to precipitate the carbide to improve toughness of the nugget 3 by a heat treatment after welding.

[Fifth Embodiment]

Next, a fifth embodiment will be described. In the fifth embodiment, proper cooling is performed after processings of the second or third embodiment are performed, that is, after pressure-holding by welding electrodes 2A, 2B is released, by the time the heat treatment after welding of the fourth embodiment is performed.

(Surface Temperature of Welded Portion after Welding: CT)

In the fifth embodiment, after pressure-holding by the welding electrodes 2A, 2B is released, thin steel plates 1A, 1B are cooled, and thereby a surface temperature of a welded portion is reduced to a temperature CT fulfilling a formula (10) below.

$$CT \leq 150 \quad (10)$$

Then, after such cooling is performed, the heat treatment after welding is performed similarly to in the fourth embodiment. If the surface temperature CT which has decreased by the time that the heat treatment after welding is performed of the welded portion after welding exceeds 150° C., the heat treatment after welding is to be started before martensite transformation is completely finished. Thus, even if the heat treatment after welding is performed, effects such as improvement of fracture appearance, and accompanying improvement of joint strength and reduction of fluctuation of joint strength may be hard to be obtained sufficiently. In the fifth embodiment, since the surface temperature CT is reduced to equal to or less than 150° C. by cooling, martensite transformation of a structure of the nugget 3 is done almost completely by a starting time of the heat treatment after welding. Therefore, the effects such as improvement of fracture appearance, and accompanying improvement of joint strength and reduction of fluctuation of joint strength can be obtained more prominently.

By performing these methods of the second to fifth embodiments, a spot welded joint according to the first embodiment can be obtained, and further, it becomes possible to suppress an occurrence of a defect and a crack in the nugget 3 while keeping good workability, so that effects such as improvement of fracture appearance, accompanying improvement of joint strength and reduction of fluctuation of joint strength can be obtained. Thus, a highly reliable welded portion can be obtained.

Further, a high-strength steel plate being a target of the spot welding method in the second to fifth embodiments may be, for example, a high-strength steel plate which is used for a reinforcement component for the sake of safety improvement in an automobile vehicle body and whose tensile strength is equal to or more than 750 MPa and whose carbon equivalent is high, and thus in that high-strength steel plate reduction or fluctuation of strength of a spot welded portion is apprehended. According to the second to fifth embodiments, in performing spot welding of such a high-strength steel plate, it becomes possible to obtain a highly reliable spot welded joint efficiently within a range of actual operation, without using a special apparatus. Further, a time necessary for those embodiments is short, and it is possible to precipitate carbides efficiently. Thus, a highly reliable welded portion can be formed and a special effect can be obtained also from a viewpoint of workability, and a technical idea is different from a conventional one.

Further, in the fourth and fifth embodiments, since the proper energization pattern and the heat treatment after welding are combined, a superior strength property and reliability can be obtained even in a portion having a solidification structure such as a spot welded portion, which is quite meaningful.

It should be noted that in any of the second to fifth embodiments, as long as the carbon equivalent Ceq is within a proper range, the composition of the high-strength steel plate is not limited in particular and the above-described effects can be obtained. Further, similarly to in the first embodiment, it is preferable that a C content is 0.40 mass % to 0.10 mass %, it is preferable that a Si content is 2.50 mass % to 0.01 mass %, and it is preferable that a Mn content is 3.0 mass % to 1.5 mass %. Further, it is preferable that a P content is equal to or less than 0.03%, it is preferable that a S content is equal to or less than 0.01 mass %, it is preferable that a N content is equal to or less than 0.0100 mass %, it is preferable that an O content is equal to or less than 0.007 mass %, and it is preferable that an Al content is equal to or less than 1.00 mass %. Further, it is preferable that a content of another element is within a range similar to that of the first embodiment. It is for securing a high joint strength more stably and suppressing fluctuation of joint strength more, even in a case that there occurs variation of welding conditions in mass production of automobile members, for example, even in a case that there occurs abrasion of an electrode tip portion or variation of spaces between plates in welding.

Here, a formula (11) below represents a carbon equivalent Ceqh related to a hardness of a nugget of a high-strength steel plate, and a formula (12) below represents a carbon equivalent Ceqt related to a toughness of a welded portion.

It should be noted that the formula (12) is common to the above formula (1).

$$Ceqh=[C]+[Si]/40+[Cr]/20 \quad (11)$$

$$Ceqt=[C]+[Si]/30+[Mn]/20+2[P]+4[S] \quad (12)$$

In general, if a tensile strength of a high-strength steel plate increases, a numeric value of a carbon equivalent (Ceqh or Ceqt) represented by the above formula (11) or formula (12) increases, and consequently, hardness of a welded portion increases and toughness is reduced. If the hardness of the welded portion increases and the toughness is reduced as described above, a crack is apt to occur in the nugget 3 and deterioration of fracture appearance occurs, so that reduction or fluctuation occurs in joint strength, in particular, in cross tensile strength. In particular, if a numeric value of the carbon equivalent Ceqt represented by the above formula (12) is too large, deterioration of fracture appearance occurs and reduction or fluctuation occurs in joint strength, in particular, in cross tensile strength.

In contrast, in the first to fifth embodiment, since carbon equivalents Ceq of high-strength steel plates are prescribed within proper ranges, effects such as improvement of fracture appearance, accompanying improvement of joint strength and reduction of fluctuation of joint strength can be obtained.

Figure 5:
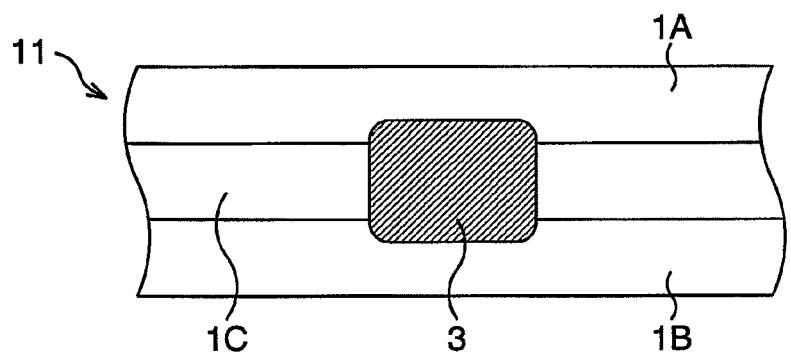
FIG. 5 is a schematic diagram illustrating a spot welded joint which includes three thin steel plates.

It should be noted that the above description is related to a case that spot welding of two thin steel plates are performed and to a case of spot welded joint obtained by such spot welding, but objects to be spot welded may be three thin steel plates 1A, 1B, and 1C as illustrated in FIG. 5, and effects similar to the above can be obtained also in a spot welded joint 11, which includes the three thin steel plates 1A, 1B, and 1C. Further, spot welding may be performed to four or more thin steel plates, and similar effects can be obtained also in a spot welded joint which includes the four or more thin steel plates. It should be noted that in the above-described combination of plates, there is no necessity that all the thin steel plates should be high-strength steel plates, and one(s) of them may be a mild steel plate. Further, there is no necessity that all the high-strength steel plates should be of the same steel type, and a combination of different steel types may be possible. Further, there is no need that all the thicknesses should be the same and a combination of different thicknesses is possible.

Further, there is no need that all of two or more thin steel plates being objects to be spot welded should fulfill the above-described ranges of the tensile strength and the carbon equivalent, and it suffices if at least in one thin steel plate the tensile strength is 750 MPa to 1850 MPa and the carbon equivalent Ceq is 0.22 mass % to 0.55 mass %. Therefore, in a spot welded joint, it suffices if in at least one of two or more thin steel plates included therein the tensile strength is 750 MPa to 1850 MPa and the carbon equivalent Ceq is 0.22 mass % to 0.55 mass %. However, in practice, if a composition, a tensile strength, and a carbon equivalent of a thin steel plate to be combined with a high-strength steel plate whose composition, tensile strength, and carbon equivalent are prescribed in the present invention are equal to or more than the value prescribed in the present invention, a probability that deterioration of fracture appearance and accompanying reduction of joint strength and fluctuation of joint strength occur is heightened, and thus it may be necessary that the composition, the tensile strength, and the carbon equivalent of the thin steel plate to be combined are equal to or less than those of the high-strength steel plate prescribed in the present invention.

Figure 6A:
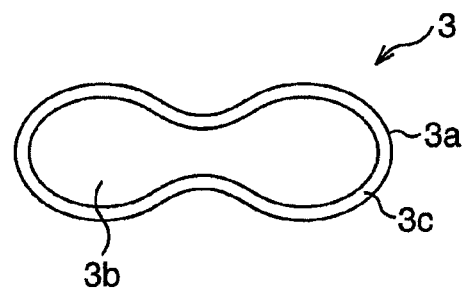
FIG. 6A is a schematic diagram illustrating an example of a nugget.
Figure 6B:
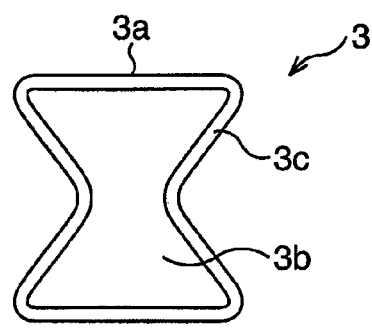
FIG. 6B is a schematic diagram illustrating another example of a nugget.
Figure 6C:
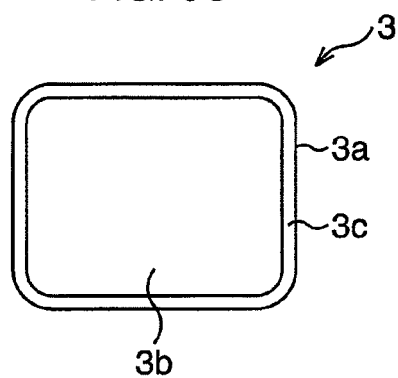
FIG. 6C is a schematic diagram illustrating still another example of a nugget.

Further, a shape of the nugget 3 is not limited to an ellipsoid or an almost ellipsoid, and as illustrated in FIG. 6A, FIG. 6B, and FIG. 6C, the present invention may be applied to nuggets 3 of all shapes. Further, whatever shape the nugget 3 has, it is possible to specify the nugget outer layer zone 3c, as illustrated in FIG. 6A to FIG. 6c.

EXAMPLE

Hereinafter, examples belonging to ranges of the present invention will be described while being compared with comparative examples being out of the ranges of the present invention. However, the present invention is not limited to the following examples, but realization is possible while modification is added properly within a range compatible with purport described above or later, and those are all included in a technical scope of the present invention.

Example 1

First, there were prepared steel plates (high-strength cold-rolled steel plates, electroplated steel plates, and alloyed hot-dip galvanized steel plates) of 17 kinds which had components represented in Table 1 and Table 2 below and whose thickness was 1.6 mm and whose tensile strengths were equal to or more than 750 MPa. Then, the steel plates of the same types in combination were overlapped, and spot welding was performed under conditions No. A-1 to No. A-86 represented in Table 3 and Table 4 below with a welding machine of a servo gun type, whereby test pieces of spot welded joints were fabricated. Further, with regard to a part of the test pieces, heat treatments after welding were performed under conditions of Table 3 and Table 4 below, after the spot welding. It should be noted that a preparatory experiment was performed before spot welding and that based on a result of the preparatory experiment a welding current at a time of spot welding was set to a value $(4.5\sqrt{t})$ by which a nugget diameter became 4.5 times as large as a square root of a thickness of one steel plate. It should be noted that six test pieces were fabricated per one condition.

TABLE 1

| Type of steel plate (*1) | Tensile strength (MPa) | C (mass %) | Si (mass %) | Mn (mass %) | P (mass %) | S (mass %) | Al (mass %) | N (mass %) | O (mass %) | Carbon equivalent Ceq (mass %) |
|---|---|---|---|---|---|---|---|---|---|---|
| CR-1 | 762 | 0.121 | 0.46 | 2.18 | 0.016 | 0.0042 | 0.032 | 0.0027 | 0.0036 | 0.29 |
| GA-1 | 812 | 0.102 | 0.56 | 2.19 | 0.014 | 0.0035 | 0.048 | 0.0022 | 0.0019 | 0.27 |
| GA-2 | 788 | 0.198 | 1.04 | 1.52 | 0.015 | 0.0028 | 0.013 | 0.0024 | 0.0019 | 0.35 |
| CR-2 | 998 | 0.103 | 1.48 | 1.98 | 0.011 | 0.0022 | 0.024 | 0.0023 | 0.0011 | 0.28 |
| CR-3 | 1016 | 0.151 | 0.32 | 2.42 | 0.007 | 0.0011 | 0.027 | 0.0021 | 0.0022 | 0.30 |
| GA-3 | 1056 | 0.099 | 0.72 | 2.21 | 0.0016 | 0.0015 | 0.029 | 0.0012 | 0.0030 | 0.24 |

TABLE 1-continued

| Type of steel plate (*1) | Tensile strength (MPa) | C (mass %) | Si (mass %) | Mn (mass %) | P (mass %) | S (mass %) | Al (mass %) | N (mass %) | O (mass %) | Carbon equivalent Ceq (mass %) |
|---|---|---|---|---|---|---|---|---|---|---|
| EG-1 | 1036 | 0.231 | 1.43 | 1.64 | 0.006 | 0.0009 | 0.882 | 0.0045 | 0.0033 | 0.38 |
| GA-4 | 1183 | 0.162 | 1.87 | 1.86 | 0.012 | 0.0016 | 0.014 | 0.0025 | 0.0027 | 0.35 |
| CR-4 | 1221 | 0.153 | 0.02 | 2.62 | 0.018 | 0.0008 | 0.028 | 0.0019 | 0.0020 | 0.32 |
| CR-5 | 1203 | 0.304 | 1.02 | 1.78 | 0.009 | 0.0018 | 0.892 | 0.0025 | 0.0024 | 0.45 |
| GA-5 | 1508 | 0.188 | 0.76 | 1.84 | 0.007 | 0.0013 | 0.032 | 0.0027 | 0.0026 | 0.32 |
| GA-6 | 1552 | 0.224 | 0.32 | 2.46 | 0.011 | 0.0012 | 0.007 | 0.0019 | 0.0014 | 0.38 |
| CR-6 | 1762 | 0.231 | 0.02 | 1.68 | 0.016 | 0.0034 | 0.024 | 0.0027 | 0.0019 | 0.36 |
| EG-2 | 1809 | 0.268 | 0.26 | 1.71 | 0.009 | 0.0011 | 0.025 | 0.0011 | 0.0012 | 0.38 |
| GA-7 | 1472 | 0.377 | 1.12 | 1.63 | 0.012 | 0.0017 | 0.23 | 0.0052 | 0.0016 | 0.53 |
| CR-7 | 602 | 0.062 | 0.44 | 2.14 | 0.011 | 0.0029 | 0.048 | 0.0051 | 0.0035 | 0.21 |
| GA-8 | 2241 | 0.486 | 0.23 | 1.54 | 0.009 | 0.0025 | 0.011 | 0.0027 | 0.0036 | 0.60 |

*1 CR: cold-rolled steel plate, EG: electrogalvanized steel plate, GA: alloyed-hot dip galvanized steel plate

TABLE 2

| Type of steel plate | Ti (mass %) | Nb (mass %) | V (mass %) | B (mass %) | Cr (mass %) | Ni (mass %) | Cu (mass %) | Mo (mass %) | Ca (mass %) | Ce (mass %) | Mg (mass %) | REM (mass %) |
|---|---|---|---|---|---|---|---|---|---|---|---|---|
| CR-1 | | | | | | | | | | | | |
| GA-1 | 0.019 | | | | | | | | | | | |
| GA-2 | | | | | 0.14 | | | | | | | |
| CR-2 | 0.044 | | | 0.0006 | | | | | | | | |
| CR-3 | | | | | | | | | | | | |
| GA-3 | 0.019 | 0.043 | | 0.0046 | | | | 0.17 | | | | |
| EG-1 | | | | | 0.37 | 0.11 | | | | | | |
| GA-4 | 0.041 | | | 0.0017 | | | | | | | | |
| CR-4 | | | | | | | | | 0.0026 | | | |
| CR-5 | | | | | | | | | | 0.0034 | | |
| GA-5 | 0.078 | | | 0.0026 | 0.78 | | | | | | | |
| GA-6 | | 0.082 | | | | | | | | | 0.0007 | |
| CR-6 | | | | 0.0019 | | | | | | | | |
| EG-2 | 0.013 | | 0.008 | | | | | | | | | 0.0019 |
| GA-7 | | | | | | | | | | | | |
| CR-7 | | | | | | | | | | | | |
| GA-8 | 0.007 | | | 0.0038 | | | | | | | | |

TABLE 3

| | | Welding condition | | | | | | | Heat treatment condition after welding | |
|---|---|---|---|---|---|---|---|---|---|---|
| Condition | Type of steel plate | Pressurizing force (EN) (N) | Welding current (WC) (kA) | Cooling time (Ct) (ms) | Post-heating energization current (PC) (kA) | Post-heating energization time (Pt) (ms) | Holding time (Ht) (ms) | Temperature before heat treatment (CT) (° C.) | Heat treatment temperature (AT) (° C.) | Heat treatment time (At) (sec) |
| A-1 | CR-1 | 3500 | 6.42 | 40 | 3.85 | 80 | 100 | 25 | 170 | 1200 |
| A-2 | CR-1 | 3500 | 6.42 | -*2 | 3.85 | 80 | 100 | 25 | 130 | 1200 |
| A-3 | CR-1 | 3500 | 6.42 | 20 | 3.85 | 80 | 100 | 25 | 170 | 1200 |
| A-4 | CR-1 | 3500 | 6.42 | 80 | 3.85 | 80 | 100 | 25 | 170 | 1200 |
| A-5 | CR-1 | 3500 | 6.43 | 500 | 3.86 | 80 | 100 | 25 | 160 | 1200 |
| A-6 | CR-1 | 3500 | 6.42 | 40 | 1.92 | 80 | 100 | 25 | 170 | 1200 |
| A-7 | CR-1 | 3500 | 6.41 | 40 | 3.52 | 80 | 100 | 25 | 150 | 1200 |
| A-8 | CR-1 | 3500 | 6.42 | 40 | 4.36 | 80 | 100 | 25 | 170 | 1200 |
| A-9 | CR-1 | 3500 | 6.42 | 40 | 6.11 | 80 | 100 | 25 | 160 | 1200 |
| A-10 | CR-1 | 3500 | 6.43 | 40 | -*2 | -*2 | -*2 | 25 | 170 | 1200 |
| A-11 | CR-1 | 3500 | 6.42 | 40 | 3.85 | 80 | 20 | 25 | 170 | 1200 |
| A-12 | CR-1 | 3500 | 6.41 | 40 | 3.85 | 80 | 160 | 25 | 180 | 1200 |
| A-13 | CR-1 | 3500 | 6.40 | 40 | 3.84 | 80 | 240 | 25 | 170 | 1200 |
| A-14 | CR-1 | 3500 | 6.42 | 40 | 3.86 | 80 | 100 | 450 | 170 | 1200 |
| A-15 | CR-1 | 3500 | 6.42 | 40 | 3.85 | 80 | 100 | 25 | 100 | 1200 |
| A-16 | CR-1 | 3500 | 6.42 | 40 | 3.85 | 80 | 100 | 25 | 140 | 1200 |
| A-17 | CR-1 | 3500 | 6.42 | 40 | 3.85 | 80 | 100 | 25 | 220 | 1200 |
| A-18 | CR-1 | 3500 | 6.42 | 40 | 3.84 | 80 | 100 | 25 | 300 | 1200 |
| A-19 | CR-1 | 3500 | 6.42 | 40 | 3.85 | 80 | 100 | 25 | -*2 | -*2 |
| A-20 | CR-1 | 3500 | 6.42 | 40 | 3.85 | 80 | 100 | 25 | 170 | 180 |
| A-21 | CR-1 | 3500 | 6.42 | 40 | 3.85 | 80 | 100 | 25 | 170 | 1800 |
| A-22 | CR-1 | 3500 | 6.43 | 40 | 3.86 | 80 | 100 | 25 | 220 | 9000 |

TABLE 3-continued

| | | Welding condition | | | | | | Heat treatment condition after welding | |
|---|---|---|---|---|---|---|---|---|---|
| Condition | Type of steel plate | Pressurizing force (EN) (N) | Welding current (WC) (kA) | Cooling time (Ct) (ms) | Post-heating energization current (PC) (kA) | Post-heating energization time (Pt) (ms) | Holding time (Ht) (ms) | Temperature before heat treatment (CT) (° C.) | Heat treatment temperature (AT) (° C.) | Heat treatment time (At) (sec) |
| A-23 | CR-1 | 3500 | 6.40 | 12 | 5.15 | 83 | 17 | 25 | 160 | 600 |
| A-24 | CR-1 | 3500 | 6.40 | 17 | 5.15 | 83 | 17 | 25 | 160 | 600 |
| A-25 | CR-1 | 3500 | 6.40 | 17 | 5.50 | 83 | 17 | 25 | 160 | 600 |
| A-26 | CR-1 | 3500 | 6.40 | 17 | 5.15 | 83 | 0 | 25 | 160 | 600 |
| A-27 | CR-1 | 3500 | 6.40 | 17 | 5.15 | 33 | 17 | 25 | 160 | 600 |
| A-28 | CR-1 | 3500 | 6.40 | 17 | 5.15 | 17 | 17 | 25 | 160 | 600 |
| A-29 | CR-1 | 3500 | 6.40 | 17 | 5.15 | 83 | 17 | 25 | -*2 | -*2 |
| A-30 | CR-1 | 3500 | 6.40 | 17 | 5.15 | 83 | 17 | 25 | 80 | 1200 |
| A-31 | GA-1 | 3500 | 6.21 | 40 | 3.73 | 100 | 100 | 25 | 170 | 1200 |
| A-32 | GA-1 | 3500 | 6.19 | 40 | 3.71 | 100 | 100 | 25 | -*2 | -*2 |
| A-33 | GA-1 | 3500 | 6.20 | 40 | 3.72 | 100 | 100 | 25 | 140 | 1200 |
| A-34 | GA-1 | 3500 | 6.19 | 40 | 3.71 | 100 | 100 | 25 | 210 | 1200 |
| A-35 | GA-1 | 3500 | 6.20 | 40 | 3.72 | 100 | 100 | 25 | 450 | 1200 |
| A-36 | GA-1 | 3500 | 6.21 | -*2 | 3.73 | 100 | 100 | 25 | 170 | 1200 |
| A-37 | GA-1 | 3500 | 6.18 | 500 | 3.71 | 100 | 100 | 25 | 170 | 1200 |
| A-38 | GA-1 | 3500 | 6.20 | 40 | 5.20 | 100 | 20 | 25 | -*2 | -*2 |
| A-39 | GA-1 | 3500 | 6.20 | 40 | 5.20 | 100 | 20 | 25 | 80 | 1200 |
| A-40 | GA-1 | 3500 | 6.20 | 40 | 5.20 | 100 | 20 | 25 | 170 | 1200 |

*2 —indicates that each process is not performed

TABLE 4

| | | Welding condition | | | | | | Heat treatment condition after welding | |
|---|---|---|---|---|---|---|---|---|---|
| Condition | Type of steel plate | Pressurizing force (EN) (N) | Welding current (WC) (kA) | Cooling time (Ct) (ms) | Post-heating energization current (PC) (kA) | Post-heating energization time (Pt) (ms) | Holding time (Ht) (ms) | Temperature before heat treatment (CT) (° C.) | Heat treatment temperature (AT) (° C.) | Heat treatment time (At) (sec) |
| A-41 | GA-2 | 3500 | 6.10 | 40 | 4.02 | 100 | 100 | 25 | 170 | 1200 |
| A-42 | GA-2 | 3500 | 6.10 | 40 | 2.18 | 100 | 100 | 25 | 170 | 1200 |
| A-43 | GA-2 | 3500 | 6.12 | 40 | 5.84 | 100 | 100 | 25 | 170 | 1200 |
| A-44 | GA-2 | 3500 | 6.09 | 40 | 4.03 | 100 | 100 | 25 | 100 | 1200 |
| A-45 | GA-2 | 3500 | 6.08 | 40 | 4.01 | 100 | 100 | 25 | 340 | 1200 |
| A-46 | GA-2 | 3500 | 6.11 | 40 | 4.08 | 100 | 100 | 25 | 170 | 20 |
| A-47 | GA-2 | 3500 | 6.10 | 40 | 4.01 | 100 | 100 | 450 | 170 | 1200 |
| A-48 | CR-2 | 3500 | 6.45 | 40 | 3.88 | 80 | 100 | 25 | 170 | 1200 |
| A-49 | CR-3 | 3500 | 6.49 | 40 | 3.70 | 80 | 100 | 25 | 170 | 1200 |
| A-50 | GA-3 | 3500 | 6.19 | 40 | 4.03 | 80 | 100 | 25 | 170 | 1200 |
| A-51 | EG-1 | 3500 | 6.44 | 40 | 4.01 | 80 | 100 | 25 | 170 | 1200 |
| A-52 | GA-4 | 3500 | 6.18 | 40 | 3.99 | 80 | 100 | 25 | 180 | 1200 |
| A-53 | GA-4 | 3500 | 6.17 | -*2 | 3.98 | 80 | 100 | 25 | 140 | 1200 |
| A-54 | GA-4 | 3500 | 6.20 | 20 | 3.99 | 80 | 100 | 25 | 170 | 1200 |
| A-55 | GA-4 | 3500 | 6.20 | 80 | 3.98 | 80 | 100 | 25 | 160 | 1200 |
| A-56 | GA-4 | 3500 | 6.19 | 380 | 3.76 | 80 | 100 | 25 | 170 | 1200 |
| A-57 | GA-4 | 3500 | 6.20 | 40 | 1.63 | 80 | 100 | 25 | 170 | 1200 |
| A-58 | GA-4 | 3500 | 6.20 | 40 | 3.42 | 80 | 100 | 25 | 170 | 1200 |
| A-59 | GA-4 | 3500 | 6.18 | 40 | 4.42 | 80 | 100 | 25 | 170 | 1200 |
| A-60 | GA-4 | 3500 | 6.20 | 40 | 6.03 | 80 | 100 | 25 | 180 | 1200 |
| A-61 | GA-4 | 3500 | 6.20 | 40 | -*2 | -*2 | -*2 | 25 | 170 | 1200 |
| A-62 | GA-4 | 3500 | 6.19 | 40 | 4.01 | 80 | 40 | 25 | 170 | 1200 |
| A-63 | GA-4 | 3500 | 6.21 | 40 | 3.93 | 80 | 220 | 25 | 170 | 1200 |
| A-64 | GA-4 | 3500 | 6.20 | 40 | 4.01 | 80 | 100 | 400 | 160 | 1200 |
| A-65 | GA-4 | 3500 | 6.20 | 40 | 4.00 | 80 | 100 | 25 | 90 | 1200 |
| A-66 | GA-4 | 3500 | 6.19 | 40 | 3.98 | 80 | 100 | 25 | 150 | 1200 |
| A-67 | GA-4 | 3500 | 6.18 | 40 | 3.99 | 80 | 100 | 25 | 200 | 1200 |
| A-68 | GA-4 | 3500 | 6.22 | 40 | 4.03 | 80 | 100 | 25 | 340 | 1200 |
| A-69 | GA-4 | 3500 | 6.20 | 40 | 3.99 | 80 | 100 | 25 | -*2 | -*2 |
| A-70 | GA-4 | 3500 | 6.20 | 40 | 3.98 | 80 | 100 | 25 | 170 | 240 |
| A-71 | GA-4 | 3500 | 6.21 | 40 | 3.98 | 80 | 100 | 25 | 170 | 2400 |
| A-72 | CR-4 | 3500 | 6.41 | 40 | 3.85 | 80 | 100 | 25 | 170 | 1200 |
| A-73 | CR-5 | 3500 | 6.38 | 40 | 4.02 | 80 | 100 | 25 | 180 | 1200 |
| A-74 | CR-5 | 3500 | 6.39 | -*2 | 4.03 | 80 | 100 | 25 | 180 | 1200 |
| A-75 | CR-5 | 3500 | 6.40 | 400 | 4.02 | 80 | 100 | 25 | 180 | 1200 |
| A-76 | CR-5 | 3500 | 6.40 | 40 | 2.02 | 80 | 100 | 25 | 170 | 1200 |
| A-77 | CR-5 | 3500 | 6.41 | 40 | 5.54 | 80 | 100 | 25 | 170 | 1200 |
| A-78 | CR-5 | 3500 | 6.39 | 40 | 4.00 | 80 | 100 | 25 | -*2 | -*2 |
| A-79 | CR-5 | 3500 | 6.38 | 40 | 4.02 | 80 | 100 | 25 | 330 | 1200 |

TABLE 4-continued

| | | Welding condition | | | | | | Heat treatment condition after welding | | |
|---|---|---|---|---|---|---|---|---|---|---|
| Condition | Type of steel plate | Pressurizing force (EN) (N) | Welding current (WC) (kA) | Cooling time (Ct) (ms) | Post-heating energization current (PC) (kA) | Post-heating energization time (Pt) (ms) | Holding time (Ht) (ms) | Temperature before heat treatment (CT) (° C.) | Heat treatment temperature (AT) (° C.) | Heat treatment time (At) (sec) |
| A-80 | GA-5 | 3500 | 6.11 | 40 | 4.01 | 80 | 100 | 25 | 170 | 1200 |
| A-81 | GA-6 | 3500 | 6.21 | 40 | 3.99 | 80 | 100 | 25 | 170 | 1200 |
| A-82 | CR-6 | 3500 | 6.48 | 40 | 3.72 | 80 | 100 | 25 | 170 | 1200 |
| A-83 | EG-2 | 3500 | 6.38 | 40 | 3.89 | 80 | 100 | 25 | 170 | 1200 |
| A-84 | GA-7 | 3500 | 6.39 | 40 | 4.02 | 80 | 100 | 25 | 180 | 1200 |
| A-85 | CR-7 | 3500 | 6.42 | 40 | 3.88 | 80 | 100 | 25 | -*2 | -*2 |
| A-86 | GA-8 | 3500 | 6.21 | 40 | 4.01 | 80 | 100 | 25 | 180 | 1200 |

*2—indicates that each process is not performed

Then, observation of a microstructure of a nugget was performed with the use of one of six test pieces and measurement of cross tensile strengths was performed with the use of the remaining five, per the condition. The observation of the microstructure was performed with the use of an optical microscope. Further, the measurement of the cross tensile strength was performed based on a cross tensile strength experiment method (JIS Z3137) of a resistance spot welded joint, and an average value of joint strengths and fluctuation of joint strength were calculated. In other words, as indicated by a reference number 24 in FIG. 7, a cross tensile test was performed by applying loads in directions to peel a test piece 21A of an upper side in an upper direction and a test piece 21B of a lower side in a lower direction each other, and a cross tensile strength (CTS) was measured.

Further, two IF steel plates whose tensile strength was 289 MPs and whose thickness was 1.6 mm were overlapped, and spot welding was performed under a condition to make a nugget diameter be 4.5√t, whereby five reference test pieces of spot welded joints were fabricated. Cross tensile strengths of these reference test pieces were measured, and an average value thereof was 8.2 kN.

Then, average values of the cross tensile strengths of the test pieces fabricated under the above-described conditions No. A-1 to No. A-86 were compared with the average value of the cross tensile strengths of the reference test pieces and evaluation was done. In this evaluation, a spot welded joint in which a proportion in relation to the average value of the cross tensile strengths of the reference test pieces was equal to or more than 1 was defined as a spot welded joint having a superior joint strength.

Since the nugget diameter formed under the above condition (4.5√t) was about 5.7 mm, a nugget outer layer zone obtained by eliminating a similar figure zone of 90% from a nugget was equivalent to a region having a thickness of about 0.3 mm from a boundary between the nugget and the high-strength steel plate toward a nugget center. In the observation of the microstructure, an average grain diameter and a number density of carbides as well as an average value of arm intervals of a dendrite structure were measured, in a portion about 0.2 mm inside from the boundary between the nugget and the high-strength steel plate toward the nugget center in the nugget outer layer zone. Further, a proportion (a volume fraction) of fresh martensite, tempered martensite, and retained austenite which constituted the nugget was also measured.

Results of such evaluation and measurement results are represented in Table 5 and Table 6 below.

TABLE 5

| | | Dendrite | Carbide | | Welded portion structure volume rate | | | Welded joint strength ratio | | |
|---|---|---|---|---|---|---|---|---|---|---|
| Condition | Type of steel plate | arm interval (μm) | Average size (nm) | Number density (number/mm²) | Fresh martensite (%) | Tempered martensite (%) | Retained austenite (%) | (high-strength steel plate/mild steel plate) | Strength fluctuation | Reference |
| A-1 | CR-1 | 8 | 42 | $6.2 \times 10^6$ | 0 | 100 | 0 | 1.14 | ◎ | Invention Example |
| A-2 | CR-1 | 13 | 46 | $6.8 \times 10^5$ | 36 | 62 | 2 | 0.80 | Δ | Comparative example |
| A-3 | CR-1 | 11 | 44 | $5.4 \times 10^6$ | 3 | 96 | 1 | 1.11 | ○ | Invention Example |
| A-4 | CR-1 | 7 | 38 | $7.1 \times 10^6$ | 0 | 99 | 1 | 0.19 | ◎ | Invention Example |
| A-5 | CR-1 | 7 | 82 | $1.1 \times 10^6$ | 32 | 62 | 6 | 0.78 | X | Comparative example |
| A-6 | CR-1 | 7 | 44 | $1.4 \times 10^6$ | 27 | 69 | 4 | 0.82 | X | Comparative example |
| A-7 | CR-1 | 7 | 39 | $7.5 \times 10^6$ | 0 | 100 | 0 | 1.19 | ◎ | Invention Example |
| A-8 | CR-1 | 7 | 44 | $4.2 \times 10^6$ | 0 | 100 | 0 | 1.08 | ○ | Invention Example |
| A-9 | CR-1 | 14 | 56 | $1.7 \times 10^6$ | 27 | 73 | 0 | 0.76 | X | Comparative example |
| A-10 | CR-1 | 8 | 28 | $4.7 \times 10^5$ | 12 | 88 | 0 | 0.48 | X | Comparative example |
| A-11 | CR-1 | 7 | 36 | $2.6 \times 10^6$ | 3 | 97 | 0 | 1.06 | ○ | Invention Example |
| A-12 | CR-1 | 7 | 49 | $7.5 \times 10^6$ | 0 | 100 | 0 | 1.22 | ◎ | Invention Example |
| A-13 | CR-1 | 8 | 52 | $8.3 \times 10^6$ | 0 | 100 | 0 | 1.21 | ◎ | Invention Example |
| A-14 | CR-1 | 8 | 43 | $1.3 \times 10^6$ | 37 | 57 | 6 | 0.64 | X | Comparative example |
| A-15 | CR-1 | 7 | 34 | $2.3 \times 10^6$ | 9 | 90 | 1 | 1.01 | ○ | Invention Example |
| A-16 | CR-1 | 7 | 35 | $4.2 \times 10^6$ | 3 | 96 | 0 | 1.12 | ◎ | Invention Example |
| A-17 | CR-1 | 7 | 78 | $6.8 \times 10^6$ | 0 | 100 | 0 | 1.12 | ◎ | Invention Example |
| A-18 | CR-1 | 7 | 116 | $3.8 \times 10^6$ | 0 | 100 | 0 | 0.83 | ○ | Comparative example |
| A-19 | CR-1 | 7 | 76 | $2.1 \times 10^6$ | 12 | 86 | 2 | 1.01 | ○ | Invention Example |
| A-20 | CR-1 | 7 | 29 | $4.0 \times 10^6$ | 7 | 92 | 1 | 1.02 | ○ | Invention Example |
| A-21 | CR-1 | 7 | 49 | $6.9 \times 10^6$ | 0 | 100 | 0 | 1.22 | ◎ | Invention Example |

TABLE 5-continued

| Condition | Type of steel plate | Dendrite arm interval (μm) | Carbide Average size (nm) | Carbide Number density (number/mm$^2$) | Welded portion structure volume rate Fresh martensite (%) | Welded portion structure volume rate Tempered martensite (%) | Welded portion structure volume rate Retained austenite (%) | Welded joint strength ratio (high-strength steel plate/mild steel plate) | Strength fluctuation | Reference |
|---|---|---|---|---|---|---|---|---|---|---|
| A-22 | CR-1 | 7 | 107 | 4.3 × 10$^6$ | 1 | 98 | 1 | 0.85 | ⊚ | Comparative example |
| A-23 | CR-1 | 13 | 45 | 4.0 × 10$^6$ | 2 | 98 | 0 | 0.94 | Δ | Comparative example |
| A-24 | CR-1 | 10 | 40 | 5.3 × 10$^6$ | 3 | 97 | 0 | 1.12 | ⊚ | Invention Example |
| A-25 | CR-1 | 10 | 46 | 5.3 × 10$^6$ | 2 | 98 | 0 | 1.14 | ⊚ | Invention Example |
| A-26 | CR-1 | 10 | 44 | 6.0 × 10$^6$ | 2 | 98 | 0 | 1.10 | ⊚ | Invention Example |
| A-27 | CR-1 | 10 | 36 | 4.5 × 10$^6$ | 3 | 97 | 0 | 1.06 | ⊚ | Invention Example |
| A-28 | CR-1 | 10 | 30 | 1.3 × 10$^6$ | 6 | 94 | 0 | 0.90 | Δ | Comparative example |
| A-29 | CR-1 | 10 | 25 | 2.1 × 10$^6$ | 13 | 87 | 0 | 1.01 | ○ | Invention Example |
| A-30 | CR-1 | 10 | 28 | 2.5 × 10$^6$ | 10 | 90 | 0 | 1.03 | ○ | Invention Example |
| A-31 | GA-1 | 7 | 52 | 7.2 × 10$^6$ | 0 | 100 | 0 | 1.26 | ⊚ | Invention Example |
| A-32 | GA-1 | 8 | 16 | 2.1 × 10$^6$ | 12 | 86 | 2 | 1.01 | ○ | Invention Example |
| A-33 | GA-1 | 7 | 33 | 3.8 × 10$^6$ | 3 | 97 | 0 | 1.22 | ⊚ | Invention Example |
| A-34 | GA-1 | 7 | 83 | 5.0 × 10$^6$ | 0 | 100 | 0 | 1.25 | ⊚ | Invention Example |
| A-35 | GA-1 | 8 | 126 | 1.3 × 10$^6$ | 0 | 100 | 0 | 0.90 | ○ | Comparative example |
| A-36 | GA-1 | 15 | 42 | 1.8 × 10$^6$ | 0 | 100 | 0 | 0.88 | ○ | Comparative example |
| A-37 | GA-1 | 7 | 51 | 1.5 × 10$^6$ | 0 | 100 | 0 | 0.87 | ○ | Comparative example |
| A-38 | GA-1 | 7 | 16 | 2.0 × 10$^6$ | 14 | 86 | 0 | 1.01 | ○ | Invention Example |
| A-39 | GA-1 | 7 | 22 | 2.5 × 10$^6$ | 5 | 95 | 0 | 1.04 | ○ | Invention Example |
| A-40 | GA-1 | 7 | 46 | 5.3 × 10$^6$ | 0 | 100 | 0 | 1.18 | ⊚ | Invention Example |

TABLE 6

| Condition | Type of steel plate | Dendrite arm interval (μm) | Carbide Average size (nm) | Carbide Number density (number/mm$^2$) | Welded portion structure volume rate Fresh martensite (%) | Welded portion structure volume rate Tempered martensite (%) | Welded portion structure volume rate Retained austenite (%) | Welded joint strength ratio (high-strength steel plate/mild steel plate) | Strength fluctuation | Reference |
|---|---|---|---|---|---|---|---|---|---|---|
| A-41 | GA-2 | 7 | 48 | 7.5 × 10$^6$ | 0 | 100 | 0 | 1.14 | ⊚ | Invention Example |
| A-42 | GA-2 | 7 | 51 | 1.4 × 10$^6$ | 0 | 100 | 0 | 0.67 | X | Comparative example |
| A-43 | GA-2 | 13 | 49 | 1.1 × 10$^6$ | 0 | 100 | 0 | 0.74 | X | Comparative example |
| A-44 | GA-2 | 7 | 16 | 2.5 × 10$^6$ | 14 | 85 | 1 | 1.01 | ○ | Invention Example |
| A-45 | GA-2 | 7 | 134 | 2.5 × 10$^6$ | 0 | 100 | 0 | 0.88 | ⊚ | Comparative example |
| A-46 | GA-2 | 7 | 27 | 3.2 × 10$^6$ | 8 | 92 | 0 | 1.03 | ○ | Invention Example |
| A-47 | GA-2 | 7 | 146 | 1.8 × 10$^6$ | 12 | 77 | 11 | 0.81 | X | Comparative example |
| A-48 | CR-2 | 7 | 48 | 5.7 × 10$^6$ | 0 | 100 | 0 | 1.31 | ⊚ | Invention Example |
| A-49 | CR-3 | 7 | 43 | 6.9 × 10$^6$ | 0 | 100 | 0 | 1.22 | ⊚ | Invention Example |
| A-50 | GA-3 | 7 | 49 | 4.8 × 10$^6$ | 0 | 100 | 0 | 1.29 | ⊚ | Invention Example |
| A-51 | EG-1 | 7 | 39 | 9.6 × 10$^6$ | 0 | 100 | 0 | 1.19 | ⊚ | Invention Example |
| A-52 | GA-4 | 8 | 44 | 7.7 × 10$^6$ | 0 | 100 | 0 | 1.14 | ⊚ | Invention Example |
| A-53 | GA-4 | 14 | 51 | 1.6 × 10$^6$ | 37 | 61 | 2 | 0.92 | Δ | Comparative example |
| A-54 | GA-4 | 10 | 47 | 6.0 × 10$^6$ | 4 | 96 | 0 | 1.09 | ○ | Invention Example |
| A-55 | GA-4 | 6 | 41 | 9.7 × 10$^6$ | 0 | 100 | 0 | 1.24 | ⊚ | Invention Example |
| A-56 | GA-4 | 8 | 72 | 1.3 × 10$^6$ | 25 | 72 | 3 | 0.89 | Δ | Comparative example |
| A-57 | GA-4 | 8 | 47 | 1.4 × 10$^6$ | 28 | 68 | 4 | 0.79 | X | Comparative example |
| A-58 | GA-4 | 7 | 38 | 7.4 × 10$^6$ | 0 | 100 | 0 | 1.19 | ⊚ | Invention Example |
| A-59 | GA-4 | 7 | 49 | 5.5 × 10$^6$ | 0 | 100 | 0 | 1.12 | ○ | Invention Example |
| A-60 | GA-4 | 15 | 56 | 1.3 × 10$^6$ | 27 | 73 | 0 | 0.79 | X | Comparative example |
| A-61 | GA-4 | 7 | 41 | 1.5 × 10$^6$ | 9 | 91 | 0 | 0.72 | X | Comparative example |
| A-62 | GA-4 | 8 | 39 | 2.8 × 10$^6$ | 1 | 99 | 0 | 1.22 | ⊚ | Invention Example |
| A-63 | GA-4 | 7 | 49 | 8.1 × 10$^6$ | 0 | 100 | 0 | 1.20 | ⊚ | Invention Example |
| A-64 | GA-4 | 7 | 42 | 1.8 × 10$^6$ | 26 | 66 | 8 | 0.88 | X | Comparative example |
| A-65 | GA-4 | 7 | 32 | 2.5 × 10$^6$ | 9 | 90 | 1 | 1.02 | ○ | Invention Example |
| A-66 | GA-4 | 7 | 33 | 3.1 × 10$^6$ | 2 | 98 | 0 | 1.10 | ○ | Invention Example |
| A-67 | GA-4 | 7 | 73 | 5.9 × 10$^6$ | 0 | 100 | 0 | 1.23 | ⊚ | Invention Example |
| A-68 | GA-4 | 7 | 122 | 3.4 × 10$^6$ | 0 | 100 | 0 | 0.84 | ○ | Comparative example |
| A-69 | GA-4 | 7 | 20 | 2.0 × 10$^6$ | 13 | 86 | 1 | 1.01 | ○ | Invention Example |
| A-70 | GA-4 | 7 | 26 | 2.5 × 10$^6$ | 9 | 91 | 0 | 1.05 | ○ | Invention Example |
| A-71 | GA-4 | 7 | 43 | 8.2 × 10$^6$ | 0 | 100 | 0 | 1.24 | ⊚ | Invention Example |
| A-72 | CR-4 | 7 | 46 | 7.4 × 10$^6$ | 0 | 100 | 0 | 1.22 | ⊚ | Invention Example |
| A-73 | CR-5 | 7 | 41 | 8.6 × 10$^6$ | 0 | 100 | 0 | 1.19 | ⊚ | Invention Example |
| A-74 | CR-5 | 13 | 43 | 1.8 × 10$^6$ | 33 | 61 | 2 | 0.67 | X | Comparative example |
| A-75 | CR-5 | 7 | 41 | 9.6 × 10$^5$ | 26 | 70 | 4 | 0.58 | X | Comparative example |
| A-76 | CR-5 | 7 | 43 | 1.7 × 10$^6$ | 0 | 100 | 0 | 0.88 | Δ | Comparative example |
| A-77 | CR-5 | 12 | 47 | 3.5 × 10$^6$ | 0 | 100 | 0 | 1.05 | ○ | Invention Example |
| A-78 | CR-5 | 7 | 37 | 2.1 × 10$^6$ | 12 | 86 | 2 | 1.01 | ○ | Invention Example |
| A-79 | CR-5 | 8 | 118 | 3.4 × 10$^6$ | 0 | 100 | 0 | 0.78 | ⊚ | Comparative example |
| A-80 | GA-5 | 7 | 43 | 7.9 × 10$^6$ | 0 | 100 | 0 | 1.09 | ⊚ | Invention Example |
| A-81 | GA-6 | 8 | 40 | 9.3 × 10$^6$ | 0 | 100 | 0 | 1.12 | ⊚ | Invention Example |

TABLE 6-continued

| Condition | Type of steel plate | Dendrite arm interval (μm) | Carbide Average size (nm) | Carbide Number density (number/mm²) | Welded portion structure volume rate Fresh martensite (%) | Welded portion structure volume rate Tempered martensite (%) | Welded portion structure volume rate Retained austenite (%) | Welded joint strength ratio (high-strength steel plate/mild steel plate) | Strength fluctuation | Reference |
|---|---|---|---|---|---|---|---|---|---|---|
| A-82 | CR-6 | 7 | 38 | $8.8 \times 10^6$ | 0 | 100 | 0 | 1.13 | ◎ | Invention Example |
| A-83 | EG-2 | 7 | 32 | $9.5 \times 10^6$ | 0 | 100 | 0 | 1.18 | ◎ | Invention Example |
| A-84 | GA-7 | 7 | 48 | $1.3 \times 10^7$ | 0 | 100 | 0 | 1.11 | ◎ | Invention Example |
| A-85 | CR-7 | 7 | 50 | $2.0 \times 10^6$ | 0 | 100 | 0 | 1.18 | ◎ | Comparative example |
| A-86 | GA-8 | 8 | 38 | $1.1 \times 10^7$ | 0 | 100 | 0 | 0.87 | X | Comparative example |

As represented in Table 5, in examples of the present invention under the conditions No. A-1, No. A-3, NO. A-4, No. A-7, No. A-8, No. A-11 to No. A-13, No. A-15 to No. A-17, No. A-19 to No. A-21, No. A-24-No. A-27, No. A-29 to No. A-34, and No. A-38 to No. A-40, requirements prescribed in claim 1 were fulfilled, and so spot welded joints which had superior joint strengths and in which strength fluctuation was small could be obtained. Similarly, as represented in Table 6, also in examples of the present invention under conditions No. A-41, No. A-44, No. A-46, No. A-48 to No. A-52, No. A-54, No. A-55, No. A-58, No. A-59, No. A-62, No. A-63, No. A-65 to No. A-67, No. A-69 to No. A-73, No. A-77, No. A-78, and No. A-80 to No. A-84, the requirements prescribed in claim 1 were fulfilled, and so spot welded joints which had superior joint strengths and in which strength fluctuation was small could be obtained.

In contrast, as represented in Table 5, in comparative examples under conditions No. A-2, No. A-5, No. A-6, No. A-9, No. A-10, No. A-14, No. A-18, No. A-22, No. A-23, No. A-28, and No. A-35 to No. A-37, at least one of the requirements prescribed in claim 1 was not fulfilled, and thus joint strengths were low. Further, in some of comparative examples, fluctuation of joint strength was large. Similarly, as represented in Table 6, in comparative examples under conditions No. A-42, No. A-43, No. A-45, No. A-47, No. A-53, No. A-56, No. A-57, No. A-60, No. A-61, No. A-64, No. A-68, No. A-74 to No. A-76, No. A-79, and No. A-86, at least one of the requirements prescribed in claim 1 was not fulfilled, and thus the joint strengths were low.

In other words, in the comparative examples under conditions No. A-2, No. A-23, No. A-36, No. A-53, and No. A-74, due to a reason that cooling after welding energization was not performed or that cooling times Ct after welding energization were too short, cooling speeds after welding could not be made large, and thus dendrite arm intervals were large. Thus, segregation of P and S was large, and carbides could not be precipitated sufficiently even if heat treatments after welding were performed.

In the comparative examples under conditions No. A-5, No. A-37, No. A-56, and No. A-75, due to a reason that cooling times Ct after welding energization were too long, proper post-heating energization could not be done. Thus, carbides could not be precipitated sufficiently.

In the comparative examples under the conditions No. A-6, No. A-9, No. A-10, No. A-28, No. A-42, No. A-43, No. A-57, No. A-60, No. A-61, and No. A-76, due to a reason that currents PC or times Pt after post-heating energization were excessive or insufficient, carbides could not be precipitated sufficiently.

In the comparative examples under the conditions No. A-14, A-47, and A-64, though processings as far as release of pressurizing were those within a range prescribed in claim 6, thereafter heat treatments after welding were started without performing sufficient cooling, and thus microstructures in nuggets could not be made to be structures mainly consisting of tempered martensite. Thus, even if heat treatments after welding were done, retained austenite and/or fresh martensite were apt to remain, and so carbides could not be precipitated sufficiently.

In the comparative examples under the conditions No. A-18, No. A-35, No. A-45, No. A-68, and No. A-79, though processings as far as release of pressurizing were within the range prescribed in claim 6, due to a reason that temperatures of heat treatments after welding thereafter were too high, coarse carbides were precipitated into former austenite grain boundaries in shapes of network, so that cracks in nuggets could not be suppressed.

In the comparative example under the condition No. A-22, though the processings as far as release of pressurizing were within the range prescribed in claim 6, due to a reason that a time of a heat treatment after welding thereafter was too long, a coarse carbide was precipitated into a former austenite grain boundary in a shape of network, so that a crack in a nugget could not be suppressed.

In the comparative example under the condition No. A-86, since a carbon equivalent Ceq of a steel plate was too high, a joint strength was low and fluctuation of strength was large. Further, under the condition No. A-85, since a carbon equivalent Ceq of the steel plate was less than 0.22 mass %, an Ms point was sufficiently high, and only for that reason, martensite was tempered sufficiently, so that a high joint strength was obtained.

Example 2

Structure observation test pieces of 40 mm×40 mm were fabricated with the use of mild steel plates (CR270E), strain induced transformation type steel plates (CR780T, CR980T), dual phase composition type steel plates (CR980Y, CR1180Y, CR1470Y, GA980Y, GA1180Y), and quenching type steel plates (CR1470HP, CR1760HP, CR1900HP, A11470HP) whose thicknesses were 1.2 mm or 1.6 mm and whose tensile strengths were 295 MPa to 1905 MPa, as represented in Table 7 and Table 8 below. Among respective symbols, CR indicates a cold-rolled steel plate, GA indicates a galvanized alloyed steel plate, and Al indicates an aluminum-plated steel plate, while a numeric value indicates a strength level represented by a tensile strength.

Further, the cross tensile test pieces were fabricated based on a cross tensile test method (JIS Z3137) of a resistance spot welded joint. Here, among steel types represented in Table 7 and Table 8, CR270E, CR980Y, CR1180Y, CR1470Y, GA980Y, and GA1180Y indicate Japan Iron and Steel Federation standard products (JSC270E, JSC980Y, JSC1180Y, JSC1470Y, JAC980Y, and JAC1180Y), CR780T and CR980T indicate strain induced transformation type steel plates described in Japanese Laid-open Patent Publication No. 11-270682 and the like, and CR1470HP, CR1760HP, CR1960HP, and A11470HP indicate hot-pressed (hot stamped) steel plate disclosed in Japanese Laid-open Patent Publication No. 2000-234153 and the like.

Next, as illustrated in FIG. 3A to FIG. 3C, the above-described structure observation test pieces were overlapped in combination of the same steel type and the same thickness, and were welded by a resistance spot welding method under conditions represented in Table 7 and Table 8, and thereby welding test pieces were fabricated. It should be noted that condition represented in Table 7 fulfills the conditions prescribed in claim 6, while the condition represented in Table 8 does not fulfill at least one of conditions prescribed in claim 6. Then, visual observation of degrees of recesses of welded portions in the obtained welding test pieces was done. Further, macrostructure observation of cross sections was performed with the use of an optical microscope, and nugget diameters were measured. Further, presence/absence of contraction defects and presence/absence of cracks in nuggets were observed. Further, similarly to in the example 1, in portions about 0.2 mm inside from boundaries between the nuggets and high-strength steel plates toward nugget centers in nugget outer layer zones, microstructures were observed with the use of the optical microscope, and average values of arm intervals of dendrite structures, and average grain diameters and number densities of carbides were measured.

Figure 7:
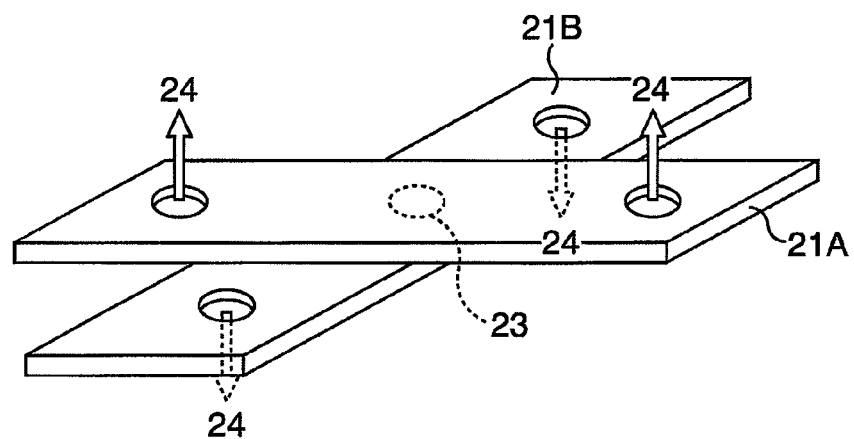
FIG. 7 is a schematic diagram illustrating a cross tensile test method.

Further, with the above-described cross tensile test pieces, based on a cross tensile test method (JIS Z3137) of a resistance spot welded joint, the test pieces were overlapped in a crossed shape illustrated in FIG. 7, and spot welding was performed under the conditions represented in Table 7 and Table 8, and thereby cross tensile test pieces were fabricated. It should be noted that three cross tensile test pieces were fabricated under similar conditions.

Then, a cross tensile test was performed by applying loads in a peel direction, that is, as indicated by a reference number 24 in FIG. 7, in directions to peel a test piece 21A of an upper side in an upper direction and a test piece 21B of a lower side in a lower direction each other, and a cross tensile strength (CTS) was measured.

Figure 8:
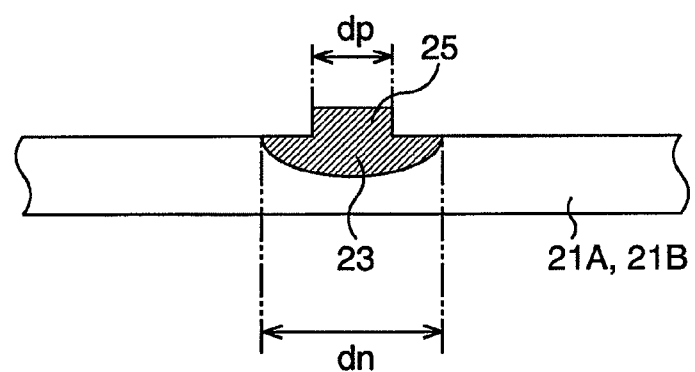
FIG. 8 is a schematic diagram illustrating an example of a nugget after a fracture.
Figure 9A:
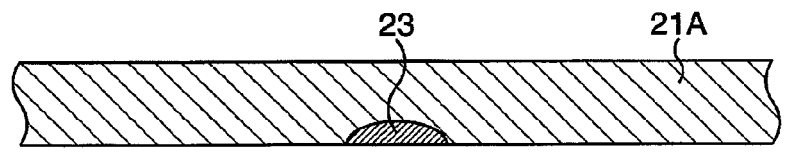
FIG. 9A is a schematic diagram illustrating a peel fracture.
Figure 9B:
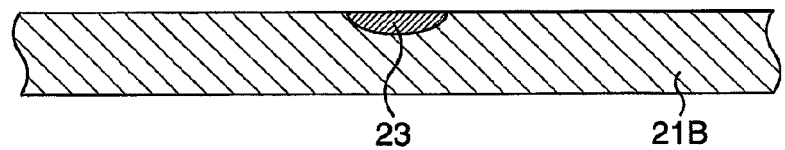
FIG. 9B is a schematic diagram illustrating a plug fracture.
Figure 9C:
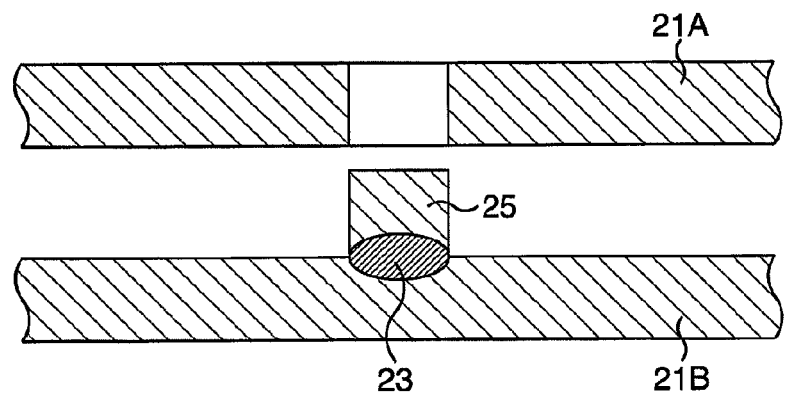
FIG. 9C is a schematic diagram illustrating a partial plug fracture.

Further, after the cross tensile test was performed, a fracture appearance of a welded portion was observed per each test piece. On this occasion, when a protruding portion (a plug) 25 which included a nugget 23 remained in the welded portion as illustrated in FIG. 8, a diameter of the protruding portion 25 (a plug diameter dp) was measured and a ratio (a plug rate: dp/dn) to a nugget diameter do was calculated. Then, as illustrated in FIG. 9A to FIG. 9C, when a peel and a fracture occurred in the nugget 23 it was judged to be a peel fracture (FIG. 9A), when a diameter of the plug 25 was almost the same as the nugget diameter it was judged to be a plug fracture (FIG. 9B), and when the diameter of the plug 25 was obviously smaller than the nugget diameter it was judged to be a partial plug fracture (FIG. 9C). Further, a fracture surface after the cross tensile test was observed using a magnifier or an SEM, thereby to investigate whether a brittle fracture surface was observed.

Table 7 and Table 8 represent lists of fabrication conditions and test results of respective test pieces in the example 2. It should be noted that a holding time indicated in a column of a welding condition indicates an actual holding time. Though it is difficult to set a holding time at 0 ms in an existing welding machine, in the present example a case of holding time of 0 ms is also shown by using a special signal in a welding machine.

It should be noted that, with regard to evaluation of CTS fluctuation, with average values and minimum values of the cross tensile test pieces, a standard of the following four stages of "⊚" to "×" is provided.

"⊚: minimal" A minimum value was equal to or less than 10% in relation to an average value of cross tensile strengths "○: small" A minimum value was over 10% to equal to or less than 15% in relation to an average value of cross tensile strengths "Δ: slightly large" A minimum value was over 15% to equal to or less than 20% in relation to an average value of cross tensile strengths "×: large" A minimum value was over 20% in relation to an average value of cross tensile strengths

TABLE 7

| Condition | Steel type | Thickness (h) (mm) | Tensile strength (MPa) | Carbon equivalent (Ceq) (%) | Electrode tip diameter (mm) | Pressurizing force (EF) (N) | First energization (welding) | | Cooling time (Ct) (ms) | Second energization (post-heating) | | Holding time (Ht) (ms) | Nugget diameter (mm) |
|---|---|---|---|---|---|---|---|---|---|---|---|---|---|
| | | | | | | | Current (WC) (kA) | Time (Wt) (ms) | | Current (PC) (kA) | Time (Pt) (ms) | | |
| B-1 | CR780T | 1.6 | 836 | 0.33 | 8.0 | 4704 | 6.30 | 360 | 40 | 5.04 | 80 | 40 | 5.4 |
| B-2 | CR980Y | | 1034 | 0.23 | | | 6.50 | | | 5.20 | | | |
| B-3 | CR980Y | | 1022 | 0.31 | | | 6.30 | | | 5.04 | | | |
| B-4 | CR980T | | 987 | 0.40 | | | 6.00 | | | 4.80 | | | |
| B-5 | CR980T | | 993 | 0.48 | | | 5.90 | | | 4.72 | | | |
| B-6 | CR1180Y | | 1196 | 0.34 | | | 6.30 | | | 5.04 | | | |
| B-7 | CR1470Y | | 1488 | 0.35 | | | 6.30 | | | 5.04 | | | |
| B-8 | CR1470HP | | 1485 | 0.34 | | | 6.20 | | | 4.96 | | | |
| B-9 | CR1760HP | | 1773 | 0.38 | | | 6.10 | | | 4.88 | | | |
| B-10 | GA980Y | | 1050 | 0.23 | | | 6.80 | | | 5.44 | | | |
| B-11 | GA1180Y | | 1192 | 0.34 | | | 6.60 | | | 5.28 | | | |
| B-12 | Al1470HP | | 1495 | 0.34 | | | 6.40 | | | 5.12 | | | |
| B-13 | CR780T | 1.2 | 832 | 0.33 | 6.0 | 2940 | 5.60 | 280 | 40 | 4.48 | 80 | 40 | 4.7 |
| B-14 | CR980T | | 998 | 0.48 | | | 5.40 | | | 4.32 | | | |
| B-15 | CR1180Y | | 1196 | 0.34 | | | 5.60 | | | 4.48 | | | |
| B-16 | CR1470HP | | 1488 | 0.34 | | | 5.60 | | | 4.48 | | | |
| B-17 | CR980T | 1.6 | 987 | 0.40 | 8.0 | 4704 | 6.60 | 380 | 40 | 5.28 | 80 | 40 | 6.3 |
| B-18 | CR1180Y | | 1196 | 0.34 | | | 6.90 | | | 5.52 | | | |
| B-19 | CR780T | 1.6 | 752 | 0.33 | 8.0 | 4704 | 6.30 | 360 | 40 | 5.04 | 80 | 40 | 5.4 |
| B-20 | CR1760HP | | 1848 | 0.38 | | | 6.10 | | | 4.88 | | | |
| B-21 | CR980Y | | 1022 | 0.22 | | | 6.50 | | | 5.20 | | | |
| B-22 | CR980T | | 998 | 0.55 | | | 5.90 | | | 4.72 | | | |
| B-23 | CR1180Y | 1.6 | 1196 | 0.34 | 8.0 | 3136 | 6.30 | 360 | 40 | 5.04 | 80 | 40 | 5.4 |
| B-24 | | | | | | 5488 | | | | | | | |

TABLE 7-continued

| Condition | | | | | | | | | | | | |
|---|---|---|---|---|---|---|---|---|---|---|---|---|
| B-25 | | | | 4704 | | | 17 | | | | | |
| B-26 | | | | | | | 300 | | | | | |
| B-27 | | | | | | | 40 | 2.52 | | | | |
| B-28 | | | | | | | | 5.99 | | | | |
| B-29 | | | | | | | | 5.04 | 33 | | | |
| B-30 | | | | | | | | | 200 | | | |
| B-31 | | | | | | | | | 80 | 0 | | |
| B-32 | | | | | | | | | | 240 | | |

| Condition | Dendrite arm interval | Average grain diameter of carbides | Number density of carbides | Contraction defect presence/absence | Crack presence/absence | Recess of welded portion | Fracture appearance | Plug rate | Brittle fracture surface | CTS (kN) | CTS fluctuation | Reference |
|---|---|---|---|---|---|---|---|---|---|---|---|---|
| B-1  | ○ | ○ | ○ | Absent | Absent | ○ | P | ◎ | ○ | 12.07 | ○ | Invention example |
| B-2  | ○ | ○ | ○ | Absent | Absent | ○ | P | ◎ | ○ | 11.75 | ○ | |
| B-3  | ○ | ○ | ○ | Absent | Absent | ○ | P | ◎ | ○ | 11.67 | ○ | |
| B-4  | ○ | ○ | ○ | Absent | Absent | ○ | P | ◎ | ○ | 7.91  | ○ | |
| B-5  | ○ | ○ | ○ | Absent | Absent | ○ | P | ◎ | ○ | 6.22  | ○ | |
| B-6  | ○ | ○ | ○ | Absent | Absent | ○ | P | ◎ | ○ | 10.72 | ○ | |
| B-7  | ○ | ○ | ○ | Absent | Absent | ○ | P | ◎ | ○ | 10.09 | ○ | |
| B-8  | ○ | ○ | ○ | Absent | Absent | ○ | P | ◎ | ○ | 9.98  | ○ | |
| B-9  | ○ | ○ | ○ | Absent | Absent | ○ | P | ◎ | ○ | 8.13  | ○ | |
| B-10 | ○ | ○ | ○ | Absent | Absent | ○ | P | ◎ | ○ | 11.72 | ○ | |
| B-11 | ○ | ○ | ○ | Absent | Absent | ○ | P | ◎ | ○ | 10.69 | ○ | |
| B-12 | ○ | ○ | ○ | Absent | Absent | ○ | P | ◎ | ○ | 9.76  | ○ | |
| B-13 | ○ | ○ | ○ | Absent | Absent | ○ | P | ◎ | ○ | 9.05  | ○ | |
| B-14 | ○ | ○ | ○ | Absent | Absent | ○ | P | ◎ | ○ | 4.67  | ○ | |
| B-15 | ○ | ○ | ○ | Absent | Absent | ○ | P | ◎ | ○ | 8.04  | ○ | |
| B-16 | ○ | ○ | ○ | Absent | Absent | ○ | P | ◎ | ○ | 7.49  | ○ | |
| B-17 | ○ | ○ | ○ | Absent | Absent | ○ | P | ◎ | ○ | 9.23  | ○ | |
| B-18 | ○ | ○ | ○ | Absent | Absent | ○ | P | ◎ | ○ | 12.51 | ○ | |
| B-19 | ○ | ○ | ○ | Absent | Absent | ○ | P | ◎ | ○ | 11.87 | ○ | |
| B-20 | ○ | ○ | ○ | Absent | Absent | ○ | P | ◎ | ○ | 7.94  | ○ | |
| B-21 | ○ | ○ | ○ | Absent | Absent | ○ | P | ◎ | ○ | 11.77 | ○ | |
| B-22 | ○ | ○ | ○ | Absent | Absent | ○ | P | ◎ | ○ | 6.03  | ○ | |
| B-23 | ○ | ○ | ○ | Absent | Absent | ○ | P | ◎ | ○ | 11.47 | ○ | |
| B-24 | ○ | ○ | ○ | Absent | Absent | ○ | P | ◎ | ○ | 10.51 | ○ | |
| B-25 | ○ | ○ | ○ | Absent | Absent | ○ | P | ◎ | ○ | 10.72 | ○ | |
| B-26 | ○ | ○ | ○ | Absent | Absent | ○ | P | ◎ | ○ | 10.67 | ○ | |
| B-27 | ○ | ○ | ○ | Absent | Absent | ○ | P | ◎ | ○ | 10.58 | ○ | |
| B-28 | ○ | ○ | ○ | Absent | Absent | ○ | P | ◎ | ○ | 10.84 | ○ | |
| B-29 | ○ | ○ | ○ | Absent | Absent | ○ | P | ◎ | ○ | 10.61 | ○ | |
| B-30 | ○ | ○ | ○ | Absent | Absent | ○ | P | ◎ | ○ | 10.67 | ○ | |
| B-31 | ○ | ○ | ○ | Absent | Absent | ○ | P | ◎ | ○ | 10.81 | ○ | |
| B-32 | ○ | ○ | ○ | Absent | Absent | ○ | P | ◎ | ○ | 10.58 | ○ | |

Dendrite arm interval
○: average value is equal to or less than 12 μm,
X: average value is larger than 12 μm,
Average grain diameter of carbides
○: 5 nm to 100 nm,
X: other than 5 nm to 100 nm,
Number density of carbides
○: equal to or more than $2 \times 10^6/mm^2$,
X: less than $2 \times 10^6/mm^2$
Recess of welded portion
○: small,
Δ: medium,
X: large Fracture appearance
P: plug fracture,
PP: partial plug fracture,
S: peel fracture
Plug rate
◎: 91 to 100%,
○: 81 to 90%,
Δ: 71 to 80%,
X: equal to or less than 70%
Brittle fracture surface
◎: not recognized,
○: slightly recognized,
Δ: recognized,
X: largely recognized
CTS fluctuation
◎: quite small,
○: small,
Δ: somewhat large,
X: large

TABLE 8

| Condition | Steel type | Thickness (h) (mm) | Tensile strength (MPa) | Carbon equivalent (Ceq) (%) | Electrode tip diameter (mm) | Pressurizing force (EF) (N) | First energization (welding) Current (WC) (kA) | First energization (welding) Time (Wt) (ms) | Cooling time (Ct) (ms) | Second energization (post-heating) Current (PC) (kA) | Second energization (post-heating) Time (Pt) (ms) | Holding time (Ht) (ms) | Nugget diameter (mm) |
|---|---|---|---|---|---|---|---|---|---|---|---|---|---|
| B-33 | CR270E | 1.2 | 295 | 0.05 | 6.0 | 2940 | 6.80 | 280 | — | — | — | 40 | 4.7 |
| B-34 |  | 1.6 | 298 | 0.05 | 8.0 | 4704 | 6.90 | 360 |  |  |  |  | 5.4 |
| B-35 | CR780T | 1.6 | 836 | 0.33 | 8.0 | 4704 | 6.30 | 360 | — | — | — | 40 | 5.4 |
| B-36 | CR980Y |  | 1034 | 0.23 |  |  | 6.50 |  |  |  |  |  |  |
| B-37 | CR980Y |  | 1022 | 0.31 |  |  | 6.30 |  |  |  |  |  |  |
| B-38 | CR980T |  | 987 | 0.40 |  |  | 6.00 |  |  |  |  |  |  |
| B-39 | CR980T |  | 993 | 0.48 |  |  | 5.90 |  |  |  |  |  |  |
| B-40 | CR1180Y |  | 1196 | 0.34 |  |  | 6.30 |  |  |  |  |  |  |
| B-41 | CR1470Y |  | 1488 | 0.35 |  |  | 6.30 |  |  |  |  |  |  |
| B-42 | CR1470HP |  | 1485 | 0.34 |  |  | 6.20 |  |  |  |  |  |  |
| B-43 | CR1760HP |  | 1773 | 0.38 |  |  | 6.10 |  |  |  |  |  |  |
| B-44 | GA980Y |  | 1050 | 0.23 |  |  | 6.80 |  |  |  |  |  |  |
| B-45 | GA1180Y |  | 1192 | 0.34 |  |  | 6.60 |  |  |  |  |  |  |
| B-46 | Al1470HP |  | 1495 | 0.34 |  |  | 6.40 |  |  |  |  |  |  |
| B-47 | CR780T | 1.2 | 832 | 0.33 | 6.0 | 2940 | 5.60 | 280 | — | — | — | 40 | 4.7 |
| B-48 | CR980T |  | 998 | 0.48 |  |  | 5.40 |  |  |  |  |  |  |
| B-49 | CR1180Y |  | 1196 | 0.34 |  |  | 5.60 |  |  |  |  |  |  |
| B-50 | CR1470HP |  | 1488 | 0.34 |  |  | 5.60 |  |  |  |  |  |  |
| B-51 | CR980T | 1.6 | 987 | 0.40 | 8.0 | 4704 | 6.60 | 360 | — | — | — | 40 | 6.3 |
| B-52 | CR1180Y |  | 1196 | 0.34 |  |  | 6.90 |  |  |  |  |  |  |
| B-53 | CR1960HP | 1.6 | 1905 | 0.40 | 8.0 | 4704 | 6.10 | 360 | 40 | 4.88 | 80 | 40 | 5.4 |
| B-54 | CR980T |  | 998 | 0.60 |  |  | 5.80 |  |  | 4.64 |  |  |  |
| B-55 | CR1180Y | 1.6 | 1196 | 0.34 | 8.0 | 2842 | 6.30 | 360 | 40 | 5.04 | 80 | 40 | 5.4 |
| B-56 |  |  |  |  |  | 5782 |  |  |  |  |  |  |  |
| B-57 |  |  |  |  |  | 4704 |  |  | 0 |  |  |  |  |
| B-58 |  |  |  |  |  |  |  |  | 320 |  |  |  |  |
| B-59 |  |  |  |  |  |  |  |  | 40 | 2.21 |  |  |  |
| B-60 |  |  |  |  |  |  |  |  |  | 6.17 |  |  |  |
| B-61 |  |  |  |  |  |  |  |  |  | 5.04 | 20 |  |  |
| B-62 |  |  |  |  |  |  |  |  |  |  | 220 |  |  |
| B-63 |  |  |  |  |  |  |  |  |  |  | 80 | 260 |  |

| Condition | Dendrite arm interval | Average grain diameter of carbides | Number density of carbides | Contraction defect presence/absence | Crack presence/absence | Recess of welded portion | Fracture appearance | Plug rate | Brittle fracture surface | CTS (kN) | CTS fluctuation | Reference |
|---|---|---|---|---|---|---|---|---|---|---|---|---|
| B-33 | X | X | X | Absent | Absent | ◯ | P | ◎ | ◎ | 5.12 | ◎ | Comparative example |
| B-34 | X | X | X | Absent | Absent | ◯ | P | ◎ | ◎ | 8.06 | ◎ |  |
| B-35 | X | X | X | Absent | Absent | ◯ | PP | Δ | Δ | 8.87 | Δ |  |
| B-36 | X | X | X | Absent | Absent | ◯ | PP | Δ | Δ | 7.68 | Δ |  |
| B-37 | X | X | X | Absent | Absent | ◯ | PP | Δ | Δ | 7.56 | Δ |  |
| B-38 | X | X | X | Absent | Absent | ◯ | PP | X | X | 5.54 | X |  |
| B-39 | X | X | X | Absent | Absent | ◯ | PP | X | X | 4.16 | X |  |
| B-40 | X | X | X | Absent | Absent | ◯ | PP | X | X | 6.31 | X |  |
| B-41 | X | X | X | Absent | Absent | ◯ | PP | X | X | 5.94 | X |  |
| B-42 | X | X | X | Absent | Absent | ◯ | PP | X | X | 5.82 | X |  |
| B-43 | X | X | X | Absent | Absent | ◯ | PP | X | X | 5.14 | X |  |
| B-44 | X | X | X | Absent | Absent | ◯ | PP | Δ | Δ | 7.62 | Δ |  |
| B-45 | X | X | X | Absent | Absent | ◯ | PP | X | X | 6.29 | X |  |
| B-46 | X | X | X | Absent | Absent | ◯ | PP | X | X | 5.86 | X |  |
| B-47 | X | X | X | Absent | Absent | ◯ | PP | Δ | Δ | 6.65 | Δ |  |
| B-48 | X | X | X | Absent | Absent | ◯ | PP | X | X | 3.12 | X |  |
| B-49 | X | X | X | Absent | Absent | ◯ | PP | X | X | 4.73 | X |  |
| B-50 | X | X | X | Absent | Absent | ◯ | PP | X | X | 4.37 | X |  |
| B-51 | X | X | X | Absent | Absent | ◯ | PP | X | X | 6.46 | X |  |
| B-52 | X | X | X | Absent | Absent | ◯ | PP | X | X | 7.36 | X |  |
| B-53 | X | X | X | Present | Absent | ◯ | PP | X | X | 4.14 | X |  |
| B-54 | X | X | X | Absent | Present | ◯ | PP | X | X | 3.78 | X |  |
| B-55 | ◯ | ◯ | ◯ | Present | Absent | ◯ | P | ◎ | ◯ | 11.63 | ◯ |  |
| B-56 | ◯ | ◯ | ◯ | Absent | Absent | X | PP | Δ | Δ | 8.32 | Δ |  |
| B-57 | X | X | X | Absent | Absent | ◯ | PP | X | X | 6.29 | X |  |
| B-58 | ◯ | ◯ | ◯ | Absent | Absent | ◯ | PP | Δ | Δ | 8.76 | Δ |  |
| B-59 | X | X | X | Absent | Absent | ◯ | PP | X | X | 6.78 | X |  |
| B-60 | X | X | X | Absent | Absent | ◯ | PP | X | X | 7.25 | X |  |
| B-61 | X | X | X | Absent | Absent | ◯ | PP | X | X | 7.06 | X |  |

TABLE 8-continued

| | | | | | | | | | | | | |
|---|---|---|---|---|---|---|---|---|---|---|---|---|
| B-62 | ○ | ○ | ○ | Absent | Absent | ○ | PP | Δ | Δ | 8.65 | Δ |
| B-63 | ○ | ○ | ○ | Absent | Absent | ○ | PP | Δ | Δ | 9.06 | Δ |

Dendrite arm interval
○: average value is equal to or less than 12 μm,
X: average value is larger than 12 μm
Average grain diameter of carbides
○: 5 nm to 100 nm,
X: other than 5 nm to 100 nm
Number density of carbides
○: equal to or more than $2 \times 10^6/mm^2$,
X: less than $2 \times 10^6/mm^2$
Recess of welded portion
○: small,
Δ: medium,
X: large
Fracture appearance
P: plug fracture,
PP: partial plug fracture,
S: peel fracture
Plug rate
◉: 91 to 100%,
○: 81 to 90%,
Δ: 71 to 80%,
X: equal to or less than 70%
Brittle fracture surface
◉: not recognized,
○: slightly recognized,
Δ: recognized,
X: largely recognized
CTS fluctuation
◉: quite small,
○: small,
Δ: somewhat large,
X: large The conditions No. B-1 to No. B-32 represented in Table 7 are examples of the present invention, while the conditions No. B-33 to No. B-63 represented in Table 8 are comparative examples. In other words, as described above, the condition represented in Table 7 fulfilled the conditions prescribed in claim 6, and the condition represented in Table 8 did not fulfill at least one of the conditions prescribed in claim 6.

Among the above, in the conditions No. B-1 to No. B-12 steel plates having a thickness of 1.6 mm were varied in steel types, in the conditions No. B-13 to No. B-16 steel plates having a thickness of 1.2 mm were varied in steel types, and in the conditions No. B-17 and No. B-18 steel plates having a thickness of 1.6 mm were varied from the conditions No. B-4 and No. B-6 in nugget diameters. Further, in the conditions No. B-19 to No. B-22 steel plates having a thickness of 1.6 mm were varied in tensile strengths or carbon equivalents, and in the conditions No. B-23 to B-32, using steel plates having a thickness of 1.6 mm, welding conditions were varied within a range prescribed in claim 6.

Further, in the conditions No. B-35 to No. B-52 welding was performed by a conventional known method, as comparative examples. In other words, post-heating energization was not performed. In the conditions No. B-35 to No. B-46 steel plates having a thickness of 1.6 mm were varied in steel types, in the conditions No. B-47 to No. B-50 steel plates having a thickness of 1.2 mm were varied in steel types, and in the conditions No. B-51 and No. B-52 steel plates having a thickness of 1.6 mm were varied from the conditions No. B-38 and No. B-40 in nugget diameters. Further, in the conditions No. B-53 to No. B-54 tensile strengths and carbon equivalents of high-strength steel plates were varied out of a range prescribed in claim 6. Further, in the conditions No. B-55 to No. B-63, using steel plates having a thickness of 1.6 mm, welding conditions were varied out of the range prescribed in claim 6. It should be noted that in the conditions No. B-33 to No. B-34 mild steel plates (thicknesses: 1.2 mm, 1.6 mm) whose tensile strengths and carbon equivalents were quite low were used, for the sake of comparison.

As represented in Table 7, in the examples of the present invention under the conditions No. B-1 to No. B-32, conditions prescribed in claim 6 were fulfilled, and thus a dendrite arm interval, an average grain diameter of carbides, and a number density of carbides in any steel type were within a range of the present invention. Further, it was confirmed that a contraction defect or a crack did not occur and that a recess in a welded portion was small. As a result, in the conditions No. B-1 to No. B-32, fracture appearances were of plug fractures, plug rates were large, and brittle fracture surfaces were not recognized. Further, it was confirmed that CTS was high and that fluctuation of CTS was small compared with comparative examples under conditions No. B-35 to No. B-52 in Table 8, in which post-heating energization was not performed.

On the other hand, as represented in Table 8, in the comparative examples under conditions No. B-53 to No. B-63, the conditions prescribed in claim 6 were not fulfilled, and thus a dendrite arm interval, an average grain diameter of carbides, and a number density of carbides in any steel type were out of the range of the present invention. Further, any one of an occurrence of a contraction defect or a crack, a large recess in a welded portion, decrease of a plug rate due to an occurrence of a partial plug fracture, and an occurrence of a brittle fracture surface was recognized. Further, it was confirmed that CTS was low and that fluctuation of CTS was large.

In the comparative example under the condition No. B-55 in which a pressurizing force EF was low, it was confirmed that a fracture appearance was of a plug fracture, that a plug rate was large, that a brittle fracture surface was not recognized, that a CTS was high, and that fluctuation of CTS was small, but this comparative example is not desirable since a contraction defect had occurred. Further, in the comparative examples under the condition No. B-56 in which a pressurizing force EF was high, under the condition No. B-58 in which a cooling time Ct after welding was long, under the condition No. B-62 in which a post-heating energization time Pt was long, and under the condition No. B-63 in which a holding time Ht was long, an effect of each condition was recognized, but the effect was small and productivity was reduced in such cases, and thus those comparative examples are not desirable.

Example 3

With use of various kinds of steel plates similar to those of the above-described example 2 as represented in Table 9 and Table 10 below, structure observation test pieces and cross tensile test pieces were fabricated by processes similar to those of the example 2, and various tests were performed in similar methods. On this occasion, pressurizing forces EF in spot welding of the above-described respective test pieces were conditions represented in Table 9 and Table 10. Other conditions were within a range similar to that of the above-described example 2. It should be noted that the condition represented in Table 9 fulfilled conditions prescribed in claim 7 and that condition represented in Table 10 did not fulfill at least one of the conditions prescribed in claim 7.

Table 9 and Table 10 represent lists of fabrication conditions and test results of respective test pieces in the example 3.

TABLE 9

| Condition | Steel type | Thickness (h) (mm) | Tensile strength (MPa) | Carbon equivalent (Ceq) (%) | Electrode tip diameter (mm) | Pressurizing force (EF) (N) | First energization (welding) | | Cooling time (Ct) (ms) | Second energization (post-heating) | | Holding time (Ht) (ms) | Nugget diameter (mm) |
|---|---|---|---|---|---|---|---|---|---|---|---|---|---|
| | | | | | | | Current (WC) (kA) | Time (Wt) (ms) | | Current (PC) (kA) | Time (Pt) (ms) | | |
| C-1 | CR780T | 1.6 | 836 | 0.33 | 8.0 | 2744 | 6.30 | 360 | 40 | 5.04 | 80 | 40 | 5.4 |
| C-2 | CR980Y | | 1034 | 0.23 | | | 6.50 | | | 5.20 | | | |
| C-3 | CR980Y | | 1022 | 0.31 | | | 6.30 | | | 5.04 | | | |
| C-4 | CR980T | | 987 | 0.40 | | | 6.00 | | | 4.80 | | | |
| C-5 | CR980T | | 993 | 0.48 | | | 5.90 | | | 4.72 | | | |
| C-6 | CR1180Y | | 1196 | 0.34 | | | 6.30 | | | 5.04 | | | |
| C-7 | CR1470Y | | 1488 | 0.35 | | | 6.30 | | | 5.04 | | | |
| C-8 | CR1470HP | | 1485 | 0.34 | | | 6.20 | | | 4.96 | | | |
| C-9 | CR1760HP | | 1773 | 0.38 | | | 6.10 | | | 4.88 | | | |
| C-10 | GA980Y | | 1050 | 0.23 | | | 6.80 | | | 5.44 | | | |
| C-11 | GA1180Y | | 1192 | 0.34 | | | 6.60 | | | 5.28 | | | |
| C-12 | Al1470HP | | 1495 | 0.34 | | | 6.40 | | | 5.12 | | | |
| C-13 | CR780T | 1.2 | 832 | 0.33 | 6.0 | 2058 | 5.60 | 280 | 40 | 4.48 | 80 | 40 | 4.7 |
| C-14 | CR980T | | 998 | 0.48 | | | 5.40 | | | 4.32 | | | |
| C-15 | CR1180Y | | 1196 | 0.34 | | | 5.60 | | | 4.48 | | | |
| C-16 | CR1470HP | | 1488 | 0.34 | | | 5.60 | | | 4.48 | | | |
| C-17 | CR980T | 1.6 | 987 | 0.40 | 8.0 | 2744 | 6.60 | 360 | 40 | 5.28 | 80 | 40 | 6.3 |
| C-18 | CR1180Y | | 1196 | 0.34 | | | 6.90 | | | 5.52 | | | |
| C-19 | CR780T | 1.6 | 752 | 0.33 | 8.0 | 2744 | 6.30 | 360 | 40 | 5.04 | 80 | 40 | 5.4 |
| C-20 | CR1760HP | | 1848 | 0.38 | | | 6.10 | | | 4.88 | | | |
| C-21 | CR980Y | | 1022 | 0.22 | | | 6.50 | | | 5.20 | | | |
| C-22 | CR980T | | 998 | 0.55 | | | 5.90 | | | 4.72 | | | |
| C-23 | CR1180Y | 1.6 | 1196 | 0.34 | 8.0 | 2352 | 6.30 | 380 | 40 | 4.48 | 80 | 40 | 5.4 |
| C-24 | | | | | | 3038 | | | | | | | |
| C-25 | | | | | | 2744 | | | | | | | |
| C-26 | | | | | | | | | 17 | | | | |
| C-27 | | | | | | | | | 300 | | | | |
| C-28 | | | | | | | | | 40 | 2.52 | | | |
| C-29 | | | | | | | | | | 5.99 | | | |
| C-30 | | | | | | | | | | 4.48 | 33 | | |
| C-31 | | | | | | | | | | | 200 | | |
| C-32 | | | | | | | | | | | 80 | 0 | |
| | | | | | | | | | | | | 240 | |

| Condition | Dendrite arm interval | Average grain diameter of carbides | Number density of carbides | Contraction defect presence/absence | Crack presence/absence | Recess of welded portion | Fracture appearance | Plug rate | Brittle fracture surface | CTS (kN) | CTS fluctuation | Reference |
|---|---|---|---|---|---|---|---|---|---|---|---|---|
| C-1 | ○ | ○ | ○ | Present | Absent | ○ | P | ⊚ | ○ | 13.28 | ○ | Invention example |
| C-2 | ○ | ○ | ○ | Present | Absent | ○ | P | ⊚ | ○ | 12.93 | ○ | |
| C-3 | ○ | ○ | ○ | Present | Absent | ○ | P | ⊚ | ○ | 12.84 | ○ | |
| C-4 | ○ | ○ | ○ | Present | Absent | ○ | P | ⊚ | ○ | 8.70 | ○ | |
| C-5 | ○ | ○ | ○ | Present | Absent | ○ | P | ⊚ | ○ | 6.84 | ○ | |
| C-6 | ○ | ○ | ○ | Present | Absent | ○ | P | ⊚ | ○ | 11.79 | ○ | |
| C-7 | ○ | ○ | ○ | Present | Absent | ○ | P | ⊚ | ○ | 11.10 | ○ | |
| C-8 | ○ | ○ | ○ | Present | Absent | ○ | P | ⊚ | ○ | 10.98 | ○ | |
| C-9 | ○ | ○ | ○ | Present | Absent | ○ | P | ⊚ | ○ | 8.95 | ○ | |
| C-10 | ○ | ○ | ○ | Present | Absent | ○ | P | ⊚ | ○ | 12.89 | ○ | |

TABLE 9-continued

| | | | | | | | | | | | | |
|---|---|---|---|---|---|---|---|---|---|---|---|---|
| C-11 | ○ | ○ | ○ | Present | Absent | ○ | P | ◉ | ○ | 11.76 | ○ | |
| C-12 | ○ | ○ | ○ | Present | Absent | ○ | P | ◉ | ○ | 10.74 | ○ | |
| C-13 | ○ | ○ | ○ | Present | Absent | ○ | P | ◉ | ○ | 9.96 | ○ | |
| C-14 | ○ | ○ | ○ | Present | Absent | ○ | P | ◉ | ○ | 5.13 | ○ | |
| C-15 | ○ | ○ | ○ | Present | Absent | ○ | P | ◉ | ○ | 8.84 | ○ | |
| C-16 | ○ | ○ | ○ | Present | Absent | ○ | P | ◉ | ○ | 8.23 | ○ | |
| C-17 | ○ | ○ | ○ | Present | Absent | ○ | P | ◉ | ○ | 10.15 | ○ | |
| C-18 | ○ | ○ | ○ | Present | Absent | ○ | P | ◉ | ○ | 13.76 | ○ | |
| C-19 | ○ | ○ | ○ | Present | Absent | ○ | P | ◉ | ○ | 13.06 | ○ | |
| C-20 | ○ | ○ | ○ | Present | Absent | ○ | P | ◉ | ○ | 8.73 | ○ | |
| C-21 | ○ | ○ | ○ | Present | Absent | ○ | P | ◉ | ○ | 12.95 | ○ | |
| C-22 | ○ | ○ | ○ | Present | Absent | ○ | P | ◉ | ○ | 6.63 | ○ | |
| C-23 | ○ | ○ | ○ | Present | Absent | ○ | P | ◉ | ○ | 11.72 | ○ | |
| C-24 | ○ | ○ | ○ | Present | Absent | ○ | P | ◉ | ○ | 11.55 | ○ | |
| C-25 | ○ | ○ | ○ | Present | Absent | ○ | P | ◉ | ○ | 11.79 | ○ | |
| C-26 | ○ | ○ | ○ | Present | Absent | ○ | P | ◉ | ○ | 11.74 | ○ | |
| C-27 | ○ | ○ | ○ | Present | Absent | ○ | P | ◉ | ○ | 11.64 | ○ | |
| C-28 | ○ | ○ | ○ | Present | Absent | ○ | P | ◉ | ○ | 11.92 | ○ | |
| C-29 | ○ | ○ | ○ | Present | Absent | ○ | P | ◉ | ○ | 11.72 | ○ | |
| C-30 | ○ | ○ | ○ | Present | Absent | ○ | P | ◉ | ○ | 11.88 | ○ | |
| C-31 | ○ | ○ | ○ | Present | Absent | ○ | P | ◉ | ○ | 11.97 | ○ | |
| C-32 | ○ | ○ | ○ | Present | Absent | ○ | P | ◉ | ○ | 11.64 | ○ | |

Dendrite arm interval
○: average value is equal to or less than 12 μm,
X: average value is larger than 12 μm
Average grain diameter of carbides
○: 5 nm to 100 nm,
X: other than 5 nm to 100 nm
Number density of carbides
○: equal to or more than $2 \times 10^6/mm^2$,
X: less than $2 \times 10^6/mm^2$
Recess of welded portion
○: small,
Δ: medium,
X: large
Fracture appearance
P: plug fracture,
PP: partial plug fracture,
S: peel fracture
Plug rate
◉: 91 to 100%,
○: 81 to 90%,
Δ: 71 to 80%,
X: equal to or less than 70%
Brittle fracture surface
◉: not recognized,
○: slightly recognized,
Δ: recognized,
X: largely recognized
CTS fluctuation
◉: quite small,
○: small,
Δ: somewhat large,
X: large

TABLE 10

| Condition | Steel type | Thickness (h) (mm) | Tensile strength (MPa) | Carbon equivalent (Ceq) (%) | Electrode tip diameter (mm) | Pressurizing force (EF) (N) | First energization (welding) | | Cooling time (Ct) (ms) | Second energization (post-heating) | | Holding time (Ht) (ms) | Nugget diameter (mm) |
|---|---|---|---|---|---|---|---|---|---|---|---|---|---|
| | | | | | | | Current (WC) (kA) | Time (Wt) (ms) | | Current (PC) (kA) | Time (Pt) (ms) | | |
| C-33 | CR270E | 1.2 | 295 | 0.05 | 6.0 | 2940 | 6.80 | 280 | — | — | — | 40 | 4.7 |
| C-34 | | 1.6 | 298 | 0.05 | 8.0 | 4704 | 6.90 | 360 | | | | | 5.4 |
| C-35 | CR780T | 1.6 | 836 | 0.33 | 8.0 | 2744 | 6.30 | 360 | — | — | — | 40 | 5.4 |
| C-36 | CR980Y | | 1034 | 0.23 | | | 6.50 | | | | | | |
| C-37 | CR980Y | | 1022 | 0.31 | | | 6.30 | | | | | | |

TABLE 10-continued

| Condition | | | | | | | | | | | | | |
|---|---|---|---|---|---|---|---|---|---|---|---|---|---|
| C-38 | CR980T | | 987 | 0.40 | | | 6.00 | | | | | | |
| C-39 | CR980T | | 993 | 0.48 | | | 5.90 | | | | | | |
| C-40 | CR1180Y | | 1196 | 0.34 | | | 6.30 | | | | | | |
| C-41 | CR1470Y | | 1188 | 0.35 | | | 6.30 | | | | | | |
| C-42 | CR1470HP | | 1485 | 0.34 | | | 6.20 | | | | | | |
| C-43 | CR1760HP | | 1773 | 0.38 | | | 6.10 | | | | | | |
| C-44 | GA980Y | | 1050 | 0.23 | | | 6.80 | | | | | | |
| C-45 | GA1180Y | | 1192 | 0.34 | | | 6.60 | | | | | | |
| C-46 | A11470HP | | 1495 | 0.34 | | | 6.40 | | | | | | |
| C-47 | CR780T | 1.2 | 832 | 0.33 | 6.0 | 2058 | 5.60 | 280 | — | — | — | 40 | 4.7 |
| C-48 | CR980T | | 998 | 0.48 | | | 5.40 | | | | | | |
| C-49 | CR1180Y | | 1196 | 0.34 | | | 5.60 | | | | | | |
| C-50 | CR1470HP | | 1488 | 0.34 | | | 5.60 | | | | | | |
| C-51 | CR980T | 1.6 | 987 | 0.40 | 8.0 | 2744 | 6.60 | 360 | — | — | — | 40 | 6.3 |
| C-52 | CR1180Y | | 1196 | 0.34 | | | 6.90 | | | | | | |
| C-53 | CR1960HP | 1.6 | 1905 | 0.40 | 8.0 | 2744 | 6.10 | 360 | 40 | 4.88 | 80 | 40 | 5.4 |
| C-54 | CR980T | | 998 | 0.60 | | | 5.80 | | | 4.64 | | | |
| C-55 | CR1180Y | 1.6 | 1196 | 0.34 | 8.0 | 2254 | 6.30 | 360 | 40 | 5.04 | 80 | 40 | 5.4 |
| C-56 | | | | | | 3234 | | | | | | | |
| C-57 | | | | | | 2744 | | | 0 | | | | |
| C-58 | | | | | | | | 320 | | | | | |
| C-59 | | | | | | | | | 40 | 2.21 | | | |
| C-60 | | | | | | | | | | 6.17 | | | |
| C-61 | | | | | | | | | | 5.04 | 20 | | |
| C-62 | | | | | | | | | | | 220 | | |
| C-63 | | | | | | | | | | | 80 | 260 | |

| Condition | Dendrite arm interval | Average grain diameter of carbides | Number density of carbides | Contraction defect presence/ absence | Crack presence/ absence | Recess of welded portion | Fracture appearance | Plug rate | Brittle fracture surface | CTS (kN) | CTS fluctuation | Reference |
|---|---|---|---|---|---|---|---|---|---|---|---|---|
| C-33 | X | X | X | Absent | Absent | ○ | P | ◎ | ◎ | 5.12 | ◎ | Comparative example |
| C-34 | X | X | X | Absent | Absent | ○ | P | ◎ | ◎ | 8.06 | ◎ | |
| C-35 | X | X | X | Present | Present | ○ | PP | Δ | Δ | 9.76 | Δ | |
| C-36 | X | X | X | Present | Present | ○ | PP | Δ | Δ | 8.45 | Δ | |
| C-37 | X | X | X | Present | Present | ○ | PP | Δ | Δ | 8.32 | Δ | |
| C-38 | X | X | X | Present | Present | ○ | PP | X | X | 6.09 | X | |
| C-39 | X | X | X | Present | Present | ○ | PP | X | X | 4.58 | X | |
| C-40 | X | X | X | Present | Present | ○ | PP | X | X | 6.94 | X | |
| C-41 | X | X | X | Present | Present | ○ | PP | X | X | 6.53 | X | |
| C-42 | X | X | X | Present | Present | ○ | PP | X | X | 6.40 | X | |
| C-43 | X | X | X | Present | Present | ○ | PP | X | X | 5.65 | X | |
| C-44 | X | X | X | Present | Present | ○ | PP | Δ | Δ | 8.38 | Δ | |
| C-45 | X | X | X | Present | Present | ○ | PP | X | X | 6.92 | X | |
| C-46 | X | X | X | Present | Present | ○ | PP | X | X | 6.45 | X | |
| C-47 | X | X | X | Present | Present | ○ | PP | Δ | Δ | 7.32 | Δ | |
| C-48 | X | X | X | Present | Present | ○ | PP | X | X | 3.43 | X | |
| C-49 | X | X | X | Present | Present | ○ | PP | X | X | 5.21 | X | |
| C-50 | X | X | X | Present | Present | ○ | PP | X | X | 4.80 | X | |
| C-51 | X | X | X | Present | Present | ○ | PP | X | X | 7.11 | X | |
| C-52 | X | X | X | Present | Present | ○ | PP | X | X | 8.10 | X | |
| C-53 | X | X | X | Present | Present | ○ | PP | X | X | 4.55 | X | |
| C-54 | X | X | X | Present | Present | ○ | PP | X | X | 4.16 | X | |
| C-55 | ○ | ○ | ○ | Present | Present | ○ | PP | X | X | 7.73 | X | |
| C-56 | ○ | ○ | ○ | Absent | Absent | ○ | P | ◎ | ○ | 11.27 | ○ | |
| C-57 | X | X | X | Present | Present | ○ | PP | X | X | 6.92 | X | |
| C-58 | ○ | ○ | ○ | Present | Present | ○ | PP | Δ | Δ | 9.27 | Δ | |
| C-59 | X | X | X | Present | Present | ○ | PP | X | X | 7.33 | X | |
| C-60 | X | X | X | Present | Present | ○ | PP | X | X | 7.68 | X | |
| C-61 | X | X | X | Present | Present | ○ | PP | X | X | 7.69 | X | |

TABLE 10-continued

| C-62 | ○ | ○ | ○ | Present | Present | ○ | PP | Δ | Δ | 9.26 | Δ |
| C-63 | ○ | ○ | ○ | Present | Present | ○ | PP | Δ | Δ | 10.38 | Δ |

Dendrite arm interval
○: average value is equal to or less than 12 μm,
X: average value is larger than 12 μm
Average grain diameter of carbides
○: 5 nm to 100 nm,
X: other than 5 nm to 100 nm
Number density of carbides
○: equal to or more than $2 \times 10^6/mm^2$,
X: less than $2 \times 10^6/mm^2$
Recess of welded portion
○: small,
Δ: medium,
X: large
Fracture appearance
P: plug fracture,
PP: partial plug fracture,
S: peel fracture
Plug rate
◎: 91 to 100%,
○: 81 to 90%,
Δ: 71 to 80%,
X: equal to or less than 70%
Brittle fracture surface
◎: not recognized,
○: slightly recognized,
Δ: recognized,
X: largely recognized
CTS fluctuation
◎: quite small,
○: small,
Δ: somewhat large,
X: large Conditions No. C-1 to No. C-32 represented in Table 9 are examples of the present invention, while conditions No. C-33 to No. C-63 represented in Table 10 are comparative examples. In other words, as described above, the condition represented in Table 9 fulfilled conditions prescribed in claim 7, while the condition represented in Table 10 did not fulfill at least one of the conditions prescribed in claim 7.

Among the above, in the conditions No. C-1 to No. C-12 steel plates having a thickness of 1.6 mm were varied in steel types, in the conditions No. C-13 to No. C-16 steel plates having a thickness of 1.2 mm were varied in steel types, and in the conditions No. C-17 and No. C-18 steel plates having a thickness of 1.6 mm were varied from the conditions No. C-4 and No. C-6 in nugget diameters. Further, in the conditions No. C-19 to No. C-22 steel plates having a thickness of 1.6 mm were varied in tensile strengths or carbon equivalents, and in the conditions No. C-23 to C-32, using steel plates having a thickness of 1.6 mm, welding conditions were varied within a range prescribed in claim 7.

Further, in the conditions No. C-35 to No. C-52 welding was performed by a conventional known method, as comparative examples. In other words, post-heating energization was not performed. In the conditions No. C-35 to No. C-46 steel plates having a thickness of 1.6 mm were varied in steel types, in the conditions No. C-47 to No. C-50 steel plates having a thickness of 1.2 mm were varied in steel types, and in the conditions No. C-51 and No. C-52 steel plates having a thickness of 1.6 mm were varied from the conditions No. C-38 and No. C-40 in nugget diameters. Further, in the conditions No. C-53 to No. C-54 tensile strengths and carbon equivalents of high-strength steel plates were varied out of the range prescribed in claim 7. Further, in the conditions No. C-55 to No. C-63, using steel plates having a thickness of 1.6 mm, welding conditions were varied out of the range prescribed in claim 7. It should be noted that in the conditions No. C-33 to No. C-34 mild steel plates (thicknesses: 1.2 mm, 1.6 mm) whose tensile strengths and carbon equivalents were quite low are used, for the sake of comparison.

As represented in Table 9, in the examples of the present invention under the conditions No. C-1 to No. C-32, conditions prescribed in claim 7 were fulfilled and pressurizing forces EF were set to be rather low, and thus a dendrite arm interval, average grain diameter of carbides, and number density of carbides in any steel type were within a range of the present invention, though a slight contraction defect is found in a nugget. Further, it was confirmed that a crack did not occur and that a recess in a welded portion was small. As a result, in the conditions No. C-1 to No. C-32, fracture appearances were of plug fractures, plug rates were large, and brittle fracture surfaces were not recognized. Further, it was confirmed that CTSs were high and fluctuation of CTS was small compared with comparative examples under the conditions No. C-35 to No. C-52 in Table 10, in which post-heating energization was not performed. Further, CTSs were high compared with the conditions No. B-1 to No. B-32 of the example 2.

On the other hand, as represented in Table 10, in the comparative examples under conditions No. C-51 to No. C-63, the conditions prescribed in claim 7 were not fulfilled, and thus a dendrite arm interval, an average grain diameter of carbides, and a number density of carbides were out of the range of the present invention, in a case of use of any steel type. Further, any one of an occurrence of a contraction defect or a crack, a large recess in a welded portion, decrease of a plug rate due to an occurrence of a partial plug fracture, and an occurrence of a brittle fracture surface was recognized. Further, it was confirmed that CTSs were low and that fluctuation of CTS was large.

In the comparative example under the condition No. C-56 in which a pressurizing force EF was high, the conditions prescribed in claim 6 were fulfilled, and thus an effect similar to that of the example was recognized. Further, in the comparative examples under the condition No. C-58 in which a cooling time Ct after welding was long, under the condition No. C-62 in which a post-heating energization time Pt was long, and under the condition No. C-63 in which a holding time Ht was long, an effect of each condition was recognized, but the effect was small and productivity was reduced in such cases, and thus those comparative examples are not desirable.

Example 4

With use of various kinds of steel plates similar to those in the above-described example 2 and example 3 as represented in Table 11 and Table 12 below, structure observation test pieces and cross tensile test pieces were fabricated by processes similar to those of the example 2 and the example 3, and various tests were performed in similar methods. On this occasion, after pressuring at pressurizing forces EF was released, heat treatments after welding were performed under conditions represented in Table 11 and Table 12. Other conditions were within a range similar to that of the above-described example 2. It should be noted that the condition represented in Table 11 fulfilled conditions prescribed in claims 6 and 8 and that the condition represented in Table 12 did not fulfill at least one of the conditions prescribed in claims 6 and 8.

Table 11 and Table 12 represent lists of fabrication conditions and test results of respective test pieces in the example 4.

TABLE 11

| Condition | Steel type | Thickness (h) (mm) | Tensile strength (MPa) | Carbon equivalent (Ceq) (%) | Electrode tip diameter (mm) | Pressurizing force (EF) (N) | First energization (welding) Current (WC) (kA) | First energization (welding) Time (Wt) (ms) | Cooling time (Ct) (ms) | Second energization (post-heating) Current (PC) (kA) | Second energization (post-heating) Time (Pt) (ms) |
|---|---|---|---|---|---|---|---|---|---|---|---|
| D-1 | CR780T | 1.6 | 836 | 0.33 | 8.0 | 4704 | 6.30 | 360 | 90 | 5.04 | 80 |
| D-2 | CR980Y | | 1039 | 0.23 | | | 6.50 | | | 5.20 | |
| D-3 | CR980Y | | 1022 | 0.31 | | | 6.30 | | | 5.04 | |
| D-4 | CR980T | | 987 | 0.40 | | | 6.00 | | | 4.80 | |
| D-5 | CR980T | | 993 | 0.48 | | | 5.90 | | | 4.72 | |
| D-6 | CR1180Y | | 1196 | 0.34 | | | 6.30 | | | 5.04 | |
| D-7 | CR1470 Y | | 1488 | 0.35 | | | 6.30 | | | 5.04 | |
| D-8 | CR1470HP | | 1485 | 0.34 | | | 6.20 | | | 4.96 | |
| D-9 | CR1760HP | | 1773 | 0.38 | | | 6.10 | | | 4.88 | |
| D-10 | GA980Y | | 1050 | 0.23 | | | 6.80 | | | 5.44 | |
| D-11 | GA1180Y | | 1192 | 0.34 | | | 6.60 | | | 5.28 | |
| D-12 | A11470HP | | 1496 | 0.34 | | | 6.40 | | | 5.12 | |
| D-13 | CR780T | 1.2 | 832 | 0.33 | 6.0 | 2940 | 5.60 | 280 | 40 | 4.48 | 80 |
| D-14 | CR980T | | 998 | 0.48 | | | 5.40 | | | 4.32 | |
| D-15 | CR1180Y | | 1196 | 0.34 | | | 5.60 | | | 4.48 | |
| D-16 | CR1470HP | | 1488 | 0.34 | | | 5.60 | | | 4.48 | |
| D-17 | CR980T | 1.6 | 987 | 0.40 | 8.0 | 4704 | 6.60 | 360 | 40 | 5.28 | 80 |
| D-18 | CR1180Y | | 1196 | 0.34 | | | 6.90 | | | 5.52 | |
| D-19 | CR780T | 1.6 | 752 | 0.33 | 8.0 | 4704 | 6.30 | 360 | 40 | 5.04 | 80 |
| D-20 | CR1760HP | | 1848 | 0.38 | | | 6.10 | | | 4.88 | |
| D-21 | CR980Y | | 1022 | 0.22 | | | 6.50 | | | 5.20 | |
| D-22 | CR980T | | 998 | 0.55 | | | 5.90 | | | 4.72 | |
| D-23 | CR1180Y | 1.6 | 1196 | 0.34 | 8.0 | 3136 | 6.30 | 360 | 40 | 5.04 | 80 |
| D-24 | | | | | | 5488 | | | | | |
| D-25 | | | | | | 4704 | | | | 17 | |
| D-26 | | | | | | | | | | 300 | |
| D-27 | | | | | | | | | | 40 | 2.52 |
| D-28 | | | | | | | | | | | 5.99 |
| D-29 | | | | | | | | | | 5.04 | 33 |
| D-30 | | | | | | | | | | | 200 |
| D-31 | | | | | | | | | | | 80 |
| D-32 | | | | | | | | | | | |
| D-33 | | | | | | | | | | | |
| D-34 | | | | | | | | | | | |
| D-35 | | | | | | | | | | | |
| D-36 | | | | | | | | | | | |
| D-37 | | | | | | | | | | | |

| Condition | Holding time (Ht) (ms) | Nugget diameter (mm) | Heat treatment temperature (AT) (°C.) | Heat treatment time (At) (s) | Temperature before heat treatment (CT) (°C.) | Dendrite arm interval | Average grain diameter of carbides | Number density of carbides | Contraction defect presence/absence | Crack presence/absence | Recess of welded portion |
|---|---|---|---|---|---|---|---|---|---|---|---|
| D-1 | 40 | 5.4 | 170 | 1200 | Room temperature | ◯ | ◯ | ◯ | Absent | Absent | ◯ |
| D-2 | | | | | | ◯ | ◯ | ◯ | Absent | Absent | ◯ |
| D-3 | | | | | | ◯ | ◯ | ◯ | Absent | Absent | ◯ |

TABLE 11-continued

| | | | | | | | | | | | |
|---|---|---|---|---|---|---|---|---|---|---|---|
| D-4 | | | | | | ○ | ○ | ○ | Absent | Absent | ○ |
| D-5 | | | | | | ○ | ○ | ○ | Absent | Absent | ○ |
| D-6 | | | | | | ○ | ○ | ○ | Absent | Absent | ○ |
| D-7 | | | | | | ○ | ○ | ○ | Absent | Absent | ○ |
| D-8 | | | | | | ○ | ○ | ○ | Absent | Absent | ○ |
| D-9 | | | | | | ○ | ○ | ○ | Absent | Absent | ○ |
| D-10 | | | | | | ○ | ○ | ○ | Absent | Absent | ○ |
| D-11 | | | | | | ○ | ○ | ○ | Absent | Absent | ○ |
| D-12 | | | | | | ○ | ○ | ○ | Absent | Absent | ○ |
| D-13 | 40 | 4.7 | 170 | 1200 | | ○ | ○ | ○ | Absent | Absent | ○ |
| D-14 | | | | | | ○ | ○ | ○ | Absent | Absent | ○ |
| D-15 | | | | | | ○ | ○ | ○ | Absent | Absent | ○ |
| D-16 | | | | | | ○ | ○ | ○ | Absent | Absent | ○ |
| D-17 | 40 | 6.3 | 170 | 1200 | | ○ | ○ | ○ | Absent | Absent | ○ |
| D-18 | | | | | | ○ | ○ | ○ | Absent | Absent | ○ |
| D-19 | 40 | 5.4 | 170 | 1200 | | ○ | ○ | ○ | Absent | Absent | ○ |
| D-20 | | | | | | ○ | ○ | ○ | Absent | Absent | ○ |
| D-21 | | | | | | ○ | ○ | ○ | Absent | Absent | ○ |
| D-22 | | | | | | ○ | ○ | ○ | Absent | Absent | ○ |
| D-23 | 40 | 5.4 | 170 | 1200 | | ○ | ○ | ○ | Absent | Absent | ○ |
| D-24 | | | | | | ○ | ○ | ○ | Absent | Absent | ○ |
| D-25 | | | | | | ○ | ○ | ○ | Absent | Absent | ○ |
| D-26 | | | | | | ○ | ○ | ○ | Absent | Absent | ○ |
| D-27 | | | | | | ○ | ○ | ○ | Absent | Absent | ○ |
| D-28 | | | | | | ○ | ○ | ○ | Absent | Absent | ○ |
| D-29 | | | | | | ○ | ○ | ○ | Absent | Absent | ○ |
| D-30 | | | | | | ○ | ○ | ○ | Absent | Absent | ○ |
| D-31 | 0 | | | | | ○ | ○ | ○ | Absent | Absent | ○ |
| D-32 | 240 | | | | | ○ | ○ | ○ | Absent | Absent | ○ |
| D-33 | 40 | | 120 | | | ○ | ○ | ○ | Absent | Absent | ○ |
| D-34 | | | 220 | | | ○ | ○ | ○ | Absent | Absent | ○ |
| D-35 | | | 170 | 100 | | ○ | ○ | ○ | Absent | Absent | ○ |
| D-36 | | | | 6000 | | ○ | ○ | ○ | Absent | Absent | ○ |
| D-37 | | | | 1200 | 150 | ○ | ○ | ○ | Absent | Absent | ○ |

| Condition | Fracture appearance | Plug rate | Brittle fracture surface | CTS (kN) | CTS fluctuation | Reference |
|---|---|---|---|---|---|---|
| D-1 | P | ◎ | ○ | 14.48 | ○ | Invention example |
| D-2 | P | ◎ | ○ | 14.10 | ○ | |
| D-3 | P | ◎ | ○ | 14.00 | ○ | |
| D-4 | P | ◎ | ○ | 9.49 | ○ | |
| D-5 | P | ◎ | ○ | 7.46 | ○ | |
| D-6 | P | ◎ | ○ | 12.86 | ○ | |
| D-7 | P | ◎ | ○ | 12.11 | ○ | |
| D-8 | P | ◎ | ○ | 11.98 | ○ | |
| D-9 | P | ◎ | ○ | 9.76 | ○ | |
| D-10 | P | ◎ | ○ | 14.06 | ○ | |
| D-11 | P | ◎ | ○ | 12.82 | ○ | |
| D-12 | P | ◎ | ○ | 11.71 | ○ | |
| D-13 | P | ◎ | ○ | 10.86 | ○ | |
| D-14 | P | ◎ | ○ | 5.60 | ○ | |
| D-15 | P | ◎ | ○ | 9.65 | ○ | |
| D-16 | P | ◎ | ○ | 8.98 | ○ | |
| D-17 | P | ◎ | ○ | 11.07 | ○ | |
| D-18 | P | ◎ | ○ | 15.01 | ○ | |
| D-19 | P | ◎ | ○ | 14.24 | ○ | |
| D-20 | P | ◎ | ○ | 9.53 | ○ | |
| D-21 | P | ◎ | ○ | 14.12 | ○ | |
| D-22 | P | ◎ | ○ | 7.24 | ○ | |
| D-23 | P | ◎ | ○ | 13.71 | ○ | |
| D-24 | P | ◎ | ○ | 12.65 | ○ | |
| D-25 | P | ◎ | ○ | 12.74 | ○ | |
| D-26 | P | ◎ | ○ | 12.56 | ○ | |
| D-27 | P | ◎ | ○ | 12.48 | ○ | |
| D-28 | P | ◎ | ○ | 12.76 | ○ | |
| D-29 | P | ◎ | ○ | 12.51 | ○ | |
| D-30 | P | ◎ | ○ | 12.78 | ○ | |

TABLE 11-continued

| | | | | | | |
|---|---|---|---|---|---|---|
| D-31 | P | ◉ | ○ | 12.92 | ○ | |
| D-32 | P | ◉ | ○ | 12.76 | ○ | |
| D-33 | P | ◉ | ○ | 12.56 | ○ | |
| D-34 | P | ◉ | ○ | 12.78 | ○ | |
| D-35 | P | ◉ | ○ | 12.59 | ○ | |
| D-36 | P | ◉ | ○ | 12.75 | ○ | |
| D-37 | P | ◉ | ○ | 12.82 | ○ | |

Dendrite arm interval
○: average value is equal to or less than 12 μm,
X: average value is larger than 12 μm
Average grain diameter of carbides
○: 5 nm to 100 nm,
X: other than 5 nm to 100 nm
Number density of carbides
○: equal to or more than $2 \times 10^6/mm^2$,
X: less than $2 \times 10^6/mm^2$
Recess of welded portion
○: small,
Δ: medium,
X: large
Fracture appearance
P: plug fracture,
PP: partial plug fracture,
S: peel fracture
Plug rate
◉: 91 to 100%,
○: 81 to 90%,
Δ: 71 to 80%,
X: equal to or less than 70%
Brittle fracture surface
◉: not recognized,
○: slightly recognized,
Δ: recognized,
X: largely recognized
CTS fluctuation
◉: quite small,
○: small,
Δ: somewhat large,
X: large

TABLE 12

| Condition | Steel type | Thickness (h) (mm) | Tensile strength (MPa) | Carbon equivalent (Ceq) (%) | Electrode tip diameter (mm) | Pressurizing force (EF) (N) | First energization (welding) Current (WC) (kA) | First energization (welding) Time (Wt) (ms) | Cooling time (Ct) (ms) | Second energization (post-heating) Current (PC) (kA) | Second energization (post-heating) Time (Pt) (ms) | Holding time (Ht) (ms) | Nugget diameter (mm) | Heat treatment temperature (AT) (°C.) |
|---|---|---|---|---|---|---|---|---|---|---|---|---|---|---|
| D-38 | CR270E | 1.2 | 295 | 0.05 | 6.0 | 2940 | 6.80 | 280 | — | — | — | 40 | 4.7 | — |
| D-39 | | 1.6 | 298 | 0.05 | 8.0 | 4704 | 6.90 | 360 | | | | | 5.4 | — |
| D-40 | CR780T | 1.6 | 836 | 0.33 | 8.0 | 4704 | 6.30 | 360 | — | — | — | 40 | 5.4 | 170 |
| D-41 | CR980Y | | 1034 | 0.23 | | | 6.50 | | | | | | | |
| D-42 | CR980Y | | 1022 | 0.31 | | | 6.30 | | | | | | | |
| D-43 | CR980T | | 987 | 0.40 | | | 6.00 | | | | | | | |
| D-44 | CR980T | | 993 | 0.48 | | | 5.90 | | | | | | | |
| D-45 | CR1180Y | | 1196 | 0.34 | | | 6.30 | | | | | | | |
| D-46 | CR1470Y | | 1488 | 0.35 | | | 6.30 | | | | | | | |
| D-47 | CR1470HP | | 1485 | 0.34 | | | 6.20 | | | | | | | |
| D-48 | CR1760HP | | 1773 | 0.38 | | | 6.10 | | | | | | | |
| D-49 | GA980Y | | 1050 | 0.23 | | | 6.80 | | | | | | | |
| D-50 | GA1180Y | | 1192 | 0.34 | | | 6.60 | | | | | | | |
| D-51 | A11470HP | | 1495 | 0.34 | | | 6.40 | | | | | | | |
| D-52 | CR780T | 1.2 | 832 | 0.33 | 6.0 | 2940 | 5.60 | 280 | — | — | — | 40 | 4.7 | 170 |
| D-53 | CR980T | | 998 | 0.48 | | | 5.40 | | | | | | | |
| D-54 | CR1180Y | | 1196 | 0.34 | | | 5.60 | | | | | | | |
| D-55 | CR1470HP | | 1488 | 0.34 | | | 5.60 | | | | | | | |

TABLE 12-continued

| Condition | | | | | | | | | | | | | | |
|---|---|---|---|---|---|---|---|---|---|---|---|---|---|---|
| D-56 | CR980T | 1.6 | 987 | 0.40 | 8.0 | 4704 | 6.60 | 360 | — | — | — | 40 | 6.3 | 170 |
| D-57 | CR1180Y | | 1196 | 0.34 | | | 6.90 | | | | | | | |
| D-58 | CR1960HP | 1.6 | 1905 | 0.40 | 8.0 | 4704 | 6.10 | 360 | 40 | 4.88 | 80 | 40 | 5.4 | 170 |
| D-59 | CR980T | | 998 | 0.60 | | | 5.80 | | | 4.64 | | | | |
| D-60 | CR1180Y | 1.6 | 1196 | 0.34 | 8.0 | 2842 | 6.30 | 360 | 40 | 5.04 | 80 | 40 | 5.4 | 170 |
| D-61 | | | | | | 5782 | | | | | | | | |
| D-62 | | | | | | 4704 | | | 0 | | | | | |
| D-63 | | | | | | | | | 320 | | | | | |
| D-64 | | | | | | | | | 40 | 2.20 | 80 | | | |
| D-65 | | | | | | | | | | 6.17 | | | | |
| D-66 | | | | | | | | | | 5.04 | 20 | | | |
| D-67 | | | | | | | | | | | 220 | | | |
| D-68 | | | | | | | | | | | 80 | 260 | | |
| D-69 | | | | | | | | | | | | 40 | | 100 |
| D-70 | | | | | | | | | | | | | | 240 |
| D-71 | | | | | | | | | | | | | | 170 |
| D-72 | | | | | | | | | | | | | | |
| D-73 | | | | | | | | | | | | | | |

| Condition | Heat treatment time (At) (s) | Temperature before heat treatment (CT) (°C.) | Dendrite arm interval | Average grain diameter of carbides | Number density of carbides | Contraction defect presence/absence | Crack presence/absence | Recess of welded portion | Fracture appearance | Plug rate | Brittle fracture surface | CTS (kN) | CTS fluctuation | Reference |
|---|---|---|---|---|---|---|---|---|---|---|---|---|---|---|
| D-38 | — | — | X | X | X | Absent | Absent | ○ | P | ◎ | ◎ | 5.12 | ◎ | Comparative example |
| D-39 | — | — | X | X | X | Absent | Absent | ○ | P | ◎ | ◎ | 8.06 | ◎ | |
| D-40 | 1200 | Room temperature | X | X | X | Absent | Absent | ○ | PP | Δ | Δ | 9.76 | Δ | |
| D-41 | | | X | X | X | Absent | Absent | ○ | PP | Δ | Δ | 8.45 | Δ | |
| D-42 | | | X | X | X | Absent | Absent | ○ | PP | Δ | Δ | 8.32 | Δ | |
| D-43 | | | X | X | X | Absent | Absent | ○ | PP | X | X | 6.09 | X | |
| D-44 | | | X | X | X | Absent | Absent | ○ | PP | X | X | 4.58 | X | |
| D-45 | | | X | X | X | Absent | Absent | ○ | PP | X | X | 6.94 | X | |
| D-46 | | | X | X | X | Absent | Absent | ○ | PP | X | X | 6.53 | X | |
| D-47 | | | X | X | X | Absent | Absent | ○ | PP | X | X | 6.40 | X | |
| D-48 | | | X | X | X | Absent | Absent | ○ | PP | X | X | 5.65 | X | |
| D-49 | | | X | X | X | Absent | Absent | ○ | PP | Δ | Δ | 8.38 | Δ | |
| D-50 | | | X | X | X | Absent | Absent | ○ | PP | X | X | 6.92 | X | |
| D-51 | | | X | X | X | Absent | Absent | ○ | PP | X | X | 6.45 | X | |
| D-52 | 1200 | | X | X | X | Absent | Absent | ○ | PP | Δ | Δ | 7.32 | Δ | |
| D-53 | | | X | X | X | Absent | Absent | ○ | PP | X | X | 3.63 | X | |
| D-54 | | | X | X | X | Absent | Absent | ○ | PP | X | X | 5.21 | X | |
| D-55 | | | X | X | X | Absent | Absent | ○ | PP | X | X | 4.87 | X | |
| D-56 | 1200 | | X | X | X | Absent | Absent | ○ | PP | X | X | 7.11 | X | |
| D-57 | | | X | X | X | Absent | Absent | ○ | PP | X | X | 8.10 | X | |
| D-58 | 1200 | | X | X | X | Present | Absent | ○ | PP | X | X | 4.65 | X | |
| D-59 | | | X | X | X | Absent | Present | ○ | PP | X | X | 4.26 | X | |
| D-60 | 1200 | | ○ | ○ | ○ | Present | Absent | ○ | P | ◎ | ○ | 13.95 | ○ | |
| D-61 | | | ○ | ○ | ○ | Absent | Absent | X | PP | Δ | Δ | 9.93 | Δ | |
| D-62 | | | X | X | X | Absent | Absent | ○ | PP | X | X | 6.91 | X | |
| D-63 | | | ○ | ○ | ○ | Absent | Absent | ○ | PP | Δ | Δ | 9.58 | Δ | |
| D-64 | | | X | X | X | Absent | Absent | ○ | PP | X | X | 7.43 | X | |
| D-65 | | | X | X | X | Absent | Absent | ○ | PP | X | X | 7.98 | X | |
| D-66 | | | X | X | X | Absent | Absent | ○ | PP | X | X | 7.69 | X | |
| D-67 | | | ○ | ○ | ○ | Absent | Absent | ○ | PP | Δ | Δ | 9.48 | Δ | |
| D-68 | | | ○ | ○ | ○ | Absent | Absent | ○ | PP | Δ | Δ | 9.98 | Δ | |
| D-69 | 1200 | | ○ | ○ | ○ | Absent | Absent | ○ | P | ◎ | ○ | 10.69 | ○ | |
| D-70 | | | ○ | ○ | ○ | Absent | Absent | ○ | P | ◎ | ○ | 11.22 | ○ | |
| D-71 | 80 | | ○ | ○ | ○ | Absent | Absent | ○ | P | ◎ | ○ | 10.70 | ○ | |

TABLE 12-continued

| | | | | | | | | | | | | | | |
|---|---|---|---|---|---|---|---|---|---|---|---|---|---|---|
| D-72 | 6500 | | ○ | ○ | ○ | Absent | Absent | ○ | P | ◎ | ○ | 11.22 | ○ |
| D-73 | 1200 | 200 | ○ | ○ | ○ | Absent | Absent | ○ | P | ◎ | ○ | 10.73 | ○ |

Dendrite arm interval
○: average value is equal to or less than 12 μm,
X: average value is larger than 12 μm
Average grain diameter of carbides
○: 5 nm to 100 nm,
X: other than 5 nm to 100 nm
Number density of carbides
○: equal to or more than $2 \times 10^6/mm^2$,
X: less than $2 \times 10^6/mm^2$
Recess of welded portion
○: small,
Δ: medium,
X: large
Fracture appearance
P: plug fracture,
PP: partial plug fracture,
S: peel fracture
Plug rate
◎: 91 to 100%,
○: 81 to 90%,
Δ: 71 to 80%,
X: equal to or less than 70%
Brittle fracture surface
◎: not recognized,
○: slightly recognized,
Δ: recognized,
X: largely recognized
CTS fluctuation
◎: quite small,
○: small,
Δ: somewhat large,
X: large Conditions No. D-1 to No. D-37 represented in Table 11 are examples of the present invention, while conditions No. D-38 to No. D-73 represented in Table 12 are comparative examples. In other words, as described above, the condition represented in Table 11 fulfilled the conditions prescribed in claims 6 and 8, and the condition represented in Table 12 did not fulfill at least one of the conditions prescribed in claims 6 and 8. It should be noted that if the conditions described in claim 6 are fulfilled a certain effect can be obtained even if the conditions described in claim 8 are not fulfilled, but here for the sake of convenience, those which did not fulfill the conditions prescribed in claim 8 even though fulfilling the conditions prescribed in claim 6 are to be included in the comparative examples.

Among the above, in the examples of the present invention under the conditions No. D-1 to No. D-37, after processings within the range prescribed in claim 6 were performed, heat treatments after welding within a range prescribed in claim 8 was performed. In the conditions No. D-1 to No. D-12 steel plates having a thickness of 1.6 mm were varied in steel types, in the conditions No. D-13 to No. D-16 steel plates having a thickness of 1.2 mm were varied in steel types, and in the conditions No. D-17 and No. D-18 steel plates having a thickness of 1.6 mm were varied from the conditions No. D-4 and No. D-6 in nugget diameters. Further, in the conditions No. D-19 to No. D-22 steel plates having a thickness of 1.6 mm were varied in tensile strengths or carbon equivalents, and in the conditions No. D-23 to D-32, using steel plates having a thickness of 1.6 mm, welding conditions were varied within the range prescribed in claim 6. Further, in the conditions No. D-33 to No. D-36, using steel plates having a thickness of 1.6 mm, conditions of the heat treatments after welding were varied within the range prescribed in claim 8.

Further, in the conditions No. D-40 to No. D-57, welding was performed without performing post-heating energization, as comparative examples. In the conditions No. D-40 to No. D-51 steel plates having a thickness of 1.6 mm were varied in steel types, in the conditions D-52 to D-55 steel plates having a thickness of 1.2 mm were varied in steel types, and in the conditions No. D-56 and No. D-57 steel plates having a thickness of 1.6 mm were varied from the conditions No. D-43 and No. D-45 in nugget diameters. Further, in the conditions No. D-38 to No. D-39 mild steel plates (thicknesses: 1.2 mm, 1.6 mm) whose tensile strengths and carbon equivalents were quite low were used, for the sake of comparison.

As represented in Table 11, in the examples of the present invention under the conditions No. D-1 to No. D-37, the conditions prescribed in claims 6 and 8 were fulfilled, and thus a dendrite arm interval, an average grain diameter of carbides, and a number density of carbides in any steel type were within a range of the present invention. Further, it was confirmed that a contraction defect or a crack did not occur and that a recess in a welded portion was small. As a result, in the conditions No. D-1 to No. D-37, fracture appearances were of plug fractures, plug rates were large, and brittle fracture surfaces were not recognized. Further, it was confirmed that CTSs were high and that fluctuation of CTS was small compared with comparative examples under No. D-40 to No. D-57, in which post-heating energization was not performed.

It is found that in the comparative examples under the conditions No. D-40 to No. D-57, in which heat treatments after welding were performed but post-heating energization was not performed prior thereto, effects by the heat treatment after welding were recognized but the effects were small compared with a case that both post-heating energization and heat treatments after welding were performed.

Further, CTSs in the examples of the present invention under the conditions No. D-1 to No. D-37 represented in Table 11 were higher than in the examples (the examples of the present invention in which heat treatments after welding were not performed) under the conditions No. B-1 to No. B-32 represented in Table 7. This fact indicates that CTS is more improved by a heat treatment after welding.

On the other hand, as represented in Table 12, in the comparative examples under conditions No. D-58 to No. D-68, the conditions prescribed in claim 6 were not fulfilled, and thus any one of reduction of CTS, decrease of a plug rate, and an occurrence of a brittle fracture surface was recognized, in a case of use of any steel types.

Further, in the comparative examples under the conditions No. D-69 to No. D-72, though the conditions prescribed in claim 6 were fulfilled, conditions of heat treatments after welding did not fulfill the conditions prescribed in claim 8. Thus, though effects of post-heating energization after welding were recognized, effects of the heating after welding were not recognized.

In the comparative example under the condition No. D-60 in which a pressurizing force EF was low, it was confirmed that a fracture appearance was of a plug facture, that a plug rate was large, that a brittle fracture surface was not recognized, that a CTS was high, and that fluctuation of CTS was small, but a contraction defect had occurred, and this comparative example is not desirable. Further, under the condition No. D-61 in which a pressurizing force EF was high, under the condition No. D-63 in which a cooling time Ct after welding was long, under the condition No. D-67 in which a post-heating energization time Pt was long, and under the condition No. D-68 in which a holding time Ht was long, an effect of each condition was recognized, but the effect was small and productivity was reduced in such cases, and thus those comparative examples are not desirable. Further, with regard to the conditions No. D-69 to No. D-72 in which the conditions of the heat treatments after welding did not fulfill the conditions prescribed in claim 8, only effects of the post-heating energization after welding were recognized under No. D-69 in which a heat treatment temperature after welding AT was low and under No. D-71 in which a heat treatment time after welding At was short, and in the comparative examples under the condition No. D-70 in which the heat treatment time after welding AT was high and the condition No. D-72 in which the heat treatment time after welding At was long, not only effects of post-heating energization after welding but also effects of heat treatments after welding were recognized, but the effects were small compared with those which fulfilled the conditions prescribed in claim 8.

Example 5

With use of various kinds of steel plates similar to those in the above-described example 2 to example 4 as represented in Table 13 and Table 14 below, structure observation test pieces and cross tensile test pieces were fabricated by processes similar to those of the example 2, and various tests were performed in similar methods. On this occasion, pressurizing forces EF in spot welding of the above-described respective test pieces were conditions represented in Table 13 and Table 14. Other conditions were to be within a range similar to that of the above-described example 2. It should be noted that the condition represented in Table 13 fulfilled conditions prescribed in claims 7 and 8, while the condition represented in Table 14 did not fulfill at least one of the conditions prescribed in claims 7 and 8.

Table 13 and Table 14 represent lists of fabrication conditions and test results of respective test pieces in the example 5.

TABLE 13

| Condition | Steel type | Thickness (h) (mm) | Tensile strength (MPa) | Carbon equivalent (Ceq) (%) | Electrode tip diameter (mm) | Pressurizing force (EF) (N) | First energization (welding) Current (WC) (kA) | First energization (welding) Time (Wt) (ms) | Cooling time (Ct) (ms) | Second energization (post-heating) Current (PC) (kA) | Second energization (post-heating) Time (Pt) (ms) | Holding time (Ht) (ms) | Nugget diameter (mm) | Heat treatment temperature (AT) (°C.) |
|---|---|---|---|---|---|---|---|---|---|---|---|---|---|---|
| E-1 | CR780T | 1.6 | 836 | 0.33 | 8.0 | 2744 | 6.30 | 360 | 40 | 5.04 | 80 | 40 | 5.9 | 170 |
| E-2 | CR980Y | | 1034 | 0.23 | | | 6.50 | | | 5.20 | | | | |
| E-3 | CR980Y | | 1022 | 0.31 | | | 6.30 | | | 5.04 | | | | |
| E-4 | CR980T | | 987 | 0.40 | | | 6.00 | | | 4.80 | | | | |
| E-5 | CR980T | | 993 | 0.48 | | | 5.90 | | | 4.72 | | | | |
| E-6 | CR1180Y | | 1196 | 0.34 | | | 6.30 | | | 5.04 | | | | |
| E-7 | CR1470Y | | 1488 | 0.35 | | | 6.30 | | | 5.04 | | | | |
| E-8 | CR1470HP | | 1485 | 0.34 | | | 6.20 | | | 4.96 | | | | |
| E-9 | CR1760HP | | 1773 | 0.38 | | | 6.10 | | | 4.88 | | | | |
| E-10 | GA980Y | | 1050 | 0.23 | | | 6.80 | | | 5.44 | | | | |
| E-11 | GA1180Y | | 1192 | 0.34 | | | 6.60 | | | 5.28 | | | | |
| E-12 | A11470HP | | 1495 | 0.34 | | | 6.40 | | | 5.12 | | | | |
| E-13 | CR780T | 1.2 | 832 | 0.33 | 6.0 | 2058 | 5.60 | 280 | 40 | 4.48 | 80 | 40 | 4.7 | 170 |
| E-14 | CR980T | | 998 | 0.48 | | | 5.40 | | | 4.32 | | | | |
| E-15 | CR1180Y | | 1196 | 0.34 | | | 5.60 | | | 4.48 | | | | |

TABLE 13-continued

| | | | | | | | | | | | | | |
|---|---|---|---|---|---|---|---|---|---|---|---|---|---|
| E-16 | CR1470HP | | 1488 | 0.34 | | 5.60 | | | 4.48 | | | | |
| E-17 | CR980T | 1.6 | 987 | 0.40 | 8.0 | 2744 | 6.60 | 360 | 40 | 5.28 | 80 | 40 | 6.3 | 170 |
| E-18 | CR1180Y | | 1196 | 0.34 | | | 6.90 | | | 5.52 | | | | |
| E-19 | CR780T | 1.6 | 752 | 0.33 | 8.0 | 2744 | 6.30 | 360 | 40 | 5.04 | 80 | 40 | 5.4 | 170 |
| E-20 | CR1760HP | | 1848 | 0.38 | | | 6.10 | | | 4.88 | | | | |
| E-21 | CR980Y | | 1022 | 0.22 | | | 6.50 | | | 5.20 | | | | |
| E-22 | CR980T | | 998 | 0.55 | | | 5.90 | | | 4.72 | | | | |
| E-23 | CRI180Y | 1.6 | 1196 | 0.34 | 8.0 | 2352 | 6.30 | 360 | 40 | 5.04 | 80 | 40 | 5.4 | 170 |
| E-24 | | | | | | 3038 | | | | | | | | |
| E-25 | | | | | | 2744 | | | 17 | | | | | |
| E-26 | | | | | | | | | 300 | | | | | |
| E-27 | | | | | | | | | 40 | 2.52 | | | | |
| E-28 | | | | | | | | | | 5.99 | | | | |
| E-29 | | | | | | | | | | 5.04 | 33 | | | |
| E-30 | | | | | | | | | | | 200 | | | |
| E-31 | | | | | | | | | | | 80 | 0 | | |
| E-32 | | | | | | | | | | | | 240 | | |
| E-33 | | | | | | | | | | | | 40 | | 120 |
| E-34 | | | | | | | | | | | | | | 220 |
| E-35 | | | | | | | | | | | | | | 170 |
| E-36 | | | | | | | | | | | | | | |
| E-37 | | | | | | | | | | | | | | |

| Condition | Heat treatment time (At) (s) | Temperature before heat treatment (CT) (°C.) | Dendrite arm interval | Average grain diameter of carbides | Number density of carbides | Contraction defect presence/absence | Crack presence/absence | Recess of welded portion | Fracture appearance | Plug rate | Brittle fracture surface | CTS (kN) | CTS fluctuation | Reference |
|---|---|---|---|---|---|---|---|---|---|---|---|---|---|---|
| E-1 | 1200 | Room temperature | ○ | ○ | ○ | Present | Absent | ○ | P | ◉ | ○ | 15.93 | ○ | Invention example |
| E-2 | | | ○ | ○ | ○ | Present | Absent | ○ | P | ◉ | ○ | 15.51 | ○ | |
| E-3 | | | ○ | ○ | ○ | Present | Absent | ○ | P | ◉ | ○ | 15.40 | ○ | |
| E-4 | | | ○ | ○ | ○ | Present | Absent | ○ | P | ◉ | ○ | 10.44 | ○ | |
| E-5 | | | ○ | ○ | ○ | Present | Absent | ○ | P | ◉ | ○ | 8.21 | ○ | |
| E-6 | | | ○ | ○ | ○ | Present | Absent | ○ | P | ◉ | ○ | 14.15 | ○ | |
| E-7 | | | ○ | ○ | ○ | Present | Absent | ○ | P | ◉ | ○ | 13.32 | ○ | |
| E-8 | | | ○ | ○ | ○ | Present | Absent | ○ | P | ◉ | ○ | 13.17 | ○ | |
| E-9 | | | ○ | ○ | ○ | Present | Absent | ○ | P | ◉ | ○ | 10.74 | ○ | |
| E-10 | | | ○ | ○ | ○ | Present | Absent | ○ | P | ◉ | ○ | 15.47 | ○ | |
| E-11 | | | ○ | ○ | ○ | Present | Absent | ○ | P | ◉ | ○ | 14.11 | ○ | |
| E-12 | | | ○ | ○ | ○ | Present | Absent | ○ | P | ◉ | ○ | 12.88 | ○ | |
| E-13 | 1200 | | ○ | ○ | ○ | Present | Absent | ○ | P | ◉ | ○ | 11.95 | ○ | |
| E-14 | | | ○ | ○ | ○ | Present | Absent | ○ | P | ◉ | ○ | 6.16 | ○ | |
| E-15 | | | ○ | ○ | ○ | Present | Absent | ○ | P | ◉ | ○ | 10.61 | ○ | |
| E-16 | | | ○ | ○ | ○ | Present | Absent | ○ | P | ◉ | ○ | 9.88 | ○ | |
| E-17 | 1200 | | ○ | ○ | ○ | Present | Absent | ○ | P | ◉ | ○ | 12.18 | ○ | |
| E-18 | | | ○ | ○ | ○ | Present | Absent | ○ | P | ◉ | ○ | 16.51 | ○ | |
| E-19 | 1200 | | ○ | ○ | ○ | Present | Absent | ○ | P | ◉ | ○ | 15.67 | ○ | |
| E-20 | | | ○ | ○ | ○ | Present | Absent | ○ | P | ◉ | ○ | 10.48 | ○ | |
| E-21 | | | ○ | ○ | ○ | Present | Absent | ○ | P | ◉ | ○ | 15.54 | ○ | |
| E-22 | | | ○ | ○ | ○ | Present | Absent | ○ | P | ◉ | ○ | 7.96 | ○ | |
| E-23 | 1200 | | ○ | ○ | ○ | Present | Absent | ○ | P | ◉ | ○ | 14.35 | ○ | |
| E-24 | | | ○ | ○ | ○ | Present | Absent | ○ | P | ◉ | ○ | 14.22 | ○ | |
| E-25 | | | ○ | ○ | ○ | Present | Absent | ○ | P | ◉ | ○ | 14.08 | ○ | |
| E-26 | | | ○ | ○ | ○ | Present | Absent | ○ | P | ◉ | ○ | 14.20 | ○ | |
| E-27 | | | ○ | ○ | ○ | Present | Absent | ○ | P | ◉ | ○ | 14.07 | ○ | |
| E-28 | | | ○ | ○ | ○ | Present | Absent | ○ | P | ◉ | ○ | 14.28 | ○ | |
| E-29 | | | ○ | ○ | ○ | Present | Absent | ○ | P | ◉ | ○ | 14.02 | ○ | |
| E-30 | | | ○ | ○ | ○ | Present | Absent | ○ | P | ◉ | ○ | 14.18 | ○ | |
| E-31 | | | ○ | ○ | ○ | Present | Absent | ○ | P | ◉ | ○ | 14.28 | ○ | |
| E-32 | | | ○ | ○ | ○ | Present | Absent | ○ | P | ◉ | ○ | 14.18 | ○ | |
| E-33 | | | ○ | ○ | ○ | Present | Absent | ○ | P | ◉ | ○ | 13.75 | ○ | |
| E-34 | | | ○ | ○ | ○ | Present | Absent | ○ | P | ◉ | ○ | 14.26 | ○ | |
| E-35 | 100 | | ○ | ○ | ○ | Present | Absent | ○ | P | ◉ | ○ | 13.74 | ○ | |

TABLE 13-continued

| | | | | | | | | | | | | | | |
|---|---|---|---|---|---|---|---|---|---|---|---|---|---|---|
| E-36 | 6000 | | ○ | ○ | ○ | Present | Absent | ○ | P | ◎ | ○ | 14.24 | ○ |
| E-37 | 1200 | 150 | ○ | ○ | ○ | Present | Absent | ○ | P | ◎ | ○ | 13.92 | ○ |

Dendrite arm interval

○: average value is equal to or less than 12 μm,

X: average value is larger than 12 μm

Average grain diameter of carbides

○: 5 nm to 100 nm,

X: other than 5 nm to 100 nm

Number density of carbides

○: equal to or more than $2 \times 10^6/mm^2$,

X: less than $2 \times 10^6/mm^2$

Recess of welded portion

○: small,

Δ: medium,

X: large

Fracture appearance

P: plug fracture,

PP: partial plug fracture,

S: peel fracture

Plug rate

◎: 91 to 100%,

○: 81 to 90%,

Δ: 71 to 80%,

X: equal to or less than 70%

Brittle fracture surface

◎: not recognized,

○: slightly recognized,

Δ: recognized,

X: largely recognized

CTS fluctuation

◎: quite small,

○: small,

Δ: somewhat large,

X: large

TABLE 14

| Condition | Steel type | Plate thickness (h) (mm) | Tensile strength (MPa) | Carbon equivalent (Ceq) (%) | Electrode tip diameter (mm) | Pressurizing force (EF) (N) | First energization (welding) Current (WC) (kA) | First energization (welding) Time (Wt) (ms) | Cooling time (Ct) (ms) | Second energization (post-heating) Current (PC) (kA) | Second energization (post-heating) Time (Pt) (ms) | Holding time (Ht) (ms) | Nugget diameter (mm) | Heat treatment temperature (AT) (°C.) |
|---|---|---|---|---|---|---|---|---|---|---|---|---|---|---|
| E-38 | CR270E | 1.2 | 295 | 0.05 | 6.0 | 2940 | 6.80 | 280 | — | — | — | 40 | 4.7 | — |
| E-39 | | 1.6 | 298 | 0.05 | 8.0 | 4704 | 6.90 | 360 | | | | | 5.4 | — |
| E-40 | CR780T | 1.6 | 836 | 0.33 | 8.0 | 2744 | 6.30 | 360 | — | — | — | 40 | 5.4 | 170 |
| E-41 | CR980Y | | 1034 | 0.23 | | | 6.50 | | | | | | | |
| E-42 | CR980Y | | 1022 | 0.31 | | | 6.30 | | | | | | | |
| E-43 | CR980T | | 967 | 0.40 | | | 6.00 | | | | | | | |
| E-44 | CR980T | | 993 | 0.48 | | | 5.90 | | | | | | | |
| E-45 | CR1180Y | | 1196 | 0.34 | | | 6.30 | | | | | | | |
| E-46 | CR1470Y | | 1488 | 0.35 | | | 6.30 | | | | | | | |
| E-47 | CR1470HP | | 1485 | 0.34 | | | 6.20 | | | | | | | |
| E-48 | CR1760HP | | 1773 | 0.38 | | | 6.10 | | | | | | | |
| E-49 | GA980Y | | 1050 | 0.23 | | | 6.80 | | | | | | | |
| E-50 | GA1180Y | | 1192 | 0.34 | | | 6.60 | | | | | | | |
| E-51 | A11470HP | | 1495 | 0.34 | | | 6.40 | | | | | | | |
| E-52 | CR780T | 1.2 | 832 | 0.33 | 6.0 | 2058 | 5.60 | 280 | — | — | — | 40 | 4.7 | 170 |
| E-53 | CR980T | | 998 | 0.48 | | | 5.40 | | | | | | | |
| E-54 | CR1180Y | | 1196 | 0.34 | | | 5.60 | | | | | | | |
| E-55 | CR1470HP | | 1488 | 0.34 | | | 5.60 | | | | | | | |
| E-56 | CR980T | 1.6 | 987 | 0.40 | 8.0 | 2744 | 6.60 | 360 | — | — | — | 40 | 6.3 | 170 |
| E-57 | CR1180Y | | 1196 | 0.34 | | | 6.90 | | | | | | | |
| E-58 | CR1960HP | 1.6 | 1965 | 0.40 | 8.0 | 2744 | 6.10 | 360 | 40 | 4.88 | 80 | 40 | 5.4 | 170 |
| E-59 | CR980T | | 998 | 0.60 | | | 5.80 | | | 4.64 | | | | |
| E-60 | CR1180Y | 1.6 | 1196 | 0.34 | 8.0 | 2254 | 6.30 | 360 | 40 | 5.04 | 80 | 40 | 5.4 | 170 |

TABLE 14-continued

| Condition | | | | | | | | |
|---|---|---|---|---|---|---|---|---|
| E-61 | | | 3234 | | | | | |
| E-62 | | | 4704 | | 0 | | | |
| E-63 | | | | | 320 | | | |
| E-64 | | | | | 40 | 2.20 | | |
| E-65 | | | | | | 6.17 | | |
| E-66 | | | | | | 5.04 | 20 | |
| E-67 | | | | | | | 220 | |
| E-68 | | | | | | | 80 | 260 |
| E-69 | | | | | | | | 40 | 100 |
| E-70 | | | | | | | | | 240 |
| E-71 | | | | | | | | | 170 |
| E-72 | | | | | | | | | |
| E-73 | | | | | | | | | |

| Condition | Heat treatment time (At) (s) | Temperature before heat treatment (CT) (°C.) | Dendrite arm interval | Average grain diameter of carbides | Number density of carbides | Contraction defect presence/absence | Crack presence/absence | Recess of welded portion | Fracture appearance | Plug rate | Brittle fracture surface | CTS (kN) | CTS fluctuation | Reference |
|---|---|---|---|---|---|---|---|---|---|---|---|---|---|---|
| E-38 | — | — | X | X | X | Absent | Absent | ○ | P | ◎ | ◎ | 5.12 | ◎ | Comparative example |
| E-39 | — | — | X | X | X | Absent | Absent | ○ | P | ◎ | ◎ | 8.06 | ◎ | |
| E-40 | 1200 | Room temperature | X | X | X | Present | Present | ○ | PP | △ | △ | 10.73 | △ | |
| E-41 | | | X | X | X | Present | Present | ○ | PP | △ | △ | 9.29 | △ | |
| E-42 | | | X | X | X | Present | Present | ○ | PP | △ | △ | 9.15 | △ | |
| E-43 | | | X | X | X | Present | Present | ○ | PP | X | X | 6.70 | X | |
| E-44 | | | X | X | X | Present | Present | ○ | PP | X | X | 5.03 | X | |
| E-45 | | | X | X | X | Present | Present | ○ | PP | X | X | 7.64 | X | |
| E-46 | | | X | X | X | Present | Present | ○ | PP | X | X | 7.19 | X | |
| E-47 | | | X | X | X | Present | Present | ○ | PP | X | X | 7.04 | X | |
| E-48 | | | X | X | X | Present | Present | ○ | PP | X | X | 6.22 | X | |
| E-49 | | | X | X | X | Present | Present | ○ | PP | △ | △ | 9.22 | △ | |
| E-50 | | | X | X | X | Present | Present | ○ | PP | X | X | 7.61 | X | |
| E-51 | | | X | X | X | Present | Present | ○ | PP | X | X | 7.09 | X | |
| E-52 | 1200 | | X | X | X | Present | Present | ○ | PP | △ | △ | 8.05 | △ | |
| E-53 | | | X | X | X | Present | Present | ○ | PP | X | X | 3.78 | X | |
| E-54 | | | X | X | X | Present | Present | ○ | PP | X | X | 5.73 | X | |
| E-55 | | | X | X | X | Present | Present | ○ | PP | X | X | 5.28 | X | |
| E-56 | 1200 | | X | X | X | Present | Present | ○ | PP | X | X | 7.82 | X | |
| E-57 | | | X | X | X | Present | Present | ○ | PP | X | X | 8.91 | X | |
| E-58 | 1200 | | X | X | X | Present | Present | ○ | PP | X | X | 5.01 | X | |
| E-59 | | | X | X | X | Present | Present | ○ | PP | X | X | 4.57 | X | |
| E-60 | 1200 | | ○ | ○ | ○ | Present | Present | ○ | PP | △ | △ | 9.21 | △ | |
| E-61 | | | ○ | ○ | ○ | Absent | Absent | ○ | P | ◎ | ○ | 13.46 | ○ | |
| E-62 | | | X | X | X | Present | Present | ○ | PP | X | X | 7.61 | X | |
| E-63 | | | ○ | ○ | ○ | Present | Present | ○ | PP | △ | △ | 10.05 | △ | |
| E-64 | | | X | X | X | Present | Present | ○ | PP | X | X | 8.09 | X | |
| E-65 | | | X | X | X | Present | Present | ○ | PP | X | X | 8.47 | X | |
| E-66 | | | X | X | X | Present | Present | ○ | PP | X | X | 8.48 | X | |
| E-67 | | | ○ | ○ | ○ | Present | Present | ○ | PP | △ | △ | 10.08 | △ | |
| E-68 | | | ○ | ○ | ○ | Present | Present | ○ | PP | △ | △ | 11.36 | △ | |
| E-69 | | | ○ | ○ | ○ | Present | Absent | ○ | P | ◎ | ○ | 11.76 | ○ | |
| E-70 | | | ○ | ○ | ○ | Present | Absent | ○ | P | ◎ | ○ | 12.65 | ○ | |
| E-71 | 80 | | ○ | ○ | ○ | Present | Absent | ○ | P | ◎ | ○ | 11.77 | ○ | |

TABLE 14-continued

| E-72 | 6500 | | ○ | ○ | ○ | Present | Absent | ○ | P | ◉ | ○ | 12.95 | ○ |
| E-73 | 1200 | 200 | ○ | ○ | ○ | Present | Absent | ○ | P | ◉ | ○ | 11.76 | ○ |

Dendrite arm interval
○: average value is equal to or less than 12 μm,
X: average value is larger than 12 μm
Average grain diameter of carbides
○: 5 nm to 100 nm,
X: other than 5 nm to 100 nm
Number density of carbides
○: equal to or more than $2 \times 10^6/mm^2$,
X: less than $2 \times 10^6/mm^2$
Recess of welded portion
○: small,
Δ: medium,
X: large
Fracture appearance
P: plug fracture,
PP: partial plug fracture,
S: peel fracture
Plug rate
◉: 91 to 100%,
○: 81 to 90%,
Δ: 71 to 80%,
X: equal to or less than 70%
Brittle fracture surface
◉: not recognized,
○: slightly recognized,
Δ: recognized,
X: largely recognized
CTS fluctuation
◉: quite small,
○: small,
Δ: somewhat large,
X: large Conditions No. E-1 to No. E-37 represented in Table 13 are examples of the present invention, while conditions No. E-38 to No. E-73 represented in Table 14 are comparative examples. In other words, as described above, the condition represented in Table 13 fulfilled conditions prescribed in claims 7 and 8, and the condition represented in Table 14 did not fulfill at least one of the conditions prescribed in claims 7 and 8. It should be noted that if the conditions described in claim 7 are fulfilled a certain effect can be obtained even if the conditions described in claim 8 are not fulfilled, and here for the sake of convenience, one which did not fulfill the conditions prescribed in claim 8 even though fulfilling the conditions prescribed in claim 7 was to be included in the comparative examples.

Among the above, in the examples of the present invention under the conditions No. E-1 to No. E-37, after processings within a range prescribed in claim 7 were performed, heat treatments after welding within a range prescribed in claim 8 were performed. In the conditions No. E-1 to No. E-12 steel plates having a thickness of 1.6 mm were varied in steel types, in the conditions No. E-13 to No. E-16 steel plates having a thickness of 1.2 mm were varied in steel types, and in the conditions No. E-17 and No. E-18 steel plates having a thickness of 1.6 mm were varied from the conditions No. E-4 and No. E-6 in nugget diameters. Further, in the conditions No. E-19 to No. E-22 steel plates having a thickness of 1.6 mm were varied in tensile strengths or carbon equivalents, and in the conditions No. E-23 to E-32, using steel plates having a thickness of 1.6 mm welding conditions were varied within a range prescribed in claim 6. Further, in the conditions No. E-33 to No. E-36, using steel plates having a thickness of 1.6 mm conditions of the heat treatments after welding were varied within a range prescribed in claim 8.

Further, in the conditions No. E-40 to No. E-57, as comparative examples, welding were performed without performing post-heating energization. In the conditions No. E-40 to No. E-51 steel plates having a thickness of 1.6 mm were varied in steel types, in the conditions E-52 to E-55 steel plates having a thickness of 1.2 mm were varied in steel types, and in the conditions No. E-56 and No. E-57 steel plates having a thickness of 1.6 mm were varied from the conditions No. E-43 and No. E-45 in nugget diameters. Further, in the conditions No. E-38 to No. E-39 mild steel plates (thicknesses: 1.2 mm, 1.6 mm) whose tensile strengths and carbon equivalents were quite low were used, for the sake of comparison.

As represented in Table 13, in the examples of the present invention under the conditions No. E-1 to No. E-37, conditions prescribed in claims 7 and 8 were fulfilled, and thus a dendrite arm interval, an average grain diameter of carbides, and a number density of carbides in any steel type were within a range of the present invention. Further, it was confirmed that a contraction defect or a crack did not occur and that a recess in a welded portion was small. As a result, in the conditions No. E-1 to No. E-37, fracture appearances were of plug fractures, plug rates were large, and brittle fracture surfaces were not recognized. Further, it was confirmed that CTSs were high and that fluctuation of CTS was small compared with comparative examples under the conditions No. E-40 to No. E-57, in which post-heating energization was not performed.

It is found that in the comparative examples under the conditions No. E-40 to No. E-57, in which heat treatments after welding were performed but post-heating energization was not performed prior thereto, effects by the heat treatments after welding were recognized but the effects were small compared with a case that both post-heating energization and heat treatments after welding were performed.

Further, CTSs in the examples of the present invention under the conditions No. E-1 to No. E-37 represented in Table 13 are higher than in the examples (the examples of the present invention in which heat treatments after welding are not performed) of the present invention under the conditions No. B-1 to No. B-32 represented in Table 9. This fact indicates that CTS is more improved by a heat treatment after welding.

On the other hand, as represented in Table 14, in the comparative examples under conditions No. E-58 to No. E-72, conditions prescribed in claim 7 were not fulfilled, and thus any one of reduction of CTS, decrease of a plug rate, and an occurrence of a brittle fracture surface was recognized, in a case of use of any steel type.

Further, in the comparative examples under the conditions No. E-69 to No. E-72, though the conditions prescribed in claim 7 were fulfilled, conditions of heat treatments after welding did not fulfill the conditions prescribed in claim 8. Thus, though effects of post-heating energization were recognized, effects of the heating after welding were not recognized.

In the comparative example under the condition No. E-61 in which a pressurizing force EF was high, conditions prescribed in claims 6 and 8 were fulfilled, and thus an effect similar to that of the example 4 was recognized. Further, in the comparative examples under the condition No. E-63 in which a cooling time Ct after welding was long, under the condition No. E-67 in which a post-heating energization time Pt was long, and under the condition No. E-68 in which a holding time Ht was long, an effect of each condition was recognized, but the effect was small and productivity was reduced in such cases, and thus those comparative examples are not desirable. Further, with regard to the conditions No. E-69 to No. E-72 in which the conditions of the heat treatments after welding did not fulfill the conditions prescribed in claim 8, only effects of the post-heating energization after welding were recognized under No. E-69 in which a heat treatment temperature after welding AT was low and under No. E-71 in which a heat treatment time after welding At was short, while in the comparative examples under the condition No. E-70 in which the heat treatment temperature after welding AT was high and under the condition No. E-72 in which the heat treatment time after welding At was long, not only effects of post-heating energization after welding but also effects of heat treatment after welding were recognized, but the effects were small compared with those which fulfilled the conditions prescribed in claim 8.

Example 6

In an example 6, with use of various kinds of steel plates similar to those of the above-described example 4 and example 5 as represented in Table 11 to Table 14, structure observation test pieces and cross tensile test pieces were fabricated by processes similar to those of the example 4 and the example 5, and various tests were performed in similar methods. On this occasion, cooling was performed under conditions (temperature before heat treatment CT) represented in Table 11 to Table 14, after release of pressurizing at pressurizing forces EF and before starting of heat treatments after welding. Other conditions were within ranges similar to those of the above-described example 4 and example 5.

As represented in Table 11 and Table 12, in the example of the present invention under the condition No. D-37 fulfilling conditions prescribed in claim 9, a CTS was high compared with the comparative example under the condition No. D-73 in which a heat treatment after welding was started while a surface temperature was still at a temperature higher than a temperature before heat treatment CT prescribed in claim 9. Further, as represented in Table 13 and Table 14, in the example of the present invention under the condition No. E-37 fulfilling the condition prescribed in claim 9, a CTS was high compared with the comparative example under the condition No. E-73 in which a heat treatment after welding was started while a surface temperature was still at a temperature higher than the temperature before heat treatment CT prescribed in claim 9. It should be noted that though CTS was improved as a surface temperature of a welded portion was reduced by cooling after welding, the CTS hardly changed in a case of a surface temperature of equal to or less than 150° C.

When the conditions described in claim 6 or 7 and claim 8 are fulfilled, a certain effect can be obtained even if the condition described in claim 9 is not fulfilled, but a sufficiently high strength in a spot welded joint cannot be obtained if a heat treatment after welding is started without sufficient cooling, as described above.

Example 7

With use of various kinds of steel plates similar to those of the above-described example 2 to example 6 and solid solution strengthening type steel plates (CR440 W) and dual phase composition type steel plates (CR590Y) having a thickness of 1.2 mm or 1.6 mm and a tensile strength of 455 MPa or 618 MPa as represented in Table 15 and Table 16 below, structure observation test pieces and cross tensile test pieces were fabricated by processes similar to those of the example 2, and various tests were performed in similar methods. Here, among steel types represented in Table 15 and Table 16, CR440 W and CR590Y indicate Japan Iron and Steel Federation standard products (JSC440 W, JSC590Y). It should be noted that a plate combination in Table 15 and Table 16, being different from that in the example 2 to the example 6, is any one of combinations of plates of different kinds and the same thickness, of the same kind and different thicknesses, and of different kinds and different thicknesses, and that the condition represented in Table 15 fulfilled the conditions prescribed in claim 6 or claim 7, and that the condition represented in Table 16 fulfilled the conditions prescribed in claim 6 and claim 8 as well as claim 7 and claim 8.

Table 15 and Table 16 represent lists of fabrication conditions and test results of respective test pieces in the example 7.

TABLE 15

| Condition | Steel type 1 | Plate thickness (h) (mm) | Tensile strength (MPa) | Carbon equivalent (Ceq) (%) | Steel type 2 | Plate thickness (h) (mm) | Tensile strength (MPa) | Carbon equivalent (Ceq) (%) | Steel type 3 | Plate thickness (h) (mm) | Tensile strength (MPa) |
|---|---|---|---|---|---|---|---|---|---|---|---|
| G-1  | CR1180Y  | 1.6 | 1196 | 0.34 | CR270E   | 1.6 | 298  | 0.05 | —       | —   | —    |
| G-2  |          |     |      |      | CR440W   |     | 455  | 0.16 |         |     |      |
| G-3  |          |     |      |      | CR980Y   |     | 1034 | 0.23 |         |     |      |
| G-4  |          |     |      |      | CR1470HP |     | 1485 | 0.34 |         |     |      |
| G-5  | CR980Y   | 1.6 | 1034 | 0.23 | CR440W   | 1.6 | 455  | 0.16 |         |     |      |
| G-6  | CR1470HP |     | 1485 | 0.34 |          |     |      |      |         |     |      |
| G-7  | CR980Y   | 1.6 | 1034 | 0.23 | CR980Y   | 1.2 | 1034 | 0.23 |         |     |      |
| G-8  | CR1180Y  |     | 1196 | 0.34 | CR1180Y  |     | 1196 | 0.34 |         |     |      |
| G-9  | CR1470HP |     | 1485 | 0.34 | CR1470HP |     | 1485 | 0.34 |         |     |      |
| G-10 | CR980Y   | 1.6 | 1034 | 0.23 | CR270E   | 1.2 | 295  | 0.05 |         |     |      |
| G-11 | CR1180Y  |     | 1196 | 0.34 | CR590Y   |     | 618  | 0.23 |         |     |      |
| G-12 | CR1470HP |     | 1485 | 0.34 | CR980Y   |     | 1022 | 0.31 |         |     |      |
| G-13 | CR270E   | 1.6 | 295  | 0.05 | CR980Y   | 1.2 | 1034 | 0.23 |         |     |      |
| G-14 | CR590Y   |     | 618  | 0.23 | CR1180Y  |     | 1196 | 0.34 |         |     |      |
| G-15 | CR980Y   |     | 1022 | 0.31 | CR1470HP |     | 1485 | 0.34 |         |     |      |
| G-16 | CR1180Y  | 1.2 | 1198 | 0.34 | CR1180Y  | 1.2 | 1196 | 0.34 | CR1180Y | 1.2 | 1196 |
| G-17 | CR980Y   | 1.6 | 1022 | 0.31 | CR980Y   | 1.6 | 1022 | 0.31 | CR440W  | 1.2 | 455  |
| G-18 | CR440W   | 1.6 | 455  | 0.16 | CR440W   | 1.6 | 455  | 0.16 | CR1470HP| 1.2 | 1485 |
| G-19 | CR1180Y  | 1.6 | 1196 | 0.34 | CR440W   | 1.6 | 455  | 0.16 | —       | —   | —    |
| G-20 | CR1180Y  | 1.6 | 1196 | 0.34 | CR1180Y  | 1.2 | 1196 | 0.34 |         |     |      |
| G-21 | CR1180Y  | 1.6 | 1196 | 0.34 | CR440W   | 1.2 | 455  | 0.16 |         |     |      |
| G-22 | CR440W   | 1.6 | 455  | 0.16 | CR1180Y  | 1.2 | 1196 | 0.34 |         |     |      |
| G-23 | CR980Y   | 1.6 | 1022 | 0.31 | CR980Y   | 1.6 | 1022 | 0.31 | CR440W  | 1.2 | 455  |

| Condition | Carbon equivalent (Ceq) (%) | Electrode tip diameter (mm) | Pressurizing force (EF) (N) | First energization (welding) Current (WC) (kA) | First energization (welding) Time (Wt) (ms) | Cooling time (Ct) (ms) | Second energization (post-heating) Current (PC) (kA) | Second energization (post-heating) Time (Pt) (ms) | Holding time (ht) (ms) | Nugget diameter (mm) | Dendrite arm interval |
|---|---|---|---|---|---|---|---|---|---|---|---|
| G-1  | —    | 8.0 | 4704 | 6.60 | 360 | 40 | 5.28 | 80  | 40 | 5.4 | ○ |
| G-2  |      |     |      | 6.45 |     |    | 5.16 |     |    |     | ○ |
| G-3  |      |     |      | 6.30 |     |    | 5.04 |     |    |     | ○ |
| G-4  |      |     |      | 6.25 |     |    | 5.00 |     |    |     | ○ |
| G-5  |      | 8.0 | 4704 | 6.45 | 360 | 40 | 5.16 | 80  | 40 | 5.4 | ○ |
| G-6  |      |     |      | 6.35 |     |    | 5.08 |     |    |     | ○ |
| G-7  |      | 8.0 | 4116 | 5.85 | 320 | 40 | 4.68 | 80  | 40 | 4.7 | ○ |
| G-8  |      |     |      | 5.95 |     |    | 4.76 |     |    |     | ○ |
| G-9  |      |     |      | 5.90 |     |    | 4.72 |     |    |     | ○ |
| G-10 |      | 8.0 | 4116 | 6.55 | 320 | 40 | 5.24 | 80  | 40 | 4.7 | ○ |
| G-11 |      |     |      | 6.25 |     |    | 5.00 |     |    |     | ○ |
| G-12 |      |     |      | 5.85 |     |    | 4.68 |     |    |     | ○ |
| G-13 |      | 8.0 | 4116 | 6.30 | 320 | 40 | 5.04 | 80  | 40 | 4.7 | ○ |
| G-14 |      |     |      | 6.10 |     |    | 4.88 |     |    |     | ○ |
| G-15 |      |     |      | 5.95 |     |    | 4.76 |     |    |     | ○ |
| G-16 | 0.34 | 6.0 | 5292 | 5.80 | 280 | 40 | 4.64 | 80  | 40 | 4.7 | ○ |
| G-17 | 0.16 | 8.0 | 5880 | 6.30 | 440 |    | 5.04 | 100 |    | 4.7 | ○ |
| G-18 | 0.34 |     | 6174 | 6.60 | 460 |    | 5.28 | 100 |    | 4.7 | ○ |
| G-19 | —    | 8.0 | 2744 | 6.40 | 360 | 40 | 5.12 | 80  | 40 | 5.4 | ○ |
| G-20 |      |     | 2401 | 6.00 | 320 |    | 4.80 |     |    | 4.7 | ○ |
| G-21 |      |     | 2401 | 6.20 | 320 |    | 4.96 |     |    | 4.7 | ○ |
| G-22 |      |     | 2401 | 6.20 | 320 |    | 4.96 |     |    | 4.7 | ○ |
| G-23 | 0.16 | 8.0 | 3430 | 6.20 | 360 | 40 | 4.96 | 80  | 40 | 5.4 | ○ |

| Condition | Average grain diameter of carbides | Number density of carbides | Contraction defect presence/absence | Crack presence/absence | Recess of welded portion | Fracture appearance | Plug rate | Brittle fracture surface | CTS (kN) | CTS fluctuation | Reference |
|---|---|---|---|---|---|---|---|---|---|---|---|
| G-1 | ○ | ○ | Absent | Absent | ○ | P | ◎ | ○ | 10.77 | ○ | Invention example |
| G-2 | ○ | ○ | Absent | Absent | ○ | P | ◎ | ○ | 10.69 | ○ | Invention example |
| G-3 | ○ | ○ | Absent | Absent | ○ | P | ◎ | ○ | 10.74 | ○ |  |
| G-4 | ○ | ○ | Absent | Absent | ○ | P | ◎ | ○ | 9.95  | ○ |  |
| G-5 | ○ | ○ | Absent | Absent | ○ | P | ◎ | ○ | 11.62 | ○ |  |

TABLE 15-continued

| | | | | | | | | | | | |
|---|---|---|---|---|---|---|---|---|---|---|---|
| G-6  | ○ | ○ | Absent | Absent | ○ | P | ◎ | ○ | 9.92  | ○ |
| G-7  | ○ | ○ | Absent | Absent | ○ | P | ◎ | ○ | 8.71  | ○ |
| G-8  | ○ | ○ | Absent | Absent | ○ | P | ◎ | ○ | 8.14  | ○ |
| G-9  | ○ | ○ | Absent | Absent | ○ | P | ◎ | ○ | 7.54  | ○ |
| G-10 | ○ | ○ | Absent | Absent | ○ | P | ◎ | ○ | 7.81  | ○ |
| G-11 | ○ | ○ | Absent | Absent | ○ | P | ◎ | ○ | 9.55  | ○ |
| G-12 | ○ | ○ | Absent | Absent | ○ | P | ◎ | ○ | 8.67  | ○ |
| G-13 | ○ | ○ | Absent | Absent | ○ | P | ◎ | ○ | 8.74  | ○ |
| G-14 | ○ | ○ | Absent | Absent | ○ | P | ◎ | ○ | 7.98  | ○ |
| G-15 | ○ | ○ | Absent | Absent | ○ | P | ◎ | ○ | 7.55  | ○ |
| G-16 | ○ | ○ | Absent | Absent | ○ | P | ◎ | ○ | 8.14  | ○ |
| G-17 | ○ | ○ | Absent | Absent | ○ | P | ◎ | ○ | 9.25  | ○ |
| G-18 | ○ | ○ | Absent | Absent | ○ | P | ◎ | ○ | 7.56  | ○ |
| G-19 | ○ | ○ | Absent | Absent | ○ | P | ◎ | ○ | 11.79 | ○ |
| G-20 | ○ | ○ | Absent | Absent | ○ | P | ◎ | ○ | 8.84  | ○ |
| G-21 | ○ | ○ | Absent | Absent | ○ | P | ◎ | ○ | 10.18 | ○ |
| G-22 | ○ | ○ | Absent | Absent | ○ | P | ◎ | ○ | 8.88  | ○ |
| G-23 | ○ | ○ | Absent | Absent | ○ | P | ◎ | ○ | 10.18 | ○ |

Dendrite arm interval
○: average value is equal to or less than 12 μm,
X: average value is larger than 12 μm
Average grain diameter of carbides
○: 5 nm to 100 nm,
X: other than 5 nm to 100 nm
Number density of carbides
○: equal to or more than $2 \times 10^6/mm^2$,
X: less than $2 \times 10^6/mm^2$
Recess of welded portion
○: small,
△: medium,
X: large
Fracture appearance
P: plug fracture,
PP: partial plug fracture,
S: peel fracture
Plug rate
◎: 91 to 100%,
○: 81 to 90%,
△: 71 to 80%,
X: equal to or less than 70%
Brittle fracture surface
◎: not recognized,
○: slightly recognized,
△: recognized,
X: largely recognized
CTS fluctuation
◎: quite small,
○: small,
△: somewhat large,
X: large

TABLE 16

| Condition | Steel type 1 | Plate thickness (h) (mm) | Tensile strength (MPa) | Carbon equivalent (Ceq) (%) | Steel type 2 | Plate thickness (h) (mm) | Tensile strength (MPa) | Carbon equivalent (Ceq) (%) | Steel type 3 | Plate thickness (h) (mm) | Tensile strength (MPa) | Carbon equivalent (Ceq) (%) |
|---|---|---|---|---|---|---|---|---|---|---|---|---|
| G-24 | CR1180Y  | 1.6 | 1196 | 0.34 | CR270E   | 1.6 | 298  | 0.05 | — | — | — | — |
| G-25 |          |     |      |      | CR440W   |     | 455  | 0.16 |   |   |   |   |
| G-26 |          |     |      |      | CR980Y   |     | 1034 | 0.23 |   |   |   |   |
| G-27 |          |     |      |      | CR1470HP |     | 1485 | 0.34 |   |   |   |   |
| G-28 | CR980Y   | 1.6 | 1034 | 0.23 | CR440W   | 1.6 | 455  | 0.16 |   |   |   |   |
| G-29 | CR1470HP |     | 1485 | 0.34 |          |     |      |      |   |   |   |   |
| G-30 | CR980Y   | 1.6 | 1034 | 0.23 | CR980Y   | 1.2 | 1034 | 0.23 |   |   |   |   |
| G-31 | CR1180Y  |     | 1196 | 0.34 | CR1180Y  |     | 1196 | 0.34 |   |   |   |   |
| G-32 | CR1470HP |     | 1485 | 0.34 | CR1470HP |     | 1485 | 0.34 |   |   |   |   |
| G-33 | CR980Y   | 1.6 | 1034 | 0.23 | CR270E   | 1.2 | 295  | 0.05 |   |   |   |   |
| G-34 | CR1180Y  |     | 1196 | 0.34 | CR590Y   |     | 618  | 0.23 |   |   |   |   |
| G-35 | CR1470HP |     | 1485 | 0.34 | CR980Y   |     | 1022 | 0.31 |   |   |   |   |

TABLE 16-continued

| Con-dition | | | | | | | | | | | |
|---|---|---|---|---|---|---|---|---|---|---|---|
| G-36 | CR270E | 1.6 | 295 | 0.05 | CR980Y | 1.2 | 1034 | 0.23 | | | |
| G-37 | CR590Y | | 618 | 0.23 | CR1180Y | | 1196 | 0.34 | | | |
| G-38 | CR980Y | | 1022 | 0.31 | CR1470HP | | 1485 | 0.34 | | | |
| G-39 | CR1180Y | 1.2 | 1196 | 0.34 | CR1180Y | 1.2 | 1196 | 0.34 | CR1180Y | 1.2 | 1196 | 0.34 |
| G-40 | CR980Y | 1.6 | 1022 | 0.31 | CR980Y | 1.6 | 1022 | 0.31 | CR440W | 1.2 | 455 | 0.16 |
| G-41 | CR440W | 1.6 | 455 | 0.16 | CR440W | 1.6 | 455 | 0.16 | CR1470HP | 1.2 | 1485 | 0.34 |
| G-42 | CR1180Y | 1.6 | 1196 | 0.34 | CR440W | 1.6 | 455 | 0.16 | — | — | — | — |
| G-43 | CR1180Y | 1.6 | 1196 | 0.34 | CR1180Y | 1.2 | 1196 | 0.34 | | | |
| G-44 | CR1180Y | 1.6 | 1196 | 0.34 | CR440W | 1.2 | 455 | 0.16 | | | |
| G-45 | CR440W | 1.6 | 455 | 0.16 | CR1180Y | 1.2 | 1196 | 0.34 | | | |
| G-46 | CR980Y | 1.6 | 1022 | 0.31 | CR980Y | 1.6 | 1022 | 0.31 | CR440W | 1.2 | 455 | 0.16 |

| Condition | Electrode tip diameter (EF) (mm) | Pressurizing force (EF) (N) | First energization (welding) Current (WC) (kA) | First energization (welding) Time (Wt) (ms) | Cooling time (Ct) (ms) | Second energization (post-heating) Current (PC) (kA) | Second energization (post-heating) Time (Pt) (ms) | Holding time (Ht) (ms) | Nugget diameter (mm) | Heat treatment temperature (AT) (° C.) | Heat treatment time (At) (s) | Temperature before heat treatment (CT) (° C.) |
|---|---|---|---|---|---|---|---|---|---|---|---|---|
| G-24 | 8.0 | 4704 | 6.60 | 360 | 40 | 5.28 | 80 | 40 | 5.4 | 170 | 1200 | Room temperature |
| G-25 | | | 6.45 | | | 5.16 | | | | | | |
| G-26 | | | 6.30 | | | 5.04 | | | | | | |
| G-27 | | | 6.25 | | | 5.00 | | | | | | |
| G-28 | 8.0 | 4704 | 6.45 | 360 | 40 | 5.16 | 80 | 40 | 5.4 | 170 | 1200 | |
| G-29 | | | 6.35 | | | 5.08 | | | | | | |
| G-30 | 8.0 | 4116 | 5.85 | 320 | 40 | 4.68 | 80 | 40 | 4.7 | 170 | 1200 | |
| G-31 | | | 5.95 | | | 4.76 | | | | | | |
| G-32 | | | 5.90 | | | 4.72 | | | | | | |
| G-33 | 8.0 | 4116 | 6.55 | 320 | 40 | 5.24 | 80 | 40 | 4.7 | 170 | 1200 | |
| G-34 | | | 6.25 | | | 5.00 | | | | | | |
| G-35 | | | 5.85 | | | 4.68 | | | | | | |
| G-36 | 8.0 | 4116 | 6.30 | 320 | 40 | 5.04 | 80 | 40 | 4.7 | 170 | 1200 | |
| G-37 | | | 6.10 | | | 4.88 | | | | | | |
| G-38 | | | 5.95 | | | 4.76 | | | | | | |
| G-39 | 6.0 | 5292 | 5.80 | 280 | 40 | 4.64 | 80 | 40 | 4.7 | 170 | 1200 | |
| G-40 | 8.0 | 5880 | 6.30 | 440 | | 5.04 | 100 | | 4.7 | | | |
| G-41 | | 6174 | 6.60 | 460 | | 5.28 | 100 | | 4.7 | | | |
| G-42 | 8.0 | 2744 | 6.40 | 360 | 40 | 5.12 | 80 | 40 | 5.4 | 170 | 1200 | |
| G-43 | | 2401 | 6.00 | 320 | | 4.80 | | | 4.7 | | | |
| G-44 | | 2401 | 6.20 | 320 | | 4.96 | | | 4.7 | | | |
| G-45 | | 2401 | 6.20 | 320 | | 4.96 | | | 4.7 | | | |
| G-46 | 8.0 | 3430 | 6.20 | 360 | 40 | 4.96 | 80 | 40 | 5.4 | 170 | 1200 | |

| Condition | Dendrite arm interval | Average grain diameter of carbides | Number density of carbides | Contraction defect presence/absence | Crack presence/absence | Recess of welded portion | Fracture appearance | Plug rate | Brittle fracture surface | CTS (kN) | CTS fluctuation | Reference |
|---|---|---|---|---|---|---|---|---|---|---|---|---|
| G-24 | ○ | ○ | ○ | Absent | Absent | ○ | P | ◎ | ○ | 12.92 | ○ | Invention example |
| G-25 | ○ | ○ | ○ | Absent | Absent | ○ | P | ◎ | ○ | 12.83 | ○ | |
| G-26 | ○ | ○ | ○ | Absent | Absent | ○ | P | ◎ | ○ | 12.89 | ○ | |
| G-27 | ○ | ○ | ○ | Absent | Absent | ○ | P | ◎ | ○ | 11.94 | ○ | |
| G-28 | ○ | ○ | ○ | Absent | Absent | ○ | P | ◎ | ○ | 13.94 | ○ | |
| G-29 | ○ | ○ | ○ | Absent | Absent | ○ | P | ◎ | ○ | 11.90 | ○ | |
| G-30 | ○ | ○ | ○ | Absent | Absent | ○ | P | ◎ | ○ | 10.45 | ○ | |
| G-31 | ○ | ○ | ○ | Absent | Absent | ○ | P | ◎ | ○ | 9.77 | ○ | |
| G-32 | ○ | ○ | ○ | Absent | Absent | ○ | P | ◎ | ○ | 9.05 | ○ | |
| G-33 | ○ | ○ | ○ | Absent | Absent | ○ | P | ◎ | ○ | 9.37 | ○ | |
| G-34 | ○ | ○ | ○ | Absent | Absent | ○ | P | ◎ | ○ | 11.46 | ○ | |
| G-35 | ○ | ○ | ○ | Absent | Absent | ○ | P | ◎ | ○ | 10.40 | ○ | |
| G-36 | ○ | ○ | ○ | Absent | Absent | ○ | P | ◎ | ○ | 10.49 | ○ | |
| G-37 | ○ | ○ | ○ | Absent | Absent | ○ | P | ◎ | ○ | 9.58 | ○ | |
| G-38 | ○ | ○ | ○ | Absent | Absent | ○ | P | ◎ | ○ | 9.06 | ○ | |
| G-39 | ○ | ○ | ○ | Absent | Absent | ○ | P | ◎ | ○ | 9.77 | ○ | |
| G-40 | ○ | ○ | ○ | Absent | Absent | ○ | P | ◎ | ○ | 11.10 | ○ | |
| G-41 | ○ | ○ | ○ | Absent | Absent | ○ | P | ◎ | ○ | 9.07 | ○ | |
| G-42 | ○ | ○ | ○ | Absent | Absent | ○ | P | ◎ | ○ | 14.15 | ○ | |
| G-43 | ○ | ○ | ○ | Absent | Absent | ○ | P | ◎ | ○ | 10.61 | ○ | |
| G-44 | ○ | ○ | ○ | Absent | Absent | ○ | P | ◎ | ○ | 12.21 | ○ | |

TABLE 16-continued

| | | | | | | | | | | | | |
|---|---|---|---|---|---|---|---|---|---|---|---|---|
| G-45 | ○ | ○ | ○ | Absent | Absent | ○ | P | ◎ | ○ | 10.65 | ○ |
| G-46 | ○ | ○ | ○ | Absent | Absent | ○ | P | ◎ | ○ | 12.21 | ○ |

Dendrite arm interval
○: average value is equal to or less than 12 μm,
X: average value is larger than 12 μm
Average grain diameter of carbides
○: 5 nm to 100 nm,
X: other than 5 nm to 100 nm
Number density of carbides
○: equal to or more than $2 \times 10^6/mm^2$,
X: less than $2 \times 10^6/mm^2$
Recess of welded portion
○: small,
Δ: medium,
X: large
Fracture appearance
P: plug fracture,
PP: partial plug fracture,
S: peel fracture
Plug rate
◎: 91 to 100%,
○: 81 to 90%,
Δ: 71 to 80%,
X: equal to or less than 70%
Brittle fracture surface
◎: not recognized,
○: slightly recognized,
Δ: recognized,
X: largely recognized
CTS fluctuation
◎: quite small,
○: small,
Δ: somewhat large,
X: large Conditions No. G-1 to No. G-23 represented in Table 15 and conditions No. G-24 to No. G-46 represented in Table 16 are both examples of the present invention. In other words, as described above, the condition represented in Table 15 fulfilled the conditions prescribed in claim 6 or claim 7, and the condition represented in Table 16 fulfilled the conditions prescribed in claim 6 and claim 8 as well as claim 7 and claim 8.

Among the above, the conditions G-1 to G-6 in Table 15 were of two steel plates of different kinds and the same thickness, the conditions G-7 to G-9 were of two steel plates of the same kind and different thicknesses, the conditions No. G-10 to No. G-15 were of two steel plates of different kinds and different thicknesses, and the conditions No. G-16 to No. G-18 were of three steel plates of different kinds and different thicknesses, and the above conditions fulfilled the conditions prescribed in claim 6. Further, the condition G-19 was of two steel plates of different kinds and the same thickness, the condition No. G-20 was of two steel plates of the same kind and different thicknesses, the conditions No. G-21 to No. G-22 were of two steel plates of different kinds and different thicknesses, and the condition No. G-23 was of three steel plates of different kinds and different thicknesses, and the above conditions fulfilled the conditions prescribed in claim 7.

As represented in Table 15, in the examples of the present invention under the conditions No. G-1 to No. G-23, the conditions prescribed in claim 6 or claim 7 were fulfilled, and thus a dendrite arm interval, an average grain diameter of carbides, and a number density of carbides in any steel type were within the range of the present invention. Further, it was confirmed that a contraction defect or a crack di not occur and that a recess in a welded portion was small. As a result, in the conditions No. G-1 to No. G-23, fracture appearances were of plug fractures, plug rates were large, and brittle fracture surfaces were not recognized. As a result, high CTSs were obtained similarly to in a case of compositions of the same kind and the same thickness in the example 2 and the example 3. It should be noted that in a case of three steel plates, a fracture occurred in an interface between a steel plate 2 and a steel plate 3.

On the other hand, the conditions No. G-24 to No. G-29 in Table 16 was of two steel plates of different kinds and the same thickness, the conditions No. G-30 to No. G-32 were of two steel plates of the same kind and different thicknesses, the conditions No. G-33 to No. G-38 were of two steel plates of different kinds and different thicknesses, and the conditions No. G-39 to No. G-41 were of three steel plates of different kinds and different thicknesses, and the above conditions fulfilled the conditions prescribed in claim 6 and claim 8. Further, the condition No. G-42 was of two steel plates of different kinds and the same thickness, the condition No. G-43 was of two steel plates of the same kind and different thicknesses, the conditions No. G-44 to No. G-45 were of two steel plates of different kinds and different thicknesses, and the condition No. G-46 was of three steel plates of different kinds and different thicknesses, and the above conditions fulfilled the conditions prescribed in claim 7 and claim 8.

As represented in Table 16, in the examples of the present invention of the conditions No. G-24 to No. G-46, the conditions prescribed in claim 6 and claim 8 as well as in claim 7 and claim 8 were fulfilled, and thus a dendrite arm interval, an average grain diameter of carbides, and a number density of carbides in any steel type were within the range of the present invention. Further, it was confirmed that a contraction defect or a crack did not occur and that a recess in a welded portion was small. As a result, in the conditions No. G-24 to No. G-46, fracture appearances were of plug fractures, plug rates were large, and brittle fracture surfaces were not recognized. As a result, high CTSs were obtained similarly to in a case of compositions of the same kinds and the same thicknesses in the example 4 to the example 5. Further, comparison with Table 15 shows that the CTS was improved by a heat processing of welding. It should be noted that in a case of three steel plates, a fracture occurred in an interface between a steel plate 2 and a steel plate 3, similarly to in a case of Table 15.

It was confirmed that, with regard to these examples, even if an experiment was performed with another steel type or with a thickness of thin steel plate being altered or even if an experiment was performed with a solder kind, a coating amount or the like being altered, its effect was similar to the above-described effect, and that there can be obtained effects of the present invention which enables prevention of an occurrence of a contraction defect or a crack, and formation of a highly reliable welded portion which has a good fracture appearance, small fluctuation of strength, and sufficiently high strength.

Further, from results of these examples it was confirmed that by using a spot welding method of a high-strength steel plate of the present invention there can be obtained a highly reliable spot welded joint in which a contraction defect or a crack does not occur in a welded portion and which has a good fracture appearance, small fluctuation of strength, and sufficiently high strength, when a high-strength steel plate is welded by a resistance spot welding method.

It should be noted that in description of the above-described embodiments and examples in the present application, improvement and fluctuation reduction effects of cross tensile strength by the present invention are described, but the present invention is also effective to fluctuation reduction and improvement of L-shape tensile strength being a tensile strength in the same peel direction, for example.

INDUSTRIAL APPLICABILITY

The present invention can be used in an industry, for example, related to a spot welded joint and a spot welding method for assembling of a vehicle body of an automobile and mounting of a component.

The invention claimed is:

1. A spot welding method for forming a nugget in a joint surface of two or more thin steel plates, wherein at least one of the two or more thin steel plates is a high-strength steel plate having a tensile strength of 750 MPa to 1850 MPa and having a carbon equivalent Ceq represented by Formula (1) of 0.22 mass % to 0.55 mass %:

$$Ceq=[C]+[Si]/30+[Mn]/20+2[P]+4[S] \quad \text{Formula (1)},$$

wherein [C], [Si], [Mn], [P], and [S] each respectively represent a content, in mass %, of C, Si, Mn, P, and S in the high-strength steel plate, the method comprising the steps of, in order:

a) performing welding energization under a condition that a pressurizing force EF, in N, of a welding electrode against the two or more thin steel plates satisfies Formula (2):

$$1960 \times h \leq EF \leq 3430 \times h \quad \text{Formula (2)},$$

wherein h represents a quotient, in mm, which is obtained when a sum of thicknesses of all the thin steel plates is divided by two b) cooling the thin steel plates for a cooling time after welding Ct, in ms, satisfying Formula (3), while holding the pressurizing force EF:

$$16 \leq Ct \leq 300 \quad \text{Formula (3)};$$

c) while holding the pressurizing force EF, performing post-heating energization of the welding electrode with a post-heating energization current PC, in kA, which satisfies Formula (4):

$$0.40 \times WC \leq PC \leq 0.95 \times WC \quad \text{Formula (4)}$$

wherein WC is measured in kA, and represents a welding current during the welding energization for a post-heating energization time Pt, wherein Pt is measured in ms, and is defined by Formula (5):

$$30 \leq Pt \leq 200 \quad \text{Formula (5)};$$

and d) releasing pressurizing at the pressurizing force EF, wherein a holding time Ht, in ms, during which the pressurizing force EF is held between the end of the step of performing post-heating energization and the step of releasing pressurizing at the pressurizing force EF satisfies Formula (6):

$$0 \leq Ht \leq 240 \quad \text{Formula (6)}.$$

2. A spot welding method for forming a nugget in a joint surface of two or more thin steel plates, wherein at least one of the two or more thin steel plates is a high-strength steel plate having a tensile strength of 750 MPa to 1850 MPa and having a carbon equivalent Ceq represented by Formula (1) of 0.22 mass % to 0.55 mass %:

$$Ceq=[C]+[Si]/30+[Mn]/20+2[P]+4[S] \quad \text{Formula (1)},$$

wherein [C], [Si], [Mn], [P], and [S] each respectively represent a content, in mass %, of C, Si, Mn, P, and S in the high-strength steel plate, the method comprising the steps of, in order:

a) performing welding energization under a condition that a pressurizing force EF, in N, of a welding electrode against the two or more thin steel plates satisfies Formula (7):

$$1470 \times h \leq EF \leq 1960 \times h \quad \text{Formula (7)},$$

wherein h represents a quotient, in mm, which is obtained when a sum of thicknesses of all the thin steel plates is divided by two;

b) cooling the thin steel plates for a cooling time after welding Ct, in ms, satisfying Formula (3), while holding the pressurizing force EF:

$$16 \leq Ct \leq 300 \quad \text{Formula (3)},$$

c) while holding the pressurizing force EF, performing post-heating energization of the welding electrode with a post-heating energization current PC, in kA, which satisfies Formula (4):

$$0.40 \times WC \leq PC \leq 0.95 \times WC \quad \text{Formula (4)}$$

wherein WC is measured in kA, and represents a welding current during the welding energization for a post-heating energization time Pt, wherein Pt is measured in ms, and is defined by Formula (5):

$$30 \leq Pt \leq 200 \quad \text{Formula (5)};$$

and d) releasing pressurizing at the pressurizing force EF, wherein a holding time Ht, in ms, during which the pressurizing force EF is held between the end of the step of performing post-heating energization and the step of releasing pressurizing at the pressurizing force EF satisfies Formula (6):

$$0 \leq Ht \leq 240 \quad \text{Formula (6)}.$$

3. The spot welding method of a high-strength steel plate according to claim 1, further comprising a step, after the step of releasing pressurizing, of holding the thin steel plates at a heat treatment temperature after welding AT (° C.) satisfying Formula (8):

$$120 \leq AT \leq 220 \quad \text{Formula (8)},$$

for a heat treatment time after welding At (s) of $100 \leq At \leq 6000$.

4. The spot welding method of a high-strength steel plate according to claim 3, further comprising, between the step of releasing pressurizing and the step of holding the thin steel plates at the heat treatment temperature after welding, cooling the thin steel plates to reduce a surface temperature of a portion contacting the welding electrode of each of the thin steel plates to a temperature CT (° C.) satisfying Formula (10):

$$CT \leq 150 \quad \text{Formula (10)}.$$

5. The spot welding method of a high-strength steel plate according to claim 1, wherein the high-strength steel plate contains:
- C: 0.10 mass % to 0.40 mass %;
- Si: 0.01 mass % to 2.50 mass %; and
- Mn: 1.5 mass % to 3.0 mass %, and wherein, in the high-strength steel plate,
- P content is equal to or less than 0.03 mass %,
- S content is equal to or less than 0.01 mass %,
- N content is equal to or less than 0.0100 mass %,
- O content is equal to or less than 0.007 mass %,
- Al content is equal to or less than 1.00 mass %, and
- the balance comprises Fe and an inevitable impurity.

6. The spot welding method of a high-strength steel plate according to claim 5, wherein the high-strength steel plate further contains at least one element selected from the group consisting of:
- Ti: 0.005 mass % to 0.10 mass %;
- Nb: 0.005 mass % to 0.10 mass %; and
- V: 0.005 mass % to 0.10 mass %.

7. The spot welding method of a high-strength steel plate according to claim 5, wherein the high-strength steel plate further contains at least one element selected from the group consisting of:
- B: 0.0001 mass % to 0.01 mass %;
- Cr: 0.01 mass % to 2.0 mass %;
- Ni: 0.01 mass % to 2.0 mass %;
- Cu: 0.01 mass % to 2.0 mass %; and
- Mo: 0.01 mass % to 0.8 mass %.

8. The spot welding method of a high-strength steel plate according to claim 5, wherein the high-strength steel plate further contains at least one element selected from the group consisting of Ca, Ce, Mg, and REM within a range of 0.0001 mass % to 0.5 mass % in total.

9. The spot welding method of a high-strength steel plate according to claim 2, further comprising a step, after the step of releasing pressurizing, of holding the thin steel plates at a heat treatment temperature after welding AT (° C.) satisfying Formula (8):

$$120 \leq AT \leq 220 \quad \text{Formula (8)},$$

for a heat treatment time after welding At (s) of $100 \leq At \leq 6000$.

10. The spot welding method of a high-strength steel plate according to claim 9, further comprising, between the step of releasing pressurizing and the step of holding the thin steel plates at the heat treatment temperature after welding, cooling the thin steel plates to reduce a surface temperature of a portion contacting the welding electrode of each of the thin steel plates to a temperature CT (° C.) satisfying Formula (10):

$$CT \leq 150 \quad \text{Formula (10)}.$$

11. The spot welding method of a high-strength steel plate according to claim 2, wherein the high-strength steel plate contains:
- C: 0.10 mass % to 0.40 mass %;
- Si: 0.01 mass % to 2.50 mass %; and
- Mn: 1.5 mass % to 3.0 mass %, and wherein, in the high-strength steel plate,
- P content is equal to or less than 0.03 mass %,
- S content is equal to or less than 0.01 mass %,
- N content is equal to or less than 0.0100 mass %,
- O content is equal to or less than 0.007 mass %,
- Al content is equal to or less than 1.00 mass %, and
- the balance comprises Fe and an inevitable impurity.

12. The spot welding method of a high-strength steel plate according to claim 11, wherein the high-strength steel plate further contains at least one element selected from the group consisting of:
- Ti: 0.005 mass % to 0.10 mass %;
- Nb: 0.005 mass % to 0.10 mass %; and
- V: 0.005 mass % to 0.10 mass %.

13. The spot welding method of a high-strength steel plate according to claim 11, wherein the high-strength steel plate further contains at least one element selected from the group consisting of Ca, Ce, Mg, and REM within a range of 0.0001 mass % to 0.5 mass % in total.

14. The spot welding method of a high-strength steel plate according to claim 11, wherein the high-strength steel plate further contains at least one element selected from the group consisting of:
- B: 0.0001 mass % to 0.01 mass %;
- Cr: 0.01 mass % to 2.0 mass %;
- Ni: 0.01 mass % to 2.0 mass %;
- Cu: 0.01 mass % to 2.0 mass %; and
- Mo: 0.01 mass % to 0.8 mass %.

* * * * *